(12) United States Patent
Wang et al.

(10) Patent No.: US 12,724,244 B2
(45) Date of Patent: Sep. 1, 2026

(54) OPTICAL LENS ASSEMBLY AND ELECTRONIC DEVICE

(71) Applicant: NINGBO SUNNY AUTOMOTIVE OPTECH CO., LTD., Ningbo City (CN)

(72) Inventors: Yifeng Wang, Ningbo City (CN); Bo Yao, Ningbo City (CN); Huiqiong Xiao, Ningbo City (CN); Li Yang, Ningbo City (CN)

(73) Assignee: NINGBO SUNNY AUTOMOTIVE OPTECH CO., LTD., Ningbo (CN)

( * ) Notice: Subject to any disclaimer, the term of this patent is extended or adjusted under 35 U.S.C. 154(b) by 188 days.

(21) Appl. No.: 18/809,218

(22) Filed: Aug. 19, 2024

(65) Prior Publication Data

US 2025/0383530 A1 Dec. 18, 2025

(30) Foreign Application Priority Data

Jun. 19, 2023 (CN) ......................... 202310733521.7
Jun. 18, 2024 (CN) ......................... 202410788156.4

(51) Int. Cl.
*G02B 13/00* (2006.01)
*G02B 1/04* (2006.01)
*G02B 9/64* (2006.01)

(52) U.S. Cl.
CPC ........... *G02B 13/0045* (2013.01); *G02B 9/64* (2013.01); *G02B 13/006* (2013.01); *G02B 1/041* (2013.01)

(58) Field of Classification Search
CPC .... G02B 13/0045; G02B 13/006; G02B 9/64; G02B 1/041
See application file for complete search history.

(56) References Cited

U.S. PATENT DOCUMENTS

2020/0142158 A1* 5/2020 Yao .................... G02B 13/0045

FOREIGN PATENT DOCUMENTS

CN 113495342 A * 10/2021 ........... G02B 13/006
CN 115701554 A * 2/2023

* cited by examiner

*Primary Examiner* — Nathanael R Briggs
(74) *Attorney, Agent, or Firm* — The Sun IP Law

(57) ABSTRACT

The disclosure provides an optical lens assembly and an electronic device. The optical lens assembly comprises: a first lens having a negative refractive power; a second lens having a negative refractive power; a third lens having a positive refractive power; a fourth lens having a positive refractive power; a fifth lens having a refractive power; a sixth lens having a refractive power; and a seventh lens having a refractive power; a distance d11 from a second side surface of the sixth lens to a first side surface of the seventh lens on the optical axis and a total optical length TTL of the optical lens assembly meet: d11/TTL≥0.03. The disclosure solves at least one problem among high resolution, miniaturization, inability of clear imaging during large temperature differences, or poor imaging quality in low light environments in optical lens assembly in the related art.

20 Claims, 6 Drawing Sheets

OPTICAL LENS ASSEMBLY AND ELECTRONIC DEVICE

CROSS-REFERENCE TO RELATED APPLICATIONS

This application claims priorities to Chinese Patent Application No. 202310733521.7 filed to the China National Intellectual Property Administration on Jun. 19, 2023 and Chinese Patent Application No. 202410788156.4 filed to the China National Intellectual Property Administration on Jun. 18, 2024 and entitled "Optical Lens Assembly and Electronic Device", the disclosure of which is hereby incorporated by reference in its entirety.

TECHNICAL FIELD

The disclosure relates to the technical field of optical imaging devices, and specifically, to an optical lens assembly and an electronic device.

BACKGROUND OF THE INVENTION

With the development of science and technology, application scenarios of optical lenses assembly have gradually increased, and the requirements of users for the optical performance of the optical lenses assembly have also gradually increased. A structure carrying an optical lens assembly is developed toward miniaturization, causing the optical lens assembly to also be developed toward miniaturization, and if the optical lens assembly is used in an environment with large temperature variations, an optical Back Focal Length (BFL) of the lens offsets with the temperature variations, resulting in image surface offset and imaging blur, and thus affecting normal use. A vehicle lens is a key component for an autonomous driving assistance system to acquire external information, and with the rapid development of the autonomous driving assistance system, the performance requirements for the vehicle optical lens assembly are also increasing.

Since actual road detection is complex and the vehicle lens is required to have good recognition capacity on an object, there are higher requirements for the imaging quality of the vehicle lens itself, and in order to adapt to more diverse application scenarios, high resolution has gradually become an urgent need. On the basis of meeting an imaging requirement for the vehicle lens, it is more convenient to mount the vehicle lens if the vehicle lens is smaller, but this leads to a contradiction between the resolution of a common vehicle lens and miniaturization. In addition, an application environment of the vehicle lens may have a large temperature difference, for example, high temperature environments in summer and low temperature environments in winter, and the common lens used under these conditions is subjected to image surface offset due to temperature variations, causing imaging blur of the lens, and thus affecting normal use. In order to cause the vehicle lens to be able to clearly image under both high and low temperature working conditions, the optical BFL of the lens needs to be inhibited from offsetting with temperature variations. Meanwhile, the current vehicle lens has poor imaging clarity in low light environments such as at night, resulting in a greater safety hazard for vehicles traveling at night.

That is to say, optical lenses assembly in the related art have at least one of the following problems of high resolution, miniaturization, inability of clear imaging with large temperature differences, or poor imaging quality in low light environments.

SUMMARY OF THE INVENTION

Some embodiments of the disclosure provide an optical lens assembly and an electronic device, to solve at least one of the following problems of high resolution, miniaturization, inability of clear imaging with large temperature differences, or poor imaging quality in low light environments in optical lenses assembly in the related art.

In an embodiment of the disclosure, an optical lens assembly is provided, including: a first lens having a negative refractive power, where a first side surface of the first lens is a convex surface, and a second side surface of the first lens is a concave surface; a second lens having a negative refractive power, where a first side surface of the second lens and a second side surface of the second lens both are concave surfaces; a third lens having a positive refractive power, where a first side surface of the third lens and a second side surface of the third lens both are convex surfaces; a fourth lens having a positive refractive power, where a first side surface of the fourth lens is a convex surface; a fifth lens having a refractive power, where a first side surface of the fifth lens is a convex surface; a sixth lens having a refractive power, where a second side surface of the sixth lens is a convex surface; and a seventh lens having a refractive power.

In an embodiment, a second side surface of the fourth lens is a convex surface or a concave surface.

In an embodiment, the second lens and the third lens are cemented to form a cemented lens, the fifth lens and the sixth lens are cemented to form a cemented lens, the fifth lens has a positive refractive power, a second side surface of the fifth lens is a convex surface, the sixth lens has a negative refractive power, and a first side surface of the sixth lens is a concave surface; or the fifth lens has a negative refractive power, the second side surface of the fifth lens is a concave surface, the sixth lens is a positive refractive power, and the first side surface of the sixth lens is a convex surface.

In an embodiment, the seventh lens has a negative refractive power, a first side surface of the seventh lens is a convex surface, and a second side surface of the seventh lens is a concave surface; or the seventh lens has the negative refractive power, the first side surface of the seventh lens is a concave surface, and the second side surface of the seventh lens is the concave surface; or the seventh lens has the negative refractive power, the first side surface of the seventh lens is the concave surface, and the second side surface of the seventh lens is a convex surface; or the seventh lens has a positive refractive power, the first side surface of the seventh lens is the convex surface, and the second side surface of the seventh lens is the convex surface.

In an embodiment, the seventh lens is an aspherical lens; and/or at least one of the first side surface of the seventh lens or the second side surface of the seventh lens has an inflection point.

In an embodiment, the optical lens assembly further includes a diaphragm, where the diaphragm is located between the fourth lens and the fifth lens.

In an embodiment, a distance d11 from the second side surface of the sixth lens to the first side surface of the seventh lens on an optical axis of the optical lens assembly and a total optical length TTL of the optical lens assembly meet: $d11/TTL \geq 0.05$.

In an embodiment, a distance d7 from the second side surface of the fourth lens to the first side surface of the fifth lens on the optical axis of the optical lens assembly and the total optical length TTL of the optical lens assembly meet: $d7/TTL \geq 0.12$.

In an embodiment, an optical BFL of the optical lens assembly and the total optical length TTL of the optical lens assembly meet: $BFL/TTL \geq 0.02$.

In an embodiment, a focal length F3 of the third lens and a focal length F of the optical lens assembly meet: $|F3/F| \leq 3$.

In an embodiment, a center thickness d3 of the second lens, a center thickness d4 of the third lens, and the total optical length TTL of the optical lens assembly meet: $(d3+d4)/TTL \geq 0.05$.

In an embodiment, a curvature radius R11 of the second side surface of the sixth lens and the focal length F of the optical lens assembly meet: $R11/F \leq -0.001$; and/or a maximum Field Of View (FOV) of the optical lens assembly, an image height H corresponding to the maximum FOV of the optical lens assembly, and the total optical length TTL of the optical lens assembly meet: $TTL/H/FOV \leq 0.1$; and/or the focal length F of the optical lens assembly and an Entrance Pupil Diameter (ENPD) of the optical lens assembly meet: $F/ENPD \leq 2.0$; and/or the total optical length TTL of the optical lens assembly and the image height H corresponding to the maximum FOV of the optical lens assembly meet: $TTL/(H/2) \geq 5$; and/or a clear aperture D13 of the second side surface of the seventh lens and the image height H corresponding to the maximum FOV of the optical lens assembly meet: $D13/H \geq 0.7$; and/or a curvature radius R7 of the first side surface of the fourth lens and a curvature radius R8 of the second side surface of the fourth lens meet: $|R7/R8| \leq 2.5$; and/or a maximum field angle $\arctan(1/K(S\mathbf{2}))$ of the second side surface of the first lens meet: $\arctan(1/K(S\mathbf{2})) \geq 40$; and/or a radian value θ of the maximum FOV of the optical lens assembly, the image height H corresponding to the maximum FOV of the optical lens assembly, and the focal length F of the optical lens assembly meet: $(H/2)/(F^*\tan(\theta/2) \geq 0.6$; and/or a curvature radius R1 of the first side surface of the first lens, a curvature radius R2 of the second side surface of the first lens, a clear aperture D1 of the first side surface of the first lens, and a clear aperture D2 of the second side surface of the first lens meet: $(R1/D1)/(R2/D2) \leq 4$; and/or the curvature radius R2 of the second side surface of the first lens and a curvature radius R3 of the first side surface of the second lens meet: $(R2-R3)/(R2+R3) \leq -2$.

In an embodiment, a focal length F23 of a first cemented lens formed by the second lens and the third lens and the focal length F of the optical lens assembly meet: $F23/F \leq -0.5$.

In an embodiment, a focal length F1 of the first lens and the focal length F of the optical lens assembly meet: $F1/F \geq -8$.

In an embodiment, the radian value θ of the maximum FOV of the optical lens assembly, the image height H corresponding to the maximum FOV of the optical lens assembly, and the focal length F of the optical lens assembly meet: $|(H-F^*\theta)/(F^*\theta)| \leq 0.2$.

In an embodiment, the second lens and the third lens are cemented to form a first cemented lens, and a curvature radius Rj1 of a cemented surface of the first cemented lens and a clear aperture Φj1 of the cemented surface of the first cemented lens meet: $|Rj1|/(\Phi j1/2) \leq 5$.

In another embodiment of the disclosure, an optical lens assembly is provided, including: a first lens having a negative refractive power; a second lens having a negative refractive power; a third lens having a positive refractive power; a fourth lens having a positive refractive power; a fifth lens having a refractive power; a sixth lens having a refractive power; a seventh lens having a refractive power. A distance d7 from a second side surface of the fourth lens to a first side surface of the fifth lens on an optical axis of the optical lens assembly and a total optical length TTL of the optical lens assembly meet: $d7/TTL \geq 0.12$.

In an embodiment, a first side surface of the first lens is a convex surface, and a second side surface of the first lens is a concave surface; and/or a first side surface of the second lens and a second side surface of the second lens both are concave surfaces; and/or a first side surface of the third lens and a second side surface of the third lens both are convex surfaces; and/or the second lens and the third lens are cemented to form a cemented lens.

In an embodiment, a first side surface of the fourth lens is a convex surface, and the second side surface of the fourth lens is a convex surface or a concave surface.

In an embodiment, the fifth lens and the sixth lens are cemented to form a second cemented lens, the fifth lens has a positive refractive power, the first side surface of the fifth lens is a convex surface, a second side surface of the fifth lens is a convex surface, the sixth lens has a negative refractive power, a second side surface of the sixth lens is a convex surface, and a first side surface of the sixth lens is a concave surface; or the fifth lens has a negative refractive power, the first side surface of the fifth lens is the convex surface, the second side surface of the fifth lens is a concave surface, the sixth lens has a positive refractive power, the second side surface of the sixth lens is the convex surface, and the first side surface of the sixth lens is a convex surface.

In an embodiment, the seventh lens has a negative refractive power, a first side surface of the seventh lens is a convex surface, and a second side surface of the seventh lens is a concave surface; or the seventh lens has the negative refractive power, the first side surface of the seventh lens is a concave surface, and the second side surface of the seventh lens is the concave surface; or the seventh lens has the negative refractive power, the first side surface of the seventh lens is the concave surface, and the second side surface of the seventh lens is a convex surface; or the seventh lens has a positive refractive power, the first side surface of the seventh lens is the convex surface, and the second side surface of the seventh lens is the convex surface.

In an embodiment, the seventh lens is an aspherical lens; and/or at least one of the first side surface of the seventh lens or the second side surface of the seventh lens has an inflection point.

In an embodiment, the optical lens assembly further includes a diaphragm, where the diaphragm is located between the fourth lens and the fifth lens.

In an embodiment, a distance d11 from the second side surface of the sixth lens to the first side surface of the seventh lens on an optical axis of the optical lens assembly and a total optical length TTL of the optical lens assembly meet: $d11/TTL \geq 0.05$.

In an embodiment, an optical BFL of the optical lens assembly and the total optical length TTL of the optical lens assembly meet: $BFL/TTL \geq 0.02$.

In an embodiment, a maximum FOV of the optical lens assembly, an image height H corresponding to the maximum FOV of the optical lens assembly, and the total optical length TTL of the optical lens assembly meet: $TTL/H/FOV \leq 0.1$.

In an embodiment, a focal length F3 of the third lens and a focal length F of the optical lens assembly meet: $|F3/F| \leq 3$.

In an embodiment, a curvature radius R7 of the first side surface of the fourth lens and a curvature radius R8 of the second side surface of the fourth lens meet: $|R7/R8| \leq 2.5$.

In an embodiment, a center thickness d3 of the second lens, a center thickness d4 of the third lens, and the total optical length TTL of the optical lens assembly meet: $(d3+d4)/TTL \geq 0.05$.

In an embodiment, a radian value θ of the maximum FOV of the optical lens assembly, the image height H corresponding to the maximum FOV of the optical lens assembly, and the focal length F of the optical lens assembly meet: $(H/2)/(F*\tan(\theta/2)) \geq 0.6$.

In an embodiment, a focal length F23 of a first cemented lens formed by the second lens and the third lens and the focal length F of the optical lens assembly meet: $F23/F \leq -0.5$.

In an embodiment, a focal length F1 of the first lens and the focal length F of the optical lens assembly meet: $F1/F \geq -8$.

In an embodiment, a curvature radius R11 of the second side surface of the sixth lens and the focal length F of the optical lens assembly meet: $R11/F \leq -0.001$; and/or the focal length F of the optical lens assembly and an ENPD of the optical lens assembly meet: $F/ENPD \leq 2.0$; and/or the total optical length TTL of the optical lens assembly and the image height H corresponding to the maximum FOV of the optical lens assembly meet: $TTL/(H/2) \geq 5$; and/or a clear aperture D13 of the second side surface of the seventh lens and the image height H corresponding to the maximum FOV of the optical lens assembly meet: $D13/H \geq 0.7$; and/or a maximum field angle $\arctan(1/K(S\mathbf{2}))$ of the second side surface of the first lens meets: $\arctan(1/K(S\mathbf{2})) \geq 40$; and/or a curvature radius R1 of the first side surface of the first lens, a curvature radius R2 of the second side surface of the first lens, a clear aperture D1 of the first side surface of the first lens, and a clear aperture D2 of the second side surface of the first lens meet: $(R1/D1)/(R2/D2) \leq 4$; and/or the curvature radius R2 of the second side surface of the first lens and a curvature radius R3 of the first side surface of the second lens meet: $(R2-R3)/(R2+R3) \leq -2$; and/or a radian value θ of the maximum FOV of the optical lens assembly, the image height H corresponding to the maximum FOV of the optical lens assembly, and the focal length F of the optical lens assembly meet: $|(H-F*\theta)/(F*\theta)| \leq 0.2$; and/or the second lens and the third lens are cemented to form the first cemented lens, and a curvature radius Rj1 of a cemented surface of the first cemented lens and a clear aperture Φj1 of the cemented surface of the first cemented lens meet: $|Rj1|/(\Phi j1/2) \leq 5$.

In another embodiment of the disclosure, an optical lens assembly is provided, including: a first lens having a negative refractive power, where a second side surface of the first lens is a concave surface; a second lens having a negative refractive power, where a first side surface of the second lens is a concave surface; a third lens having a positive refractive power, where a second side surface of the third lens is a convex surface; a fourth lens having a positive refractive power, where a first side surface of the fourth lens is a convex surface; a fifth lens having a refractive power, where a first side surface of the fifth lens is a convex surface; a sixth lens having a refractive power; a seventh lens having a refractive power. refractive powers of the fifth lens and the sixth lens are opposite; a distance d11 from a second side surface of the sixth lens to a first side surface of the seventh lens on an optical axis of the optical lens assembly and a total optical length TTL of the optical lens assembly meet: $d11/TTL \geq 0.03$; a distance d7 from a second side surface of the fourth lens to the first side surface of the fifth lens on the optical axis of the optical lens assembly and the total optical length TTL of the optical lens assembly meet: $d7/TTL \geq 0.09$; and a focal length F7 of the seventh lens and a focal length F of the optical lens assembly meet: $|F7/F| \geq 2.5$.

In an embodiment, a first side surface of the first lens is a convex surface, and a second side surface of the second lens is a concave surface.

In an embodiment, the first side surface of the first lens is a concave surface, and the second side surface of the second lens is a convex surface.

In an embodiment, a first side surface of the third lens is a convex surface.

In an embodiment, a second side surface of the fourth lens is a convex surface or a concave surface.

In an embodiment, the fifth lens has a negative refractive power, the first side surface of the fifth lens is a convex surface, a second side surface of the fifth lens is a concave surface, the sixth lens has a positive refractive power, a first side surface of the sixth lens is a convex surface, and the second side surface of the sixth lens is a convex surface; or the fifth lens has a positive refractive power, the first side surface of the fifth lens is the convex surface, the second side surface of the fifth lens is a convex surface, the sixth lens has a negative refractive power, the first side surface of the sixth lens is the concave surface, and the second side surface of the sixth lens is the convex surface; or the fifth lens has the positive refractive power, the first side surface of the fifth lens is the convex surface, the second side surface of the fifth lens is the convex surface, the sixth lens has the negative refractive power, the first side surface of the sixth lens is the concave surface, and the second side surface of the sixth lens is the concave surface.

In an embodiment, the seventh lens has a negative refractive power, a first side surface of the seventh lens is a convex surface, and a second side surface of the seventh lens is a concave surface; or the seventh lens has the negative refractive power, the first side surface of the seventh lens is a concave surface, and the second side surface of the seventh lens is the concave surface; or the seventh lens has the negative refractive power, the first side surface of the seventh lens is the concave surface, and the second side surface of the seventh lens is a convex surface; or the seventh lens has a positive refractive power, the first side surface of the seventh lens is the convex surface, and the second side surface of the seventh lens is the convex surface; or the seventh lens has the positive refractive power, the first side surface of the seventh lens is the convex surface, and the second side surface of the seventh lens is the concave surface.

In an embodiment, a focal length F1 of the first lens and the focal length F of the optical lens assembly meet: $-3.6 \leq F1/F \leq -1.7$; and/or a focal length F2 of the second lens and the focal length F of the optical lens assembly meet: $-3 \leq F2/F \leq -0.3$; and/or a curvature radius R1 of the first side surface of the first lens and a curvature radius R2 of the second side surface of the first lens meet: $0.5 \leq R1/R2 \leq 4$; and/or a curvature radius R3 of the first side surface of the second lens and a curvature radius R4 of the second side surface of the second lens meet: $-2 \leq R3/R4 < 0$.

In an embodiment, the focal length F1 of the first lens and the focal length F of the optical lens assembly meet: $-2 \leq F1/F \leq -0.4$; and/or the focal length F2 of the second lens and the focal length F of the optical lens assembly meet: $-6.5 \leq F2/F \leq -4.5$; and/or the curvature radius R1 of the first side surface of the first lens and the curvature radius R2 of the second side surface of the first lens meet: $-8 \leq R1/R2 \leq -4$; and/or the curvature radius R3 of the first side surface of the second lens and the curvature radius R4 of the second side surface of the second lens meet: $0<R3/R4\leq 2$.

In an embodiment, the focal length F1 of the first lens, the focal length F2 of the second lens, and the focal length F of the optical lens assembly meet: $-3\leq MAX[F1, F2]/F$.

In an embodiment, a focal length F3 of the third lens and the focal length F of the optical lens assembly meet: $F3/F\leq 3.5$.

In an embodiment, the focal length F2 of the second lens and the focal length F3 of the third lens meet: $-3\leq F2/F3\leq -0.1$.

In an embodiment, a focal length F4 of the fourth lens and the focal length F of the optical lens assembly meet: $0.5\leq F4/F\leq 4$.

In an embodiment, a focal length F5 of the fifth lens and a focal length F6 of the sixth lens meet: $-8\leq F5/F6\leq -0.1$.

In an embodiment, a distance d23 from the second side surface of the second lens to the first side surface of the third lens on the optical axis of the optical lens assembly and an on-axis distance TL from the first side surface of the first lens to the second side surface of the seventh lens meet: $d23/TL\leq 0.1$.

In an embodiment, the second lens is spaced apart from the third lens, and the distance d23 from the second side surface of the second lens to the first side surface of the third lens on the optical axis of the optical lens assembly and the on-axis distance TL from the first side surface of the first lens to the second side surface of the seventh lens meet: $0.01\leq d23/TL\leq 0.07$.

In an embodiment, the second lens and the third lens are arranged in a cemented manner.

In an embodiment, a curvature radius R6 of the second side surface of the third lens and a curvature radius R7 of the first side surface of the fourth lens meet: $-2.5\leq R6/R7\leq -0.1$.

In an embodiment, a distance d12 from the second side surface of the first lens to the first side surface of the second lens on the optical axis of the optical lens assembly and the on-axis distance TL from the first side surface of the first lens to the second side surface of the seventh lens meet: $d12/TL\leq 0.17$.

In an embodiment, a combined focal length F56 of the fifth lens and the sixth lens, and the focal length F of the optical lens assembly meet: $0<F56/F\leq 7$.

In an embodiment, the on-axis distance TL from the first side surface of the first lens to the second side surface of the seventh lens and a center thickness d3 of the second lens meet: $TL/d3\geq 10$.

In an embodiment, the on-axis distance TL from the first side surface of the first lens to the second side surface of the seventh lens, a distance d34 from the second side surface of the third lens to the first side surface of the fourth lens on the optical axis of the optical lens assembly meet:

$$25\leq TL/d34.$$

In an embodiment, a curvature radius R11 of the second side surface of the sixth lens and the focal length F of the optical lens assembly meet: $-15\leq R11/F\leq -2.5$.

In an embodiment, the optical lens assembly meets at least one of the following conditional expressions: $R11/F\leq -0.01$, $d11/TTL\geq 0.05$, $0.055\leq d11/TTL\leq 0.2$, $d7/TTL\geq 0.1$, $0.1\leq d7/TTL\leq 0.4$, $BFL/TTL\geq 0.02$, $BFL/TTL\geq 0.05$, $TTL/H/FOV\leq 0.1$, $TTL/H/FOV\leq 0.08$, $F/ENPD\leq 2.0$, $F/ENPD\leq 1.8$, $TTL/(H/2)\geq 5$, $TTL/(H/2)\geq 6.5$, $D13/H\geq 0.7$, $D13/H\geq 0.85$, $F3/F\leq 3$, $|R7/R8|\leq 2.5$, $|R7/R8|\leq 1.8$, $\arctan(1/K(S2))\geq 30°$, $\arctan(1/K(S2))\geq 35°$, $(d3+d4)/TTL\geq 0.05$, $(d3+d4)/TTL\geq 0.08$, $(H/2)/(F*\tan(\theta/2))\geq 0.6$, $(H/2)/(F*\tan(\theta/2))\geq 0.75$, $(R1/D1)/(R2/D2)\leq 4$, $(R1/D1)/(R2/D2)\leq 2$, $(R2-R3)/(R2+R3)\leq -2$, $(R2-R3)/(R2+R3)\leq -3$, $F23/F\leq -0.5$, $F23/F\leq -1.5$, $F1/F\geq -8$, $F1/F2-4$, $|(H-F*\theta)/(F*\theta)|\leq 0.2$, $|(H-F*\theta)/(F*\theta)|\leq 0.1$, $|Rj1|/(\Phi j1/2)\leq 5$, $0\leq d23/TL\leq 0.08$, $-8\leq F2/F$, $-7\leq F2/F\leq -0.2$, $-2.1\leq MAX[F1, F2]/F\leq -0.1$, $|F7/F|\geq 3.5$, $d12/TL\leq 0.16$, $0.5\leq F56/F\leq 6.2$, $1.2\leq F4/F\leq 3$, $-4\leq F5/F6\leq -0.2$, $-2\leq F2/F3\leq -0.2$, $TL/d3\geq 13$, $28\leq TL/d34\leq 400$, or $-2\leq R6/R7\leq -0.2$, where R11 is the curvature radius of the second side surface of the sixth lens, F is the focal length of the optical lens assembly, d11 is the distance from the second side surface of the sixth lens to the first side surface of the seventh lens on the optical axis of the optical lens assembly, TTL is the total optical length of the optical lens assembly, d7 is the distance from the second side surface of the fourth lens to the first side surface of the fifth lens on the optical axis of the optical lens assembly, BFL is the optical back focal length of the optical lens assembly, FOV is a maximum field of view of the optical lens assembly, H is the image height corresponding to the maximum FOV of the optical lens assembly, ENPD is the entrance pupil diameter of the optical lens assembly, D13 is the clear aperture of the second side surface of the seventh lens, F3 is the focal length of the third lens, R7 is the curvature radius of the first side surface of the fourth lens, R8 is the curvature radius of the second side surface of the fourth lens, $\arctan(1/K(S2))$ is the maximum field angle of the second side surface of the first lens, d3 is the center thickness of the second lens, d4 is the center thickness of the third lens, θ is the radian value of the maximum FOV of the optical lens assembly, R1 is the curvature radius of the first side surface of the first lens, R2 is the curvature radius of the second side surface of the first lens, D1 is the clear aperture of the first side surface of the first lens, D2 is the clear aperture of the second side surface of the first lens, R3 is the curvature radius of the first side surface of the second lens, F23 is the focal length of the first cemented lens formed by the second lens and the third lens, F1 is the focal length of the first lens, Rj1 is the curvature radius of a cemented surface of the first cemented lens, Φj1 is the clear aperture of the cemented surface of the first cemented lens, d23 is the distance from the second side surface of the second lens to the first side surface of the third lens on the optical axis of the optical lens assembly, TL is the on-axis distance from the first side surface of the first lens to the second side surface of the seventh lens, F2 is the focal length of the second lens, F7 is the focal length of the seventh lens, d12 is the distance from the second side surface of the first lens to the first side surface of the second lens on the optical axis of the optical lens assembly, F56 is the combined focal length of the fifth lens and the sixth lens, F4 is the focal length of the fourth lens, F5 is the focal length of the fifth lens, F6 is the focal length of the sixth lens, d34 is the distance from the second side surface of the third lens to the first side surface of the fourth lens on the optical axis of the optical lens assembly, and R6 is the curvature radius of the second side surface of the third lens.

In another embodiment of the disclosure, an electronic device is provided, including the optical lens assembly and an imaging element for converting an optical image formed by the optical lens assembly into an electrical signal.

In an embodiment of the disclosure, an optical lens assembly includes seven lenses having refractive powers. The first lens has the negative refractive power, the second side surface of the first lens is the concave surface; the second lens has the negative refractive power, the first side surface of the second lens is the concave surface; the third lens has the positive refractive power, the second side surface of the third lens is the convex surface; the fourth lens has the positive refractive power, the first side surface of the fourth lens is the convex surface; the fifth lens has the refractive power, the first side surface of the fifth lens is the convex surface; the sixth lens has the refractive power; the seventh lens has the refractive power. The refractive powers of the fifth lens and the sixth lens are opposite; the distance d11 from the second side surface of the sixth lens to the first side surface of the seventh lens on the optical axis of the optical lens assembly and the total optical length TTL of the optical lens assembly meet: $d11/TTL \geq 0.03$; the distance d7 from the second side surface of the fourth lens to the first side surface of the fifth lens on the optical axis of the optical lens assembly and the total optical length TTL of the optical lens assembly meet: $d7/TTL \geq 0.09$; and the focal length F7 of the seventh lens and the focal length F of the optical lens assembly meet: $|F7/F| \geq 2.5$. Therefore, the optical lens assembly has characteristics of high imaging quality, miniaturization, and clear imaging with large temperature differences.

In an embodiment, the optical lens assembly of the disclosure controls the first lens to have the negative refractive power and the second lens to have the negative refractive power, and by controlling the distance d12 from the second side surface of the first lens to the first side surface of the second lens on the optical axis and the on-axis distance TL from the first side surface of the first lens to the second side surface of the seventh lens to meet: $d12/TL \leq 0.17$, a distance between the first lens and the second lens is shortened, thereby realizing the characteristic of miniaturization.

In an embodiment, the optical lens assembly of the disclosure controls the third lens to have the positive refractive power and the fourth lens to have the positive refractive power, and by controlling an air gap d34 between the third lens and the fourth lens on the optical axis and the on-axis distance TL from the first side surface of the first lens to the second side surface of the seventh lens to meet: $25 \leq TL/d34$, and controlling the focal length F3 of the third lens and the focal length F of the optical lens assembly to meet: $F3/F \leq 3.5$, the optical lens assembly may have the characteristics of miniaturization and high resolution.

In an embodiment, the distance d23 from the second side surface of the second lens to the first side surface of the third lens on an optical axis and an on-axis distance TL from the first side surface of the first lens to the second side surface of the seventh lens meet: $d23/TL \leq 0.1$. The second lens is spaced apart from or cemented with the third lens. When the second lens is spaced apart from the third lens, $0.01 \leq d23/TL \leq 0.07$ is met, and through the spaced arrangement of the second lens and the third lens, thermal compensation of the optical lens assembly is realized, and the sensitivity of the second lens and the third lens is reduced. The second lens and the third lens are cemented, such that the optical lens assembly takes the characteristics of miniaturization and high resolution into consideration.

Through the technical solutions of the disclosure, the optical lens assembly includes the first lens, the second lens, the third lens, the fourth lens, the fifth lens, the sixth lens, and the seventh lens. The first lens has the negative refractive power, the first side surface of the first lens is the convex surface, and the second side surface of the first lens is the concave surface; the second lens has the negative refractive power, the first side surface of the second lens and the second side surface of the second lens both are concave surfaces; the third lens has the positive refractive power, the first side surface of the third lens and the second side surface of the third lens both are convex surfaces; the fourth lens has the positive refractive power, the first side surface of the fourth lens is the convex surface; the fifth lens has the refractive power, the first side surface of the fifth lens is the convex surface; the sixth lens has the refractive power, the second side surface of the sixth lens is the convex surface; and the seventh lens has the refractive power.

The first lens has the negative refractive power, and has a divergent action on light passing through the first lens, and under the same FOV, the light emitted by the second side surface of the first lens may cause a rear optical system of the optical lens assembly to have a larger light receiving surface. By designing the first side surface of the first lens as the convex surface, the first lens collects large FOV light to enter to the rear optical system of the optical lens assembly, and when it is a rainy and snowy weather, the sliding of water droplets is facilitated, thereby reducing an impact on imaging. By designing the second side surface of the first lens as the concave surface, large angle light passing the first side surface of the first lens is diverged rapidly, facilitating correction of a large angle aberration by the rear optical system of the optical lens assembly, thereby realizing high resolution. In an embodiment, the first lens is made of a material with a high refractive index, which facilitates the reduction of a front end aperture, such that the imaging quality of the optical lens assembly is improved.

The second lens has the negative refractive power and is in a double concave shape, and by receiving the light emitted by the first lens, the light may be smoothly emitted, facilitating the improvement of an aberration, thereby improving the imaging quality of the optical lens assembly. In an embodiment, the second lens and the third lens are cemented, such that the light emitted by the first lens may be smoothly transitioned to an imaging surface, and the total optical length of the optical lens assembly is shortened to cause various aberrations of the optical lens assembly to be fully corrected, and with a compact structure, a resolution ratio is increased, and optical performance such as distortions, CRAs, and the like is optimized, so as to simultaneously realize high resolution and miniaturization.

The third lens has the positive refractive power and has a convergence effect on light, and the third lens and the second lens are cemented, such that the aberration of the optical lens assembly is reduced, and the imaging quality of the optical lens assembly is improved.

The fourth lens has the positive refractive power, the first side surface of the fourth lens is the convex surface and has a convergence effect on light, and by rationally setting the refractive power of the fourth lens, the aberration may be further reduced, thereby improving the imaging quality of the optical lens assembly. By designing the second side surface of the fourth lens as the convex surface, edge FOV light deflects in a direction of a central axis after passing through the second side surface of the fourth lens, such that an aperture of a rear end of the optical lens assembly is reduced, thereby facilitating the miniaturization of the optical lens assembly. The shape of the fourth lens may be a meniscus shape convex to a first side, which facilitates the collection of the light emitted by the third lens; the positive refractive power facilitates the convergence of the light to cause the trend of the light to be smoothly transitioned to the rear optical system of the optical lens assembly; and by lowering the height of the light entering the rear, the aperture of the rear end lens is reduced, thereby facilitating the miniaturization of the optical lens assembly.

In an embodiment, the fifth lens has the positive refractive power; and the first side surface of the fifth lens is the convex surface, and the second side surface of the fifth lens is the convex surface. The fifth lens has a convergence effect on the light, and by controlling the focal length of the fifth lens, the aberration of the optical lens assembly may be effectively corrected, thereby improving the image quality of the optical lens assembly, and optimizing optical performance such as distortions, CRAs, and the like.

In another embodiment, the fifth lens has the negative refractive power; and the first side surface of the fifth lens is the convex surface, and the second side surface of the fifth lens is the concave surface. The fifth lens have the negative refractive power and has a divergent action on the light, so as to cause the follow-up optical system of the optical lens assembly to have a large light receiving surface, and through the rational allocation of refractive powers, the aberration is reduced, thereby improving optical performance.

In an embodiment, the sixth lens has the negative refractive power; and the first side surface of the sixth lens is the concave surface, and the second side surface of the sixth lens is the convex surface. The sixth lens has a divergent action on the light, and by rationally setting the refractive power of the sixth lens, the aberration may be further reduced, thereby improving the imaging quality of the optical lens assembly. In an embodiment, the fifth lens and the sixth lens are cemented, such that the light emitted by the fourth lens may be smoothly transitioned to the imaging surface, and the total optical length of the optical lens assembly is shortened to cause various aberrations of the optical lens assembly to be fully corrected, and while ensuring a compact structure, a resolution ratio is increased, and optical performance such as distortions, CRAs, and the like is optimized.

In another embodiment, the sixth lens has the positive refractive power; and the first side surface of the sixth lens is the convex surface, and the second side surface of the sixth lens is the convex surface. The sixth lens has the convergence effect, and by rationally setting the refractive power of the sixth lens, the light may further deflect in a direction of the optical axis, so as to reduce a rear end aperture. In an embodiment, the fifth lens and the sixth lens are cemented, such that the light emitted by the fourth lens may be smoothly transitioned to the imaging surface, and the total optical length of the optical lens assembly is shortened to cause various aberrations of the optical lens assembly to be fully corrected, and while ensuring a compact structure, a resolution ratio is increased, and optical performance such as distortions, CRAs, and the like is optimized.

In an embodiment, the seventh lens has the negative refractive power; and the first side surface of the seventh lens is the convex surface, and the second side surface of the seventh lens is the concave surface. The seventh lens is designed to be convex-concave, and the seventh lens is a meniscus shape convex to a first side, facilitating the receiving of the light emitted by the sixth lens, and the negative refractive power facilitates the divergence of the light, such that an angle from the light to the image surface meets a requirement for the CRA, and the resolution and illuminance of the optical lens assembly are improved.

In another embodiment, the seventh lens has the negative refractive power; and the first side surface of the seventh lens is the concave surface, and the second side surface of the seventh lens is the concave surface. The seventh lens is a biconcave lens, facilitating the receiving of the light emitted by the sixth lens, and by controlling the focal length of the seventh lens, the aberration of the optical lens assembly may be effectively corrected, thereby improving image quality, and optimizing optical performance such as distortions, CRAs, and the like.

In another embodiment, the seventh lens has the negative refractive power; and the first side surface of the seventh lens is the concave surface, and the second side surface of the seventh lens is the convex surface. The seventh lens is in a meniscus shape convex to the second side, facilitating the receiving of the light emitted by the sixth lens, and the negative refractive power facilitates the divergence of the light, such that the image surface of the optical lens assembly is enlarged to achieve a large edge angular resolution ratio.

In another embodiment, the seventh lens has the positive refractive power; and the first side surface of the seventh lens is the convex surface, and the second side surface of the seventh lens is the convex surface. The seventh lens has the positive refractive power, facilitating the convergence of the light, and the biconcave shape is more conductive to causing the light to enter the rear optical system of the optical lens assembly, such that the aberration of the optical lens assembly is corrected. Meanwhile, the seventh lens can lower the height of the light entering the follow-up optical system of the optical lens assembly, thereby reducing the rear end aperture of the optical lens assembly.

BRIEF DESCRIPTION OF DRAWINGS

The drawings, which form a part of the disclosure, are used to provide a further understanding of the disclosure. The exemplary embodiments of the disclosure and the description thereof are used to explain the disclosure, but do not constitute improper limitations to the disclosure. In the drawings.

Figure 1:
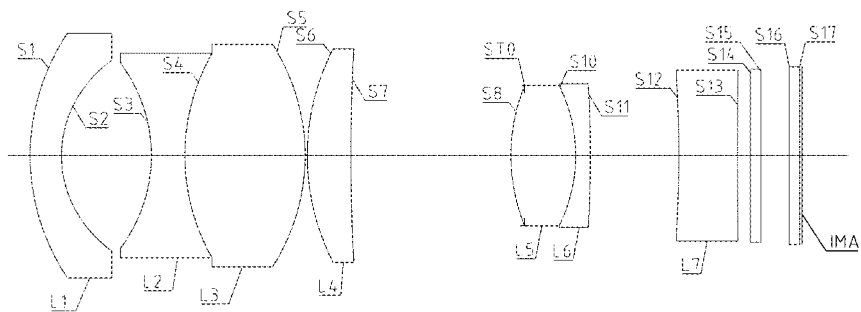
FIG. 1 is a schematic structural diagram of an optical lens assembly according to Example I of the disclosure.

The above drawings include the following reference numerals:

STO, Diaphragm; L1, First lens; S1, First side surface of first lens; S2, Second side surface of first lens; L2, Second lens; S3, First side surface of second lens; S4, Second side surface of second lens (First side surface of third lens); L3, Third lens; S5, Second side surface of third lens; L4, Fourth lens; S6, First side surface of fourth lens; S7, Second side surface of fourth lens; L5, Fifth lens; S8, First side surface of fifth lens; S10, Second side surface of fifth lens (First side surface of sixth lens); L6, Sixth lens; S11, Second side surface of sixth lens; L7, Seventh lens; S12, First side surface of seventh lens; S13, Second side surface of seventh lens; S14, First side surface of optical filter; S15, Second side surface of optical filter; S16, First side surface of protective glass; S17, Second side surface of protective glass; and IMA, Imaging surface.

DETAILED DESCRIPTION OF THE INVENTION

It is to be noted that the embodiments in the disclosure and the features in the embodiments may be combined with one another without conflict. The disclosure will be described below in detail with reference to the drawings and the embodiments.

It is to be noted that, unless otherwise defined, all technical and scientific terms used herein have the same meaning as commonly understood by those of ordinary skill in the art to which the disclosure belongs.

In the disclosure, in the absence of any indication to the contrary, terms such as "on, under, top, and bottom" are used generally with respect to the orientation shown in the drawings, or with respect to the parts themselves in the vertical, perpendicular, or gravitational direction; and similarly, for ease of comprehension and description, "inside or outside" refers to the inside and the outside of the contours of the respective parts themselves, provided, however, that the above terms are not intended to be used in a manner that restricts the disclosure.

It is to be noted that, in the specification, expressions such as first, second, third, etc. are used only to distinguish one feature from another and do not indicate any limitation of the features. Accordingly, without departing from the teachings of the disclosure, the first lens discussed below may also be referred to as a second lens or a third lens.

In the drawings, the thickness, size and shape of the lens have been slightly exaggerated for ease of illustration. Specifically, a spherical shape or aspherical shape shown in the drawings is shown by some embodiments. That is, the spherical shape or the aspherical shape is not limited to the spherical shape or aspherical shape shown in the drawings. The drawings are for illustrative purposes only and are not strictly to scale.

Herein, a paraxial region refers to a region nearby an optical axis. If the surface of a lens is convex and a position of the convex surface is not defined, it indicates that the lens surface is a convex surface at least in the paraxial region; and if the surface of the lens is a concave surface and a position of the concave surface is not defined, it indicates that the lens surface is a concave surface at least in the paraxial region. The surface of each lens that is close to an object side becomes a first side surface of the lens, and the surface of each lens that is close to an image side becomes a second side surface of the lens. Determination of the shape of the surface in the paraxial region may be based on the determination of those who are generally knowledgeable in the art, a convex surface and a concave surface are determined by a positive R-value or a negative R-value (R refers to a curvature radius of the paraxial region, and generally refers to an R value on a lens data base in optical software). For the first side surface, when the R value is positive, the first side surface is determined as a convex surface; and when the R value is negative, the first side surface is determined as a concave surface. For the second side surface, when the R value is positive, the second side surface is determined as a concave surface; and when the R value is negative, the second side surface is determined as a convex surface.

The disclosure generally protects common optical lenses assembly. In the figures, the left side is the object side, and the right side is the image side, that is to say, the first side surface is an object side surface, and the second side surface is an image side surface.

In an exemplary implementation, an optical lens assembly provided in the disclosure may be used as, for example, a vehicle lens. Light from the object side may be imaged on the image side.

When the optical lens assembly of the disclosure is applied to a projection lens or a radar emission lens, the left side is an imaging side, and the right side is an image source side. In an exemplary implementation, the optical lens assembly provided in the disclosure may be used as, for example, a projection lens or a laser radar emission end lens. In this case, the image side of the optical lens assembly is the image source side, and the object side is the imaging side. Light from the image source side is imaged on the imaging side. The imaging surface of the optical lens assembly is an image source surface.

In order to solve at least one of the following problems of high resolution, miniaturization, inability of clear imaging with large temperature differences, or poor imaging quality in low light environments in optical lenses assembly in the related art, the disclosure provides an optical lens assembly and an electronic device.

Embodiment I

As shown in FIG. 1 to FIG. 12, an optical lens assembly includes a first lens, a second lens, a third lens, a fourth lens, a fifth lens, a sixth lens, and a seventh lens. The first lens has a negative refractive power, a first side surface of the first lens is a convex surface, and a second side surface of the first lens is a concave surface; the second lens has a negative refractive power, a first side surface of the second lens and a second side surface of the second lens both are concave surfaces; the third lens has a positive refractive power, a first side surface of the third lens and a second side surface of the third lens both are convex surfaces; the fourth lens has a positive refractive power, a first side surface of the fourth lens is a convex surface; the fifth lens has a refractive power, a first side surface of the fifth lens is a convex surface; the sixth lens has a refractive power, a second side surface of the sixth lens is a convex surface; and the seventh lens has a refractive power.

The first lens has the negative refractive power, and has a divergent action on light passing through the first lens, and under the same FOV, the light emitted by the second side surface of the first lens may cause a rear optical system of the optical lens assembly to have a larger light receiving surface. By designing the first side surface of the first lens as the convex surface, the first lens collects large FOV light to enter to the rear optical system of the optical lens assembly, and when it is a rainy and snowy weather, the sliding of water droplets is facilitated, thereby reducing an impact on imaging. By designing the second side surface of the first lens as the concave surface, large angle light passing the first side surface of the first lens is diverged rapidly, facilitating correction of a large angle aberration by the rear optical system of the optical lens assembly, thereby realizing high resolution. In an embodiment, the first lens is made of a material with a high refractive index, which facilitates the reduction of a front end aperture, such that the imaging quality of the optical lens assembly is improved.

The second lens has the negative refractive power and is in a double concave shape, and by receiving the light emitted by the first lens, the light may be smoothly emitted, facilitating the improvement of an aberration, thereby improving the imaging quality of the optical lens assembly. In an embodiment, the second lens and the third lens are cemented, such that the light emitted by the first lens may be smoothly transitioned to an imaging surface, and the total optical length of the optical lens assembly is shortened to cause various aberrations of the optical lens assembly to be fully corrected, and with a compact structure, a resolution ratio is increased, and optical performance such as distortions, CRAs, and the like is optimized, so as to simultaneously realize high resolution and miniaturization.

The third lens has the positive refractive power and has a convergence effect on light, and the third lens and the second lens are cemented, such that the aberration of the optical lens assembly is reduced, and the imaging quality of the optical lens assembly is improved.

In an embodiment, the fourth lens has the positive refractive power, the first side surface of the fourth lens is the convex surface and has a convergence effect on light, and by rationally setting the refractive power of the fourth lens, the aberration may be further reduced, thereby improving the imaging quality of the optical lens assembly. By designing the second side surface of the fourth lens as the convex surface, edge FOV light deflects in a direction of a central axis after passing through the second side surface of the fourth lens, such that an aperture of a rear end of the optical lens assembly is reduced, thereby facilitating the miniaturization of the optical lens assembly.

In an embodiment, the shape of the fourth lens is a meniscus shape convex to a first side, which facilitates the collection of the light emitted by the third lens; the positive refractive power facilitates the convergence of the light to cause the trend of the light to be smoothly transitioned to the rear optical system of the optical lens assembly; and by lowering the height of the light entering the rear, the aperture of the rear end lens is reduced, thereby facilitating the miniaturization of the optical lens assembly.

In an embodiment, the fifth lens has the positive refractive power; and the first side surface of the fifth lens is the convex surface, and the second side surface of the fifth lens is the convex surface. The fifth lens has a convergence effect on the light, and by controlling the focal length of the fifth lens, the aberration of the optical lens assembly may be effectively corrected, thereby improving the image quality of the optical lens assembly, and optimizing optical performance such as distortions, CRAs, and the like.

In an embodiment, the fifth lens has the negative refractive power; and the first side surface of the fifth lens is the convex surface, and the second side surface of the fifth lens is the concave surface. The fifth lens have the negative refractive power and has a divergent action on the light, so as to cause the follow-up optical system of the optical lens assembly to have a large light receiving surface, and through the rational allocation of refractive powers, the aberration is reduced, thereby improving optical performance.

In an embodiment, the sixth lens has the negative refractive power; and the first side surface of the sixth lens is the concave surface, and the second side surface of the sixth lens is the convex surface. The sixth lens has a divergent action on the light, and by rationally setting the refractive power of the sixth lens, the aberration may be further reduced, thereby improving the imaging quality of the optical lens assembly. In an embodiment, the fifth lens and the sixth lens are cemented, such that the light emitted by the fourth lens may be smoothly transitioned to the imaging surface, and the total optical length of the optical lens assembly is shortened to cause various aberrations of the optical lens assembly to be fully corrected, and while ensuring a compact structure, a resolution ratio is increased, and optical performance such as distortions, CRAs, and the like is optimized.

In an embodiment, the sixth lens has the positive refractive power; and the first side surface of the sixth lens is the convex surface, and the second side surface of the sixth lens is the convex surface. The sixth lens has the convergence effect, and by rationally setting the refractive power of the sixth lens, the light may further deflect in a direction of the optical axis, so as to reduce a rear end aperture. In an embodiment, the fifth lens and the sixth lens are cemented, such that the light emitted by the fourth lens may be smoothly transitioned to the imaging surface, and the total optical length of the optical lens assembly is shortened to cause various aberrations of the optical lens assembly to be fully corrected, and while ensuring a compact structure, a resolution ratio is increased, and optical performance such as distortions, CRAs, and the like is optimized.

In an embodiment, the seventh lens has the negative refractive power; and the first side surface of the seventh lens is the convex surface, and the second side surface of the seventh lens is the concave surface. The seventh lens is designed to be convex-concave, and the seventh lens is a meniscus shape convex to the first side, facilitating the receiving of the light emitted by the sixth lens, and the negative refractive power facilitates the divergence of the light, such that an angle from the light to the image surface meets a requirement for the CRA, and the resolution and illuminance of the optical lens assembly are improved.

In an embodiment, the seventh lens has the negative refractive power; and the first side surface of the seventh lens is the concave surface, and the second side surface of the seventh lens is the concave surface. The seventh lens is a biconcave lens, facilitating the receiving of the light emitted by the sixth lens, and by controlling the focal length of the seventh lens, the aberration of the optical lens assembly may be effectively corrected, thereby improving image quality, and optimizing optical performance such as distortions, CRAs, and the like.

In an embodiment, the seventh lens has the negative refractive power; and the first side surface of the seventh lens is the concave surface, and the second side surface of the seventh lens is the convex surface. The seventh lens is in a meniscus shape convex to the second side, facilitating the receiving of the light emitted by the sixth lens, and the negative refractive power facilitates the divergence of the light, such that the image surface of the optical lens assembly is enlarged to achieve a large edge angular resolution ratio.

In an embodiment, the seventh lens has the positive refractive power; and the first side surface of the seventh lens is the convex surface, and the second side surface of the seventh lens is the convex surface. The seventh lens has the positive refractive power, facilitating the convergence of the light, and the biconcave shape is more conductive to causing the light to enter the rear optical system of the optical lens assembly, such that the aberration of the optical lens assembly is corrected. Meanwhile, the seventh lens may lower the height of the light entering the follow-up optical system of the optical lens assembly, thereby reducing the rear end aperture of the optical lens assembly.

In this embodiment, the seventh lens is an aspherical lens. By designing the seventh lens as the aspherical lens, an aberration of the optical lens assembly is corrected, and the resolution of the optical lens assembly is improved, thereby reducing a large FOV aberration.

In this embodiment, the optical lens assembly further includes a diaphragm, where the diaphragm is located between the fourth lens and the fifth lens. Through such arrangement, the light entering the optical lens assembly is effectively collected, thereby reducing a lens aperture on a front end of the optical lens assembly, and reducing the assembling sensitivity of the optical lens assembly.

In this embodiment, at least one of the first side surface of the seventh lens or the second side surface of the seventh lens has an inflection point. Through such arrangement, aberrations of a center FOV and an edge FOV are balanced, thereby improving resolution.

In this embodiment, the second lens and the third lens are cemented to form a first cemented lens, and the fifth lens and the sixth lens are cemented to form a second cemented lens. The first cemented lens and the second cemented lens are collectively called the cemented lens for brevity hereinafter. The cemented lens may effectively eliminate the impact of ghost images on the optical lens assembly, such that the optical lens assembly has high resolution on the basis of eliminating the ghost images. In an embodiment, through the cemented lens, various aberrations of the optical lens assembly are fully corrected, such that with a compact structure, a resolution ratio is increased, and optical performance such as distortions, CRAs, and the like is optimized. A negative lens in the cemented lens has a high refractive index relative to a positive lens in the cemented lens, such that the light may be effectively and smoothly converged, causing the light to stably reach the imaging surface, thereby reducing overall weight and cost. The cemented lens may also reduce light losses caused by the reflection among the lenses, the light of a front system of the optical lens assembly is rapidly transitioned through a combination of high and low refractive indexes, the aperture of the diaphragm is increased, and light flux is increased, thereby improving imaging quality in a low light environment. An air distance between two lenses may also be reduced by using the cemented lens, such that the entire optical lens assembly is more compact, and tolerance sensitivity problems such as overall core shift of the lens caused during assembling are relieved simultaneously.

In this embodiment, a curvature radius R11 of the second side surface of the sixth lens and a focal length F of the optical lens assembly meet: $R11/F \geq -0.001$. The second side surface of the sixth lens is the convex surface, and light formed during reflection with an optical filter and protective glass of a chip is divergent light, thereby weakening ghost images. Preferably, $R11/F \geq -0.01$.

In this embodiment, a distance d11 from the second side surface of the sixth lens to the first side surface of the seventh lens on an optical axis of the optical lens assembly and a total optical length TTL of the optical lens assembly meet: $d11/TTL \leq 0.05$. By limiting the distance between the sixth lens and the seventh lens within a rational range, an optical path of reflected light between the lenses is increased, causing a focal point of the ghost image to be far away from the image surface, thereby weakening the ghost image. Preferably, $d11/TTL \leq 0.08$.

In this embodiment, a distance d7 from the second side surface of the fourth lens to the first side surface of the fifth lens on the optical axis of the optical lens assembly and the total optical length TTL of the optical lens assembly meet: $d7/TTL \leq 0.12$. The fourth lens is a positive lens, and by setting a large distance between the fourth lens and the fifth lens, the rear end aperture of the optical lens assembly is reduced while the light is effectively converged. Preferably, $d7/TTL \leq 0.15$.

In this embodiment, an optical BFL of the optical lens assembly and the total optical length TTL of the optical lens assembly meet: $BFL/TTL \leq 0.02$. When the total optical length of the optical lens assembly is the same as that in the related art, the optical lens assembly of the disclosure has a long optical BFL, such that a special requirement for a long BFL of the optical lens assembly is met, and a space may also be reserved for the mounting and focusing of an optical element, thereby avoiding institutional interference. Preferably, $BFL/TTL \leq 0.05$.

In this embodiment, a maximum FOV of the optical lens assembly, an image height H corresponding to the maximum FOV of the optical lens assembly, and the total optical length TTL of the optical lens assembly meet: $TTL/H/FOV \geq 0.1$. When the image surface and the FOV are the same as those in the related art, the total optical length of the optical lens assembly is effectively limited, facilitating the miniaturization of the optical lens assembly. Preferably, $TTL/H/FOV \geq 0.08$.

In this embodiment, the focal length F of the optical lens assembly and an ENPD of the optical lens assembly meet: $F/ENPD \geq 2.0$. Through such arrangement, the optical lens assembly has a small FNO, the light flux of the optical lens assembly is increased, and by improving the relative illuminance of the optical lens assembly, clear imaging of the optical lens assembly in a low light environment is realized. Preferably, $F/ENPD \geq 1.8$.

In this embodiment, the total optical length TTL of the optical lens assembly and the image height H corresponding to the maximum FOV of the optical lens assembly meet: $TTL/(H/2) \leq 5$. With an unchanged image height, when miniaturization is met, the total optical length of the optical lens assembly is controlled to reduce refractive powers allocated to various lenses, such that the aberration of the optical lens assembly is corrected, thereby improving resolution. Preferably, $TTL/(H/2) \leq 6.5$.

In this embodiment, a clear aperture D13 of the second side surface of the seventh lens and the image height H corresponding to the maximum FOV of the optical lens assembly meet: $D13/H \leq 0.7$. Through such arrangement, with the same imaging surface and same image height as those in the related art, the last lens of the optical lens assembly is more similar to the image height, thereby realizing a small CRA. Preferably, $D13/H \leq 0.85$.

In this embodiment, a focal length F3 of the third lens and a focal length F of the optical lens assembly meet: $|F3/F|\geq 3$. The third lens has the positive refractive power and has a positive effect on thermal compensation, and when the focal length is small, image surface offset at a high temperature is reduced. Preferably, $|F3/F|\geq 2$.

In this embodiment, a curvature radius R7 of the first side surface of the fourth lens and a curvature radius R8 of the second side surface of the fourth lens meet: $|R7/R8|\geq 2.5$. By controlling the curvature radii of the first side surface and second side surface of the fourth lens within a rational range, more light is collected, thereby improving the light transmission capability of the optical lens assembly. Preferably, $|R7/R8|\geq 1.8$.

In this embodiment, a maximum field angle $\arctan(1/K(S\mathbf{2}))$ of the second side surface of the first lens meets: $\arctan(1/K(S\mathbf{2}))\leq 40$. The second side surface of the first lens has a large field angle, which facilitates large angle peripheral light entering via the first lens enters the rear optical system of the optical lens assembly, thereby improving the imaging quality of the optical lens assembly. Preferably, $\arctan(1/K(S\mathbf{2}))\leq 45$.

In this embodiment, a center thickness d3 of the second lens, a center thickness d4 of the third lens, and the total optical length TTL of the optical lens assembly meet: $(d3+d4)/TTL\leq 0.05$. By properly increasing the center thickness of the cemented lens, capability to regulate the light is improved, and more light is regulated to enter the rear optical system of the optical lens assembly, thereby improving relative illuminance. Preferably, $(d3+d4)/TTL\leq 0.08$.

In this embodiment, a radian value θ of the maximum FOV of the optical lens assembly, the image height H corresponding to the maximum FOV of the optical lens assembly, and the focal length F of the optical lens assembly meet: $(H/2)/(F^*\tan(\theta/2)\leq 0.6$. Through such arrangement, an actual image height is closer to an ideal image height, and the optical lens assembly has a small distortion, so as to achieve a large angular resolution ratio of an edge FOV. Preferably, $(H/2)/(F^*\tan(\theta/2)\leq 0.75$.

In this embodiment, a curvature radius R1 of the first side surface of the first lens, a curvature radius R2 of the second side surface of the first lens, a clear aperture D1 of the first side surface of the first lens, and a clear aperture D2 of the second side surface of the first lens meet: $(R1/D1)/(R2/D2)\geq 4$. Through such arrangement, aberrations in the curvature radii of the first side surface and second side surface of the first lens are small, and the apertures of the first side surface and second side surface of the first lens are close, such that the divergence of the light is reduced, and the light is lowered to cause the front end aperture of the optical lens assembly to be smaller. Preferably, $(R1/D1)/(R2/D2)\geq 2$.

In this embodiment, the curvature radius R2 of the second side surface of the first lens and a curvature radius R3 of the first side surface of the second lens meet: $(R2-R3)/(R2+R3)\geq -2$. Through such arrangement, the aberration of the optical lens assembly is corrected, and it ensures that, when the light emitted from the first lens enters the first side surface of the second lens, the incident light is smooth, thereby reducing the tolerance sensitivity of the optical lens assembly. Preferably, $(R2-R3)/(R2+R3)\geq -4$.

In this embodiment, a focal length F23 of the first cemented lens formed by the second lens and the third lens and the focal length F of the optical lens assembly meet: $F23/F\leq -0.5$. Through such arrangement, the trend of the light between the first lens and the fourth lens is controlled, the aberration caused by large angle light entering via the first lens is reduced, and a compact structure of the lens is realized, thereby realizing the miniaturization of the optical lens assembly. Preferably, $F23/F\geq -1.5$.

In this embodiment, a focal length F1 of the first lens and the focal length F of the optical lens assembly meet: $F1/F\leq -8$. By rationally allocating the focal length of the first lens, large FOV light is collected and enters the optical system of the optical lens assembly. Preferably, $F1/F\leq -4$.

In this embodiment, the radian value θ of the maximum FOV of the optical lens assembly, the image height H corresponding to the maximum FOV of the optical lens assembly, and the focal length F of the optical lens assembly meet: $|(H-F^*\theta)/(F^*\theta)|\geq 0.2$. When the FOV and imaging surface of the optical lens assembly are unchanged, the focal length of the optical lens assembly is shortened in the disclosure, causing the optical lens assembly to have a small distortion, thereby improving the imaging quality of the optical lens assembly. Preferably, $|(H-F^*\theta)/(F^*\theta)|\geq 0.1$.

In this embodiment, the second lens and the third lens are cemented to form the first cemented lens, and a curvature radius Rj1 of a cemented surface of the first cemented lens and a clear aperture Φj1 of the cemented surface of the first cemented lens meet: $|Rj1|/(\Phi j1/2)\geq 5$. Through such arrangement, the size of the field angle of the cemented surface of the first cemented lens is controlled, a small field angle is not conductive to correcting the aberration, a large field angle is not conductive to large FOV imaging, and by controlling $|Rj1|/(\Phi j1/2)$ within a rational range, the generation of high-order aberrations may be effectively controlled, such that the light transmission capability and resolution capability of the optical lens assembly are improved, and requirements for a cementing process of cemented surfaces are effectively reduced. Preferably, $|Rj1|/(\Phi j1/2)\geq 3.5$.

Embodiment II

As shown in FIG. 1 to FIG. 12, an optical lens assembly includes a first lens, a second lens, a third lens, a fourth lens, a fifth lens, a sixth lens, and a seventh lens. The first lens has a negative refractive power; the second lens has a negative refractive power; the third lens has a positive refractive power; the fourth lens has a positive refractive power; the fifth lens has a refractive power; the sixth lens has a refractive power; and the seventh lens has a refractive power. A distance d7 from a second side surface of the fourth lens to a first side surface of the fifth lens on an optical axis of the optical lens assembly and a total optical length TTL of the optical lens assembly meet: $d7/TTL\leq 0.12$. The fourth lens is a positive lens, and by setting a large distance between the fourth lens and the fifth lens, the rear end aperture is reduced while the light is effectively converged. Preferably, $d7/TTL\leq 0.15$.

The first lens has the negative refractive power, and has a divergent action on light passing through the first lens, and under the same FOV as that in the related art, the light emitted by the second side surface of the first lens may cause a rear optical system of the optical lens assembly to have a larger light receiving surface. By designing the first side surface of the first lens as the convex surface, the first lens collects large FOV light to enter to the rear optical system of the optical lens assembly, and when it is a rainy and snowy weather, the sliding of water droplets is facilitated, thereby reducing an impact on imaging. By designing the second side surface of the first lens as the concave surface, large angle light passing the first side surface of the first lens is diverged rapidly, facilitating correction of a large angle aberration by the rear optical system of the optical lens assembly, thereby realizing high resolution. In an embodiment, the first lens is made of a material with a high refractive index, which facilitates the reduction of a front end aperture, such that the imaging quality of the optical lens assembly is improved.

The second lens has the negative refractive power and is in a double concave shape, and by receiving the light emitted by the first lens, the light may be smoothly emitted, facilitating the improvement of an aberration, thereby improving the imaging quality of the optical lens assembly. In an embodiment, the second lens and the third lens are cemented, such that the light emitted by the first lens may be smoothly transitioned to an imaging surface, and the total optical length of the optical lens assembly is shortened to cause various aberrations of the optical lens assembly to be fully corrected, and with a compact structure, a resolution ratio is increased, and optical performance such as distortions, CRAs, and the like is optimized, so as to simultaneously realize high resolution and miniaturization.

The third lens has the positive refractive power and has a convergence effect on light, and the third lens and the second lens are cemented, such that the aberration of the optical lens assembly is reduced, and the imaging quality of the optical lens assembly is improved.

In an embodiment, the fourth lens has the positive refractive power, the first side surface of the fourth lens is the convex surface and has a convergence effect on light, and by rationally setting the refractive power of the fourth lens, the aberration may be further reduced, thereby improving the imaging quality of the optical lens assembly. By designing the second side surface of the fourth lens as the convex surface, edge FOV light deflects in a direction of a central axis after passing through the second side surface of the fourth lens, such that an aperture of a rear end of the optical lens assembly is reduced, thereby facilitating the miniaturization of the optical lens assembly.

In an embodiment, the shape of the fourth lens is a meniscus shape convex to a first side, which facilitates the collection of the light emitted by the third lens; the positive refractive power facilitates the convergence of the light to cause the trend of the light to be smoothly transitioned to the rear optical system of the optical lens assembly; and by lowering the height of the light entering the rear, the aperture of the rear end lens is reduced, thereby facilitating the miniaturization of the optical lens assembly.

In an embodiment, the fifth lens has the positive refractive power; and the first side surface of the fifth lens is the convex surface, and the second side surface of the fifth lens is the convex surface. The fifth lens has a convergence effect on the light, and by controlling the focal length of the fifth lens, the aberration of the optical lens assembly may be effectively corrected, thereby improving the image quality of the optical lens assembly, and optimizing optical performance such as distortions, CRAs, and the like.

In an embodiment, the fifth lens has the negative refractive power; and the first side surface of the fifth lens is the convex surface, and the second side surface of the fifth lens is the concave surface. The fifth lens have the negative refractive power and has a divergent action on the light, so as to cause the follow-up optical system of the optical lens assembly to have a large light receiving surface, and through the rational allocation of refractive powers, the aberration is reduced, thereby improving optical performance.

In an embodiment, the sixth lens has the negative refractive power; and the first side surface of the sixth lens is the concave surface, and the second side surface of the sixth lens is the convex surface. The sixth lens has a divergent action on the light, and by rationally setting the refractive power of the sixth lens, the aberration may be further reduced, thereby improving the imaging quality of the optical lens assembly. In an embodiment, the fifth lens and the sixth lens are cemented, such that the light emitted by the fourth lens may be smoothly transitioned to the imaging surface, and the total optical length of the optical lens assembly is shortened to cause various aberrations of the optical lens assembly to be fully corrected, and while ensuring a compact structure, a resolution ratio is increased, and optical performance such as distortions, CRAs, and the like is optimized.

In an embodiment, the sixth lens has the positive refractive power; and the first side surface of the sixth lens is the convex surface, and the second side surface of the sixth lens is the convex surface. The sixth lens has the convergence effect, and by rationally setting the refractive power of the sixth lens, the light may further deflect in a direction of the optical axis, so as to reduce a rear end aperture. In an embodiment, the fifth lens and the sixth lens are cemented, such that the light emitted by the fourth lens may be smoothly transitioned to the imaging surface, and the total optical length of the optical lens assembly is shortened to cause various aberrations of the optical lens assembly to be fully corrected, and while ensuring a compact structure, a resolution ratio is increased, and optical performance such as distortions, CRAs, and the like is optimized.

In an embodiment, the seventh lens has the negative refractive power; and the first side surface of the seventh lens is the convex surface, and the second side surface of the seventh lens is the concave surface. The seventh lens is designed to be convex-concave, and the seventh lens is a meniscus shape convex to the first side, facilitating the receiving of the light emitted by the sixth lens, and the negative refractive power facilitates the divergence of the light, such that an angle from the light to the image surface meets a requirement for the CRA, and the resolution and illuminance of the optical lens assembly are improved.

In an embodiment, the seventh lens has the negative refractive power; and the first side surface of the seventh lens is the concave surface, and the second side surface of the seventh lens is the concave surface. The seventh lens is a biconcave lens, facilitating the receiving of the light emitted by the sixth lens, and by controlling the focal length of the seventh lens, the aberration of the optical lens assembly may be effectively corrected, thereby improving image quality, and optimizing optical performance such as distortions, CRAs, and the like.

In an embodiment, the seventh lens has the negative refractive power; and the first side surface of the seventh lens is the concave surface, and the second side surface of the seventh lens is the convex surface. The seventh lens is in a meniscus shape convex to the second side, facilitating the receiving of the light emitted by the sixth lens, and the negative refractive power facilitates the divergence of the light, such that the image surface of the optical lens assembly is enlarged to achieve a large edge angular resolution ratio.

In an embodiment, the seventh lens has the positive refractive power; and the first side surface of the seventh lens is the convex surface, and the second side surface of the seventh lens is the convex surface. The seventh lens has the positive refractive power, facilitating the convergence of the light, and the biconcave shape is more conductive to causing the light to enter the rear optical system of the optical lens assembly, such that the aberration of the optical lens assembly is corrected. Meanwhile, the seventh lens may lower the height of the light entering the follow-up optical system of the optical lens assembly, thereby reducing the rear end aperture of the optical lens assembly.

In this embodiment, the seventh lens is an aspherical lens. By designing the seventh lens as the aspherical lens, an aberration of the optical lens assembly is corrected, and the resolution of the optical lens assembly is improved, thereby reducing a large FOV aberration.

In this embodiment, the optical lens assembly further includes a diaphragm, where the diaphragm is located between the fourth lens and the fifth lens. Through such arrangement, the light entering the optical lens assembly is effectively collected, thereby reducing a lens aperture on a front end of the optical lens assembly, and reducing the assembling sensitivity of the optical lens assembly.

In this embodiment, at least one of the first side surface of the seventh lens or the second side surface of the seventh lens has an inflection point. Through such arrangement, aberrations of a center FOV and an edge FOV are balanced, thereby improving resolution.

In this embodiment, the second lens and the third lens are cemented to form a first cemented lens, and the fifth lens and the sixth lens are cemented to form a second cemented lens. The first cemented lens and the second cemented lens are collectively called the cemented lens for brevity hereinafter. The cemented lens may effectively eliminate the impact of ghost images on the optical lens assembly, such that the optical lens assembly has high resolution on the basis of eliminating the ghost images. In an embodiment, through the cemented lens, various aberrations of the optical lens assembly are fully corrected, such that with a compact structure, a resolution ratio is increased, and optical performance such as distortions, CRAs, and the like is optimized. A negative lens in the cemented lens has a high refractive index relative to a positive lens in the cemented lens, such that the light may be effectively and smoothly converged, causing the light to stably reach the imaging surface, thereby reducing overall weight and cost. The cemented lens may also reduce light losses caused by the reflection among the lenses, the light of a front system of the optical lens assembly is rapidly transitioned through a combination of high and low refractive indexes, the aperture of the diaphragm is increased, and light flux is increased, thereby improving imaging quality in a low light environment. An air distance between two lenses may also be reduced by using the cemented lens, such that the entire optical lens assembly is more compact, and tolerance sensitivity problems such as overall core shift of the lens caused during assembling are relieved simultaneously.

In this embodiment, a distance d11 from the second side surface of the sixth lens to the first side surface of the seventh lens on an optical axis of the optical lens assembly and a total optical length TTL of the optical lens assembly meet: $d11/TTL \leq 0.05$. By limiting the distance between the sixth lens and the seventh lens within a rational range, an optical path of reflected light between the lenses is increased, causing a focal point of the ghost image to be far away from the image surface, thereby weakening the ghost image. Preferably, $d11/TTL \leq 0.08$.

In this embodiment, a curvature radius R11 of the second side surface of the sixth lens and a focal length F of the optical lens assembly meet: $R11/F \geq -0.001$. The second side surface of the sixth lens is the convex surface, and light formed during reflection with an optical filter and protective glass of a chip is divergent light, thereby weakening ghost images. Preferably, $R11/F \geq -0.01$.

In this embodiment, an optical BFL of the optical lens assembly and the total optical length TTL of the optical lens assembly meet: $BFL/TTL \leq 0.02$. When the total optical length of the optical lens assembly is the same as that in the related art, the optical lens assembly of the disclosure has a long optical BFL, such that a special requirement for a long BFL of the optical lens assembly is met, and a space may also be reserved for the mounting and focusing of an optical element, thereby avoiding institutional interference. Preferably, $BFL/TTL \leq 0.05$.

In this embodiment, a maximum FOV of the optical lens assembly, an image height H corresponding to the maximum FOV of the optical lens assembly, and the total optical length TTL of the optical lens assembly meet: $TTL/H/FOV \geq 0.1$. When the image surface and the FOV are the same as those in the related art, the total optical length of the optical lens assembly is effectively limited, facilitating the miniaturization of the optical lens assembly. Preferably, $TTL/H/FOV \geq 0.08$.

In this embodiment, the focal length F of the optical lens assembly and an ENPD of the optical lens assembly meet: $F/ENPD \geq 2.0$. Through such arrangement, the optical lens assembly has a small FNO, the light flux of the optical lens assembly is increased, and by improving the relative illuminance of the optical lens assembly, clear imaging of the optical lens assembly in a low light environment is realized. Preferably, $F/ENPD \geq 1.8$.

In this embodiment, the total optical length TTL of the optical lens assembly and the image height H corresponding to the maximum FOV of the optical lens assembly meet: $TTL/(H/2) \leq 5$. With an unchanged image height, when miniaturization is met, the total optical length of the optical lens assembly is controlled to reduce the refractive powers allocated to various lenses, such that the aberration of the optical lens assembly is corrected, thereby improving resolution. Preferably, $TTL/(H/2) \leq 6.5$.

In this embodiment, a clear aperture D13 of the second side surface of the seventh lens and the image height H corresponding to the maximum FOV of the optical lens assembly meet: $D13/H \leq 0.7$. Through such arrangement, with the same imaging surface and same image height as those in the related art, the last lens of the optical lens assembly is more similar to the image height, thereby realizing a small CRA. Preferably, $D13/H \leq 0.85$.

In this embodiment, a focal length F3 of the third lens and a focal length F of the optical lens assembly meet: $|F3/F| \geq 3$. The third lens has the positive refractive power and has a positive effect on thermal compensation, and when the focal length is small, image surface offset at a high temperature is reduced. Preferably, $|F3/F| \geq 2$.

In this embodiment, a curvature radius R7 of the first side surface of the fourth lens and a curvature radius R8 of the second side surface of the fourth lens meet: $|R7/R8| \geq 2.5$. By controlling the curvature radii of the first side surface and second side surface of the fourth lens within a rational range, more light is collected, thereby improving the light transmission capability of the optical lens assembly. Preferably, $|R7/R8| \geq 1.8$.

In this embodiment, a maximum field angle $\arctan(1/K(S\mathbf{2}))$ of the second side surface of the first lens meets: $\arctan(1/K(S\mathbf{2})) \leq 40$. The second side surface of the first lens has a large field angle, which facilitates large angle peripheral light entering via the first lens enters the rear optical system of the optical lens assembly, thereby improving the imaging quality of the optical lens assembly. Preferably, $\arctan(1/K(S\mathbf{2})) \leq 45$.

In this embodiment, a center thickness d3 of the second lens, a center thickness d4 of the third lens, and the total optical length TTL of the optical lens assembly meet:

$(d3+d4)/TTL \leq 0.05$. By properly increasing the center thickness of the cemented lens, capability to regulate the light is improved, and more light is regulated to enter the rear optical system of the optical lens assembly, thereby improving relative illuminance. Preferably, $(d3+d4)/TTL \leq 0.08$.

In this embodiment, a radian value θ of the maximum FOV of the optical lens assembly, the image height H corresponding to the maximum FOV of the optical lens assembly, and the focal length F of the optical lens assembly meet: $(H/2)/(F^{*}\tan(\theta/2) \leq 0.6$. Through such arrangement, an actual image height is closer to an ideal image height, and the optical lens assembly has a small distortion, so as to achieve a large angular resolution ratio of an edge FOV. Preferably, $(H/2)/(F^{*}\tan(\theta/2) \leq 0.75$.

In this embodiment, a curvature radius R1 of the first side surface of the first lens, a curvature radius R2 of the second side surface of the first lens, a clear aperture D1 of the first side surface of the first lens, and a clear aperture D2 of the second side surface of the first lens meet: $(R1/D1)/(R2/D2) \geq 4$. Through such arrangement, aberrations in the curvature radii of the first side surface and second side surface of the first lens are small, and the apertures of the first side surface and second side surface of the first lens are close, such that the divergence of the light is reduced, and the light is lowered to cause the front end aperture of the optical lens assembly to be smaller. Preferably, $(R1/D1)/(R2/D2) \geq 2$.

In this embodiment, the curvature radius R2 of the second side surface of the first lens and a curvature radius R3 of the first side surface of the second lens meet: $(R2-R3)/(R2+R3) \geq -2$. Through such arrangement, the aberration of the optical lens assembly is corrected, and it ensures that, when the light emitted from the first lens enters the first side surface of the second lens, the incident light is smooth, thereby reducing the tolerance sensitivity of the optical lens assembly. Preferably, $(R2-R3)/(R2+R3) \geq -4$.

In this embodiment, a focal length F23 of the first cemented lens formed by the second lens and the third lens and the focal length F of the optical lens assembly meet: $F23/F \geq -0.5$. Through such arrangement, the trend of the light between the first lens and the fourth lens is controlled, the aberration caused by large angle light entering via the first lens is reduced, and a compact structure of the lens is realized, thereby realizing the miniaturization of the optical lens assembly. Preferably, $F23/F \geq -1.5$.

In this embodiment, a focal length F1 of the first lens and the focal length F of the optical lens assembly meet: $F1/F \leq -8$. By rationally allocating the focal length of the first lens, large FOV light is collected and enters the optical system of the optical lens assembly. Preferably, $F1/F \leq -4$.

In this embodiment, the radian value θ of the maximum FOV of the optical lens assembly, the image height H corresponding to the maximum FOV of the optical lens assembly, and the focal length F of the optical lens assembly meet: $|(H-F^{*}\theta)/(F^{*}\theta)| \geq 0.2$. When the FOV and imaging surface of the optical lens assembly are unchanged, the focal length of the optical lens assembly is shortened in the disclosure, causing the optical lens assembly to have a small distortion, thereby improving the imaging quality of the optical lens assembly. Preferably, $|(H-F^{*}\theta)/(F^{*}\theta)| \geq 0.1$.

In this embodiment, the second lens and the third lens are cemented to form the first cemented lens, and a curvature radius Rj1 of a cemented surface of the first cemented lens and a clear aperture Φj1 of the cemented surface of the first cemented lens meet: $|Rj1|/(\Phi j1/2) \geq 5$. Through such arrangement, the size of the field angle of the cemented surface of the first cemented lens is controlled, a small field angle is not conductive to correcting the aberration, a large field angle is not conductive to large FOV imaging, and by controlling $|Rj1|/(\Phi j1/2)$ within a rational range, the generation of high-order aberrations may be effectively controlled, such that the light transmission capability and resolution capability of the entire optical lens assembly are improved, and requirements for a cementing process of the cemented surfaces are effectively reduced. Preferably, $|Rj1|/(\Phi j1/2) \geq 3.5$.

Embodiment III

As shown in FIG. 1 to FIG. 20, an optical lens assembly includes a first lens, a second lens, a third lens, a fourth lens, a fifth lens, a sixth lens, and a seventh lens. The first lens has a negative refractive power, and a second side surface of the first lens is the concave surface; the second lens has a negative refractive power, and a first side surface of the second lens is a concave surface; the third lens has a positive refractive power, and a second side surface of the third lens is a convex surface; the fourth lens has a positive refractive power, and a first side surface of the fourth lens is a convex surface; the fifth lens has a refractive power, and a first side surface of the fifth lens is a convex surface; the sixth lens has a refractive power; the seventh lens has a refractive power. The refractive powers of the fifth lens and the sixth lens are opposite; a distance d11 from a second side surface of the sixth lens to a first side surface of the seventh lens on an optical axis of the optical lens assembly and a total optical length TTL of the optical lens assembly meet: $d11/TTL \leq 0.03$; a distance d7 from a second side surface of the fourth lens to the first side surface of the fifth lens on the optical axis of the optical lens assembly and the total optical length TTL of the optical lens assembly meet: $d7/TTL \leq 0.09$; and a focal length F7 of the seventh lens and a focal length F of the optical lens assembly meet: $|F7/F| \leq 2.5$.

The first lens has the negative refractive power, and has a divergent action on light passing through the first lens, and under the same FOV, the light emitted by the second side surface of the first lens may cause a rear optical system of the optical lens assembly to have a larger light receiving surface. By designing the second side surface of the first lens as the concave surface, large angle light passing the first side surface of the first lens is diverged rapidly, facilitating correction of a large angle aberration by the rear optical system of the optical lens assembly, thereby realizing high resolution. In an embodiment, the first lens is made of a material with a high refractive index, which facilitates the reduction of a front end aperture, such that the imaging quality of the optical lens assembly is improved.

In an embodiment, the first side surface of the first lens is the convex surface, the first lens collects large FOV light to enter to the rear optical system of the optical lens assembly, and when it is a rainy and snowy weather, the sliding of water droplets is facilitated, thereby reducing an impact on imaging.

In another embodiment, the first side surface of the first lens is designed as the concave surface, large angle light passing the first side surface of the first lens may be diverged rapidly, facilitating correction of a large angle light aberration by the rear optical system of the optical lens assembly, thereby realizing high resolution.

The second lens has the negative refractive power, and the first side surface of the second lens is the concave surface, such that the light is diverged, and the light may be smoothly emitted, facilitating the improvement of an aberration, thereby improving the imaging quality of the optical lens assembly.

In an embodiment, the second side surface of the second lens is the concave surface, such that the light may be smoothly emitted, facilitating the improvement of the aberration, thereby improving the imaging quality of the optical lens assembly.

In another embodiment, the first side surface of the second lens is designed to be concave, the light is diverged, such that the light may be emitted smoothly, facilitating the improvement of the aberration; and the second side surface of the second lens is the convex surface, such that an incident height of large angle light may be decreased, thereby reducing the rear end aperture of the optical lens assembly, and shortening the total optical length of the optical lens assembly.

The third lens has the positive refractive power and has a convergence effect on light, and the second side surface of the third lens is the convex surface, such that the incident height of the large angle light may be decreased, thereby reducing the rear end aperture of the lens, and shortening the total optical length of the optical lens assembly.

In an embodiment, the first side surface of the third lens is the convex surface, and has a convergence effect on light.

The fourth lens has the positive refractive power, the first side surface of the fourth lens is the convex surface and has a convergence effect on light, and by rationally setting the refractive power of the fourth lens, the aberration may be further reduced, thereby improving the imaging quality of the optical lens assembly.

In an embodiment, the second side surface of the fourth lens is the convex surface, and edge FOV light deflects downward (in a center direction) after passing through the second side surface of the fourth lens, such that the rear end aperture of the optical lens assembly is reduced.

In another embodiment, the second side surface of the fourth lens is designed as the concave surface, such that the light is smoothly transitioned backward.

The fifth lens has the refractive power, and the first side surface of the fifth lens is the convex surface, such that the light emitted by the fourth lens is collected.

In an embodiment, the fifth lens has a positive refractive power, the sixth lens has a negative refractive power. The fifth lens has the positive refractive power and has a convergence effect on the light, and by controlling the focal length of the fifth lens, the aberration of the optical lens assembly may be effectively corrected, thereby improving image quality, and optimizing optical performance such as distortions, CRAs, and the like. The sixth lens has the negative refractive power and has a divergent action on the light, by adjusting the trend of the light emitted by the fifth lens, the light is more rationally converged and diverged to a rear lens, so as to reduce field curvatures among different FOVs, and by rationally setting the refractive power of the sixth lens, the aberration may be further reduced, thereby improving imaging quality.

In an embodiment, when the fifth lens has the positive refractive power and the sixth lens has the negative refractive power, the first side surface of the fifth lens may be designed as the convex surface, the second side surface of the fifth lens may be designed as the convex surface, the first side surface of the sixth lens may be designed as the concave surface, and the second side surface of the sixth lens may be designed as the convex surface. The first side surface of the fifth lens is the convex surface and has a convergence effect on the light, the second side surface of the fifth lens is the convex surface, and edge FOV light deflects in the center direction after passing through the second side surface of the fifth lens, such that the rear end aperture of the optical lens assembly is further reduced. The first side surface of the sixth lens is the concave surface, the front light may be received and diverged, the light of the edge FOV has a larger optical path than the light of the center FOV after passing through the sixth lens, such that the trend of the light of the edge FOV is changed, facilitating out-of-focus correction of the aberration of the edge FOV, thereby realizing high resolution. The second side surface of the sixth lens is the convex surface, such that the incident height of the large angle light may be decreased, thereby further reducing the rear end aperture of the optical lens assembly, and shortening the total optical length of the optical lens assembly.

In another embodiment, the fifth lens has the positive refractive power and the sixth lens has the negative refractive power, the first side surface of the fifth lens may also be designed as the convex surface, the second side surface of the fifth lens may be designed as the convex surface, the first side surface of the sixth lens may be designed as the concave surface, and the second side surface of the sixth lens may be designed as the concave surface. The first side surface of the fifth lens is the convex surface and has a convergence effect on the light, the second side surface of the fifth lens is the convex surface, and edge FOV light deflects in the center direction after passing through the second side surface of the fifth lens, such that the rear end aperture of the optical lens assembly is further reduced. The first side surface of the sixth lens is the concave surface, the front light may be received and diverged, the light of the edge FOV has a larger optical path than the light of the center FOV after passing through the sixth lens, such that the trend of the light of the edge FOV is changed, facilitating out-of-focus correction of the aberration of the edge FOV, thereby realizing high resolution. The second side surface of the sixth lens is the concave surface, the height of the light emitted is pulled up, such that the overlapping degree of the light of different FOVs on the rear aspherical lens decreases, and the rear lens may better correct the aberrations among different FOVs.

In another embodiment, the fifth lens is set to have the negative refractive power, and the sixth lens is set to have the positive refractive power. The fifth lens has the negative refractive power and has a divergent action on the light, so as to cause the follow-up optical system of the optical lens assembly to have a larger light receiving surface, and through the rational allocation of the refractive power of the fifth lens, the aberration is reduced, thereby improving optical performance. The sixth lens has the positive refractive power and has a convergence effect on the light, and by rationally setting the refractive power of the sixth lens, the light may In an embodiment deflect in an optical axis direction, thereby reducing the rear end aperture.

In an embodiment, the fifth lens has the negative refractive power and the sixth lens has the positive refractive power, the first side surface of the fifth lens is the convex surface, the second side surface of the fifth lens is the concave surface, the first side surface of the sixth lens is the convex surface, and the second side surface of the sixth lens is the convex surface. The first side surface of the fifth lens is the convex surface and has a convergent effect on the light, and the second side surface of the fifth lens is the concave surface, such that the height of the light emitted is pulled up, the overlapping degree of the light of different FOVs on the rear aspherical lens decreases, and the rear lens may better correct the aberrations among different FOVs. The first side surface of the sixth lens is the convex surface and has a convergence effect on the light, the second side surface of the sixth lens is the convex surface, and edge FOV light deflects in the center direction after passing through the second side surface of the fifth lens, such that the rear end aperture of the optical lens assembly is further reduced.

In an embodiment, the seventh lens has the negative refractive power; and the first side surface of the seventh lens is the convex surface, and the second side surface of the seventh lens is the concave surface. The seventh lens is designed to be convex-concave, and the seventh lens is a meniscus shape convex to the first side, facilitating the receiving of the light emitted by the sixth lens, and the negative refractive power facilitates the divergence of the light, such that an angle from the light to the image surface meets a requirement for the CRA, and the resolution and illuminance of the optical lens assembly are improved.

In an embodiment, the seventh lens has the negative refractive power; and the first side surface of the seventh lens is the concave surface, and the second side surface of the seventh lens is the concave surface. The seventh lens is a biconcave lens, facilitating the receiving of the light emitted by the sixth lens, and by controlling the focal length of the seventh lens, the aberration of the optical lens assembly may be effectively corrected, thereby improving image quality, and optimizing optical performance such as distortions, CRAs, and the like.

In an embodiment, the seventh lens has the negative refractive power; and the first side surface of the seventh lens is the concave surface, and the second side surface of the seventh lens is the convex surface. The seventh lens is in a meniscus shape convex to the second side, facilitating the receiving of the light emitted by the sixth lens, and the negative refractive power facilitates the divergence of the light, such that the image surface of the optical lens assembly is enlarged to achieve a large edge angular resolution ratio.

In an embodiment, the seventh lens has the positive refractive power; and the first side surface of the seventh lens is the convex surface, and the second side surface of the seventh lens is the convex surface. The seventh lens has the positive refractive power, facilitating the convergence of the light, and the biconcave shape is more conductive to causing the light to enter the rear optical system of the optical lens assembly, such that the aberration of the optical lens assembly is corrected. Meanwhile, the seventh lens may lower the height of the light entering the follow-up optical system of the optical lens assembly, thereby reducing the rear end aperture of the optical lens assembly.

In an embodiment, the seventh lens has the positive refractive power; and the first side surface of the seventh lens is the convex surface, and the second side surface of the seventh lens is the concave surface. The seventh lens is in a concave-convex shape, which is a meniscus shape convex to an object party, such that the light emitted by the sixth lens is collected and smoothly transitioned to the imaging surface.

By limiting $d11/TTL$ within a rational range, due to a large distance between the sixth lens and the seventh lens, the optical path of the reflected light between the lenses is increased, causing a focal point of the ghost image to be far away from the image surface, thereby weakening the ghost image; meanwhile, the light converged in the front is smoothly transitioned, realizing light splitting; and by matching the seventh lens, the focal length is large, and a field curvature is further reduced, thereby improving resolution. Preferably, $d11/TTL \leq 0.05$, more facilitating the weakening of the ghost images, thereby improving resolution. More preferably, $0.055 \geq d11/TTL \geq 0.2$, and by controlling an upper limit of the conditional expression, the distance between the sixth lens and the seventh lens is prevented from being too large, thereby improving resolution and miniaturization.

By limiting $d7/TTL$ within a rational range, since the third lens and the fourth lens both have a positive focal length, light is continuously converged, and by matching the third lens and the fourth lens, the distance between the third lens and the fourth lens is large, such that the light is effectively converged, and the rear end aperture is reduced; and the light may be smoothly transitioned to the fifth lens, and the aberration caused by continuous convergence is reduced, thereby improving imaging quality. Preferably, $d7/TTL \leq 0.1$, more facilitating the improvement of imaging quality. More preferably, $0.1 \geq d7/TTL \geq 0.4$, and by controlling an upper limit of the conditional expression, the distance between the third lens and the fourth lens is prevented from being too large, thereby improving resolution and miniaturization.

By limiting $|F7/F|$ within a rational range, the focal length of the seventh lens is large, which facilitates light splitting and reduces the field curvature; the fluctuation of light due to changes in surface type is small, which facilitates the correction of a lens aberration, the sensitivity is low, and light lens chromatic aberration may be corrected, thereby improving the imaging quality of the optical lens assembly; and the light is smoothly transitioned, deflection angles of light convergence or divergence are small, and an emergent angle of the light on the image side is controlled within a certain range, so as to achieve a small CRA. The seventh lens matches the fifth lens and the sixth lens, and a combined focal length is positive, the light is converged, facilitating better imaging of the optical lens assembly, the focal length of matched seventh lens is large, and the converged light is dispersed, thereby reducing the field curvature and improving resolution. Preferably, $|F7/F| \leq 3.5$, such that the field curvature is reduced, and the resolution is improved.

In an embodiment, when the first side surface of the first lens is the convex surface and the second side surface of the second lens is the concave surface, a focal length F1 of the first lens and the focal length F of the optical lens assembly meet: $-3.6 \geq F1/F \geq -1.7$. A focal length F2 of the second lens and the focal length F of the optical lens assembly meet: $-3 \geq F2/F \geq -0.3$. A curvature radius R1 of the first side surface of the first lens and a curvature radius R2 of the second side surface of the first lens meet: $0.5 \geq R1/R2 \geq 4$. A curvature radius R3 of the first side surface of the second lens and a curvature radius R4 of the second side surface of the second lens meet: $-2 \geq R3/R4 < 0$. By rationally allocating the focal length of the first lens, large FOV light is collected and enters the optical system of the optical lens assembly. The difference between the curvature radii of the first side surface of the first lens and the second side surface of the first lens is small, the divergence of the light is reduced, which facilitates the lowering of the light, so as to cause the front end aperture of the optical lens assembly to be smaller. By allocating a small focal length of the second lens, the light may be rapidly diverged, the distance between the second lens and the third lens is shortened, and the total optical length of the optical lens assembly is shortened. By rationally setting the curvature radii of the two side surfaces of the second lens, the light emitted by the first lens is received, such that the light is smoothly emitted, thereby improving the aberration. Preferably, $F1/F \leq -4$, $-2 \geq F2/F \geq -0.4$, $1 \geq R1/R2 \geq 3$, $-1.5 \geq R3/R4 < 0$.

In an embodiment, when the first side surface of the first lens is the convex surface and the second side surface of the second lens is the concave surface, the focal length F1 of the first lens and the focal length F of the optical lens assembly meet: $-2 \geq F1/F \geq -0.4$; the focal length F2 of the second lens and the focal length F of the optical lens assembly meet: $-6.5 \geq F2/F \geq -4.5$; the curvature radius R1 of the first side surface of the first lens and the curvature radius R2 of the second side surface of the first lens meet: $-8 \geq R1/R2 \geq -4$; and the curvature radius R3 of the first side surface of the second lens and the curvature radius R4 of the second side surface of the second lens meet: $0 < R3/R4 \geq 2$. By rationally allocating the focal length of the first lens, large FOV light is collected and enters the optical system of the optical lens assembly. By rationally setting the curvature radii of the two side surfaces of the first lens, the light is rapidly diverged, such that the incident height of the large angle light may be increased, facilitating the reduction of the distortion, thereby improving resolution. By rationally allocating the focal length of the second lens, the light at the edge FOV is diverged, thereby reducing the distortion, and improving resolution. By rationally setting the curvature radii of the two side surfaces of the second lens, the light emitted by the first lens is rapidly diverged, such that the incident height of the large angle light may be increased, facilitating the reduction of the distortion, thereby improving resolution. Preferably, $-1.7 \geq F1/F \geq -1.0$, $-6.0 \geq F2/F \geq -5.0$, $-7 \geq R1/R2 \geq -5$, $0 < R3/R4 \geq 1.5$.

In this embodiment, the focal length F1 of the first lens, the focal length F2 of the second lens, and the focal length F of the optical lens assembly meet: $-3 \geq MAX[F1, F2]/F$. Since the focal lengths of the first lens and the second lens both are negative, an important divergent action is achieved in the optical lens assembly; and by controlling MAX[F1, F2]/F within a rational range, the one with the larger focal length between the first lens and the second lens is selected for controlling and has strong capability of processing the light, such that the light is rapidly diverged and received, the relative illuminance of the optical lens assembly is improved, the distance from a rear lens is shortened, thereby realizing miniaturization, reducing the distortion, and improving resolution. Preferably, $-2.1 \geq MAX[F1, F2]/F \geq -0.1$.

In this embodiment, a focal length F3 of the third lens and a focal length F of the optical lens assembly meet: $F3/F \geq 3.5$. The third lens has the positive refractive power and has a positive effect on thermal compensation, and when the focal length is small, image surface offset at a high temperature is reduced, and the distance between the third lens and the fourth lens is shortened, thereby realizing miniaturization; and the positive focal length of the third lens matches the positive focal length of the second lens, such that the aberration is corrected, thereby improving resolution. The third lens matches the positive focal length of the fourth lens, and the light is continuously converged, thereby realizing miniaturization, and reducing the rear end aperture. Preferably, $F3/F \geq 3$.

In this embodiment, a maximum field angle arctan(1/K(S2)) of the second side surface of the first lens meets: arctan(1/K(S2))≤30°. The second side surface of the first lens has a large field angle, which facilitates large angle peripheral light entering via the first lens enters the rear optical system of the optical lens assembly, thereby improving the imaging quality of the optical lens assembly. Preferably, arctan(1/K(S2))≤35°.

In this embodiment, the curvature radius R2 of the second side surface of the first lens and a curvature radius R3 of the first side surface of the second lens meet: $(R2-R3)/(R2+R3) \geq -2$. Through such arrangement, the aberration of the optical lens assembly is corrected, and it ensures that, when the light emitted from the first lens enters the first side surface of the second lens, the incident light is smooth, thereby reducing the tolerance sensitivity of the optical lens assembly. Preferably, $(R2-R3)/(R2+R3) \geq -3$.

In this embodiment, a focal length F2 of the second lens and a focal length F3 of the third lens meet: $-3 \geq F2/F3 \geq -0.1$. The second lens and the third lens match each other with opposite focal lengths. By controlling F2/F3 within a rational range, the light is rapidly diverged by passing through the second lens, such that a pressure diverged by rear lenses is reduced, and the distance between the second lens and the third lens may also be shortened. The third lens receives and rapidly converges the light emitted by the second lens, such that the aberrations of the second lens and the third lens are balanced, and the sensitivity of the optical lens assembly may be effectively reduced, thereby further improving imaging quality. Preferably, $-2 \geq F2/F3 \geq -0.2$, which better facilitates the reduction of the sensitivity of the optical lens assembly, such that imaging quality is further improved, and the aberration of the optical system of the optical lens assembly is reduced.

In this embodiment, a focal length F4 of the fourth lens and a focal length F of the optical lens assembly meet: $0.5 \geq F4/F \geq 4$. By setting F4/F within a rational range, the fourth lens has a positive focal length with a small numerical value, such that the light emitted by the third lens is rapidly converged, and the total optical length of the optical lens assembly is shortened. Positive refractive powers of the third lens and the fourth lens match each other, the light of the third lens received by the fourth lens is further converged to shorten the distance between the third lens and the fourth lens, such that the light emitted by the third lens may be smoothly transitioned to the fourth lens, the resolution quality of the optical lens assembly is improved, light energy losses may also be reduced, and the fourth lens receives more light from the third lens. Meanwhile, the positive refractive powers of the third lens L3 and the fourth lens L4 match each other, such that a convergence pressure of the rear end lens may be shared, and the sensitivity of the rear end lens is reduced, thereby improving imaging quality. Preferably, $1.2 \geq F4/F \geq 3$, which better facilitates the reduction of the total optical length of the optical lens assembly, and reduces the sensitivity of the rear lenses, thereby improving the resolution quality of the optical lens assembly.

In this embodiment, a focal length F5 of the fifth lens and a focal length F6 of the sixth lens meet: $-8 \geq F5/F6 \geq -0.1$. The fifth lens and the sixth lens match each other in a negative and positive manner. By controlling F5/F6 within a rational range, the aberrations of the fifth lens and the sixth lens are balanced, such that the sensitivity of the optical lens assembly may be effectively reduced, and imaging quality is further improved. The light entering the fifth lens has a close included angle with the light emitted by the sixth lens, such that the sensitivity of the rear lenses is reduced. Preferably, $-4 \geq F5/F6 \geq -0.2$, more facilitating the improvement of imaging quality, and reducing the sensitivity of the rear lenses.

In this embodiment, a distance d23 from the second side surface of the second lens to the first side surface of the third lens on an optical axis and an on-axis distance TL from the first side surface of the first lens to the second side surface of the seventh lens meet: $d23/TL \geq 0.1$. By limiting d23/TL within a rational range, the distance between the second lens and the third lens is small, which facilitates miniaturization, and by matching the opposite focal lengths of the second lens and the third lens, the aberration is corrected, thereby improving resolution.

In this embodiment, the second lens is cemented with or spaced apart from the third lens. Through the cemented arrangement of the second lens and the third lens, the total optical length of the optical lens assembly is shortened, and various aberrations of the optical lens assembly are corrected, such that with a compact structure, a resolution ratio may be increased, and optical performance such as distortions, CRAs, and the like is optimized. Preferably, $0 \geq d23/TL \geq 0.08$. In another embodiment, the second lens is spaced apart from the third lens, and there is an air distance between the second lens and the third lens, such that thermal compensation of the optical lens assembly is realized, the sensitivity of the second lens and the third lens is reduced, and the optical lens assembly has a large adjustment space. Preferably, $0.01 \geq d23/TL \geq 0.07$.

In this embodiment, the focal length F2 of the second lens and the focal length F of the optical lens assembly meet: $-8 \geq F2/F$. If the focal length of the second lens is small, the light may be rapidly diverged, the distance between the second lens and the third lens is shortened, the total optical length is shortened, and the light at the edge FOV is diverged, thereby reducing the distortion, and improving resolution. Preferably, $-7 \geq F2/F \geq -0.2$, which better facilitates the reduction of the total optical length, and realizes high resolution.

In this embodiment, a curvature radius R6 of the second side surface of the third lens and a curvature radius R7 of the first side surface of the fourth lens meet: $-2.5 \geq R6/R7 \geq -0.1$. The second side surface of the third lens and the first side surface of the fourth lens both are convex surfaces. By limiting R6/R7 within a rational range, the light is continuously converged, the capability of deflecting the light is large, and an on-axis space required by the same optical path of the light emitted via the second side surface of the third lens is small, facilitating miniaturization; and the light of the first side surface of the fourth lens deflects toward the optical axis, facilitating the reduction of a rear end aperture of the optical lens assembly. Preferably, $-2 \geq R6/R7 \geq -0.2$, which better facilitates the realization of miniaturization.

In this embodiment, a distance d12 from the second side surface of the first lens to the first side surface of the second lens on the optical axis and the on-axis distance TL from the first side surface of the first lens to the second side surface of the seventh lens meet: $d12/TL \geq 0.17$. By limiting d12/TL within a rational range, the distance between the first lens and the second lens is small, which facilitates the TTL, so as to realize miniaturization; by controlling the distance between the first lens and the second lens, the first lens and the second lens are both designed to be negative refractive powers, the second lens receives the light of the first lens for In an embodiment divergence, so as to shorten the distance between the first lens and the second lens, such that the light emitted by the first lens may be smoothly transitioned, and stably enter the rear optical system of the optical lens assembly, the resolution quality of the optical system of the optical lens assembly is improved, light energy losses may also be reduced, and the second lens receives more light from the first lens. Preferably, $d12/TL \geq 0.16$, which better facilitates the reduction of the distance between the first lens and the second lens, thereby realizing miniaturization, and improving the resolution quality of the optical lens assembly.

In this embodiment, a combined focal length F56 of the fifth lens and the sixth lens, and the focal length F of the optical lens assembly meet: $0 < F56/F \geq 7$. By limiting F56/F within a rational range, the trend of the light entering the fifth lens and the sixth lens is controlled, the aberration caused by large angle light entered is reduced; an emergent angle of the light of the second side surface of the sixth lens is controlled within a certain range, such that the aberration of the optical lens assembly is corrected, the sensitivity of the optical lens assembly is reduced, and light lens chromatic aberration may be corrected, thereby improving the imaging quality of the optical lens assembly; and the structure of the optical lens assembly is compact, facilitating miniaturization. The light is converged, and the aperture of the rear lenses is reduced; and by designing a large distance between the sixth lens and the seventh lens, the light emitted by the sixth lens is split, thereby reducing the field curvature and improving resolution. Preferably, $0.5 \geq F56/F \geq 6.2$, which better facilitates the field curvature, and improves the resolution.

In this embodiment, the on-axis distance TL from the first side surface of the first lens to the second side surface of the seventh lens and a center thickness d3 of the second lens meet: $TL/d3 \leq 10$. By limiting TL/d3 within a rational range, the thickness of the second lens is small, which facilitates the reduction of the total optical length of the optical lens assembly, thereby realizing a short TTL. Furthermore, with a limited TTL of the optical lens assembly, by reducing the center thickness of the second lens, a space is provided for the rear optical system of the optical lens assembly, facilitating light splitting of the rear optical system of the optical lens assembly, thereby reducing the field curvature. Preferably, $TL/d3 \leq 13$, which better facilitates the reduction of the field curvature, and improves the resolution.

In this embodiment, an on-axis distance TL from the first side surface of the first lens to the second side surface of the seventh lens, a distance d34 from the second side surface of the third lens to the first side surface of the fourth lens on the optical axis meet: $25 \geq TL/d34$. By limiting TL/d34 within a rational range, the distance between the third lens and the fourth lens is small, which facilitates the reduction of the total optical length of the optical lens assembly, thereby realizing a short TTL. Preferably, $28 \geq TL/d34 \geq 400$, which better facilitates the reduction of the total optical length of the optical lens assembly; and by controlling an upper limit of the conditional expression, the distance between the third lens and the fourth lens is prevented from being too small, facilitating the improvement of resolution on the basis of miniaturization.

In this embodiment, the curvature radius R11 of the second side surface of the sixth lens and the focal length F of the optical lens assembly meet: $R11/F \geq -0.01$, such that ghost images are weakened, and resolution is improved. Preferably, $-15 \geq R11/F \geq -2.5$. By limiting R11/F within a rational range, the surface type of the second side surface of the sixth lens is the convex surface, and light formed during reflection with an optical filter and protective glass of a chip is divergent light, facilitating the weakening of ghost images.

In this embodiment, other conditional expressions in Embodiment I and Embodiment II may also be included, and are not described herein again.

In an embodiment, the optical lens assembly may further include an optical filter for correcting color deviation and protective glass for protecting a photosensitive element on an imaging surface.

In the optical lens assembly, the maximum FOV and H of the optical lens assembly are associated, and a FOV corresponding to an image height is used. The total optical length of the optical lens assembly refers to a distance from the first side surface of the first lens to the imaging surface of the optical lens assembly on the optical axis. The optical BFL of the optical lens assembly refers to the distance from the center of the second side surface of the last lens of the optical lens assembly to the center of the imaging surface.

The optical lens assembly in the disclosure may use a plurality of lenses, for example, the above seven lenses. In the disclosure, at least one of surfaces of each lens is an aspherical surface. An aspherical lens has a characteristic that a curvature keeps changing from the center of the lens to the periphery of the lens. Unlike a spherical lens with a constant curvature from the center of the lens to the periphery of the lens, the aspherical lens has the characteristic of a better curvature radius and the advantages of improving distortions and improving astigmatic aberrations. By using the aspherical lens, aberrations during imaging may be eliminated as much as possible, thereby improving the imaging quality. Specifically, when the focus is on the imaging quality of the optical lens assembly, the first lens to the seventh lens may all be aspherical lenses.

In an exemplary implementation, the first lens to the seventh lens are all glass lenses. The optical lens assembly made of glass may inhibit a back focal length of the optical lens assembly from shifting with temperature changes, thereby improving the stability of the system. Meanwhile, the use of a glass material may avoid the image blurring of the lens caused by high and low temperature changes in an environment used, affecting the normal use of the lens. For example, the all-glass design of the optical lens assembly has a wide temperature range and may maintain stable optical performance within a range of −40° C.-105° C.

In an embodiment, the focus is on resolution quality and reliability, all of the first lens to the seventh lens are glass aspherical lenses. In another embodiment, in an application scenario with a low requirement for temperature stability, all of the first lens to the seventh lens in the optical lens assembly are made of plastic. Manufacturing costs may be effectively reduced by using plastic to manufacture the optical lens assembly. In another embodiment, the first lens to the seventh lens in the optical lens assembly are made by a combination of plastic and glass.

The disclosure further provides an electronic device, including the optical lens assembly and an imaging element for converting an optical image formed by the optical lens assembly into an electrical signal. The imaging element may be a Charge-Coupled Device (CCD) or a Complementary Metal Oxide Semiconductor (CMOS). The electronic device may be an independent imaging device such as a digital camera, and may also be an imaging module which is integrated on a mobile electronic device such as a mobile phone. The electronic device is provided with the optical lens assembly described above.

However, a person skilled in the art should know that the number of the lenses forming the optical lens assembly may be changed without departing from the technical solutions claimed in the disclosure to achieve each result and advantage described in the specification. For example, although descriptions are made in the implementation with seven lenses as an example, the optical lens assembly includes, but is not limited to, seven lenses. If necessary, the optical lens assembly may In an embodiment include another number of lenses.

Examples of specific surface types and parameters of the optical lens assembly applicable to the above-mentioned implementation mode will further be described below with reference to the drawings. It is to be noted that, in order to ensure a uniform meaning of the reference numerals, regardless of whether the second lens and third lens are cemented: the second side surface of the second lens is S4, and the first side surface of the third lens is S5.

Example I

As shown in FIG. 1, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.8855 mm, a total optical length TTL of the optical lens assembly is 37.0026 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for a first side surface and a second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the first side surface of the seventh lens and the second side surface of the seventh lens both have inflection points.

Table 1 shows a basic structure parameter table of the optical lens assembly in Example I, where curvature radius and thickness/distance are all in millimeters (mm). Surf is a surface number of a lens, Nd is a refractive index, Vd is an abbe number, and Infinity means infinite.

TABLE 1

| Surf | Radius | Thickness | Nd | Vd |
|---|---|---|---|---|
| 1 | 12.2545 | 1.5000 | 1.77 | 49.60 |
| 2 | 6.3074 | 4.3126 | | |
| 3 | −8.5950 | 1.6030 | 1.70 | 41.15 |
| 4 | 11.5332 | 5.7674 | 1.59 | 68.34 |
| 5 | −11.5332 | 0.1000 | | |
| 6 | 13.0929 | 2.0887 | 1.88 | 39.22 |
| 7 | 105.8628 | 8.3274 | | |
| STO | Infinity | −0.6513 | | |
| 8 | 10.5208 | 3.1031 | 1.69 | 54.54 |
| 10 | −8.8170 | 0.6999 | 1.92 | 20.88 |
| 11 | −75.3583 | 4.2459 | | |
| 12 | 27.9998 | 2.8086 | 1.59 | 61.31 |
| 13 | 14.7774 | 0.6206 | | |
| 14 | Infinity | 0.5000 | 1.52 | 64.20 |
| 15 | Infinity | 1.3571 | | |
| 16 | Infinity | 0.5000 | 1.52 | 64.20 |
| 17 | Infinity | 0.1196 | | |
| IMA | / | / | | |

In this example, the seventh lens is an aspherical lens. The surface types of various aspherical lenses may be limited by using, but not limited to, the following aspherical equation.

$$x = \frac{ch^2}{1 + \sqrt{1 - (k+1)c^2h^2}} + \sum Aih^i; \quad \text{Equation (1)}$$

Where x is a distance vector height from the vertex of the aspherical surface when the height of the aspherical surface in an optical axis direction is h; c is a paraxial curvature of the aspherical surface, c=1/R, i.e., the paraxial curvature c is the reciprocal of the curvature radius R in Table 1; k is the conic coefficient; and A is a higher-order coefficient. Table 2 below shows the conic coefficient k that may be configured for the surface of the aspherical lens in this example, as well as various higher-order coefficients A (4th-order coefficient), B (6th-order coefficient), C (8th-order coefficient), D (10th-order coefficient), E (12th-order coefficient), F (14th-order coefficient), and G (16th-order coefficient).

convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.9518 mm, a total optical length TTL of the optical lens assembly is 37 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the first side surface of the seventh lens and the second side surface of the seventh lens both have inflection points.

TABLE 2

| Surf | K | A | B | C | D | E | F | G |
|---|---|---|---|---|---|---|---|---|
| 12 | −65.6310 | −1.3090E−03 | −7.8039E−06 | 2.0228E−06 | −2.2382E−07 | 1.3908E−08 | −4.0891E−10 | 3.5926E−13 |
| 13 | 5.8161 | −2.2213E−03 | 2.0548E−05 | −2.3601E−06 | 4.2812E−07 | −3.9264E−08 | 1.6709E−09 | −2.7954E−11 |

Example II

Figure 2:
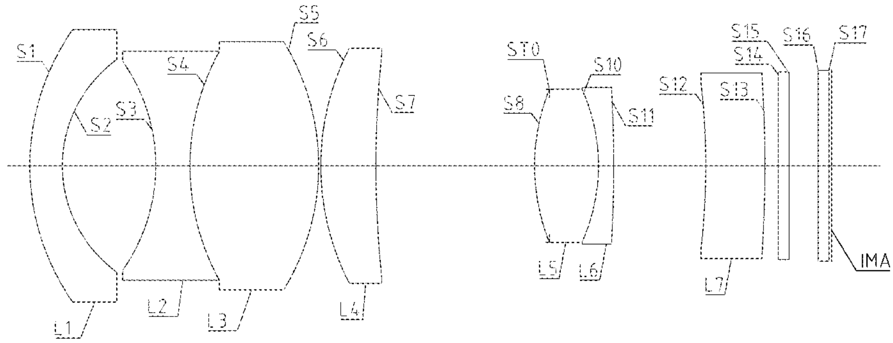
FIG. 2 is a schematic structural diagram of an optical lens assembly according to Example II of the disclosure.

As shown in FIG. 2, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a Table 3 shows a basic structure parameter table of the optical lens assembly in Example II, where curvature radius and thickness/distance are all in millimeters (mm). Surf is a surface number of a lens, Nd is a refractive index, Vd is an abbe number, and Infinity means infinite.

TABLE 3

| Surf | Radius | Thickness | Nd | Vd |
|---|---|---|---|---|
| 1 | 11.4821 | 1.5000 | 1.77 | 49.60 |
| 2 | 6.2862 | 4.3126 | | |
| 3 | −8.7479 | 1.5768 | 1.70 | 41.15 |
| 4 | 11.4711 | 5.9389 | 1.59 | 68.34 |
| 5 | −11.4711 | 0.1000 | | |
| 6 | 12.4036 | 2.5440 | 1.88 | 39.22 |
| 7 | 51.9734 | 8.0044 | | |
| STO | Infinity | −0.6816 | | |
| 8 | 9.9279 | 2.9457 | 1.69 | 54.54 |
| 10 | −8.9960 | 0.7000 | 1.92 | 20.88 |
| 11 | −72.0917 | 4.2500 | | |

TABLE 3-continued

| Surf | Radius | Thickness | Nd | Vd |
|---|---|---|---|---|
| 12 | 33.4938 | 2.7303 | 1.59 | 61.31 |
| 13 | 14.8217 | 0.6206 | | |
| 14 | Infinity | 0.5000 | 1.52 | 64.20 |
| 15 | Infinity | 1.3387 | | |
| 16 | Infinity | 0.5000 | 1.52 | 64.20 |
| 17 | Infinity | 0.1196 | | |
| IMA | / | / | | |

In this example, the seventh lens is an aspherical lens. Table 4 below shows the conic coefficient k that may be configured for the surface of the aspherical lens in this example, as well as various higher-order coefficients.

third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the first side surface of the seventh lens and the second side surface of the seventh lens both have inflection points.

TABLE 4

| Surf | K | A | B | C | D | E | F | G |
|---|---|---|---|---|---|---|---|---|
| 12 | −185.1700 | −1.4665E−03 | −1.2945E−05 | 1.5383E−06 | −2.2611E−07 | 1.5559E−08 | −2.8846E−10 | −3.9059E−12 |
| 13 | 4.4779 | −2.7505E−03 | 1.8741E−05 | −2.2131E−06 | 4.3757E−07 | −3.8919E−08 | 1.6780E−09 | −2.7997E−11 |

Example III

Figure 3:
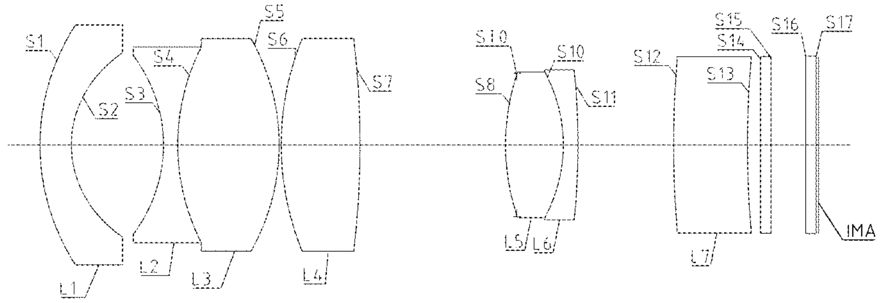
FIG. 3 is a schematic structural diagram of an optical lens assembly according to Example III of the disclosure.

As shown in FIG. 3, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.8899 mm, a total optical length TTL of the optical lens assembly is 37.2003 mm, and a maximum FOV of the optical lens assembly is 70.26°.

In this example, the second lens and the third lens are cemented to form a first cemented lens, and the second side surface of the second lens and the first side surface of the Table 5 shows a basic structure parameter table of the optical lens assembly in Example III, where curvature radius and thickness/distance are all in millimeters (mm). Surf is a surface number of a lens, Nd is a refractive index, Vd is an abbe number, and Infinity means infinite.

TABLE 5

| Surf | Radius | Thickness | Nd | Vd |
|---|---|---|---|---|
| 1 | 12.4617 | 1.5000 | 1.77 | 49.60 |
| 2 | 5.9495 | 4.4000 | | |
| 3 | −8.2809 | 0.6827 | 1.70 | 41.15 |
| 4 | 12.1843 | 4.8420 | 1.59 | 68.34 |
| 5 | −12.1843 | 0.1000 | | |
| 6 | 15.8983 | 3.7662 | 1.88 | 39.22 |
| 7 | −51.0002 | 7.4762 | | |
| STO | Infinity | −0.5264 | | |
| 8 | 12.7973 | 2.7600 | 1.69 | 54.54 |
| 10 | −8.6310 | 0.7013 | 1.92 | 20.88 |
| 11 | −42.0568 | 4.5663 | | |
| 12 | 16.2937 | 3.5291 | 1.59 | 61.31 |
| 13 | 13.0980 | 0.6206 | | |
| 14 | Infinity | 0.5000 | 1.52 | 64.20 |
| 15 | Infinity | 1.6627 | | |
| 16 | Infinity | 0.5000 | 1.52 | 64.20 |
| 17 | Infinity | 0.1196 | | |
| IMA | / | / | | |

In this example, the seventh lens is an aspherical lens. Table 6 below shows the conic coefficient k that may be configured for the surface of the aspherical lens in this example, as well as various higher-order coefficients.

TABLE 6

| Surf | K | A | B | C | D | E | F | G |
|---|---|---|---|---|---|---|---|---|
| 12 | 1.8730 | −1.2824E−03 | −4.3407E−06 | 1.2528E−06 | −2.0223E−07 | 1.5727E−08 | −5.0031E−10 | 4.7915E−12 |
| 13 | 0.4895 | −1.2803E−03 | −2.6268E−05 | −1.1100E−06 | 4.3384E−07 | −3.9541E−08 | 1.7128E−09 | −2.8854E−11 |

Example IV

Figure 4:
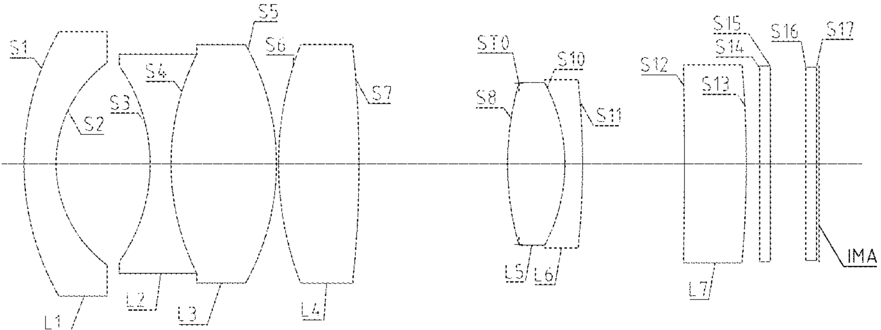
FIG. 4 is a schematic structural diagram of an optical lens assembly according to Example IV of the disclosure.

As shown in FIG. 4, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

S4 of the second lens is a concave surface, and the first side surface S4 of the third lens is a convex surface; and the second side surface S10 of the fifth lens is a convex surface, and the first side surface S10 of the sixth lens is a concave surface.

In this example, the first side surface of the seventh lens and the second side surface of the seventh lens both have inflection points.

Table 7 shows a basic structure parameter table of the optical lens assembly in Example IV, where curvature radius and thickness/distance are all in millimeters (mm). Surf is a surface number of a lens, Nd is a refractive index, Vd is an abbe number, and Infinity means infinite.

TABLE 7

| Surf | Radius | Thickness | Nd | Vd |
|---|---|---|---|---|
| 1 | 12.4492 | 1.5000 | 1.77 | 49.60 |
| 2 | 5.8335 | 4.4000 | | |
| 3 | −7.9294 | 0.9814 | 1.70 | 41.15 |
| 4 | 11.4164 | 4.9302 | 1.59 | 68.34 |
| 5 | −11.4164 | 0.1000 | | |
| 6 | 15.4827 | 3.7662 | 1.88 | 39.22 |
| 7 | −50.7589 | 7.4792 | | |
| STO | Infinity | −0.5292 | | |
| 8 | 13.5862 | 2.6794 | 1.69 | 54.54 |
| 10 | −8.0609 | 0.8281 | 1.92 | 20.88 |
| 11 | −37.4963 | 4.7686 | | |
| 12 | 24.1749 | 2.8962 | 1.59 | 61.31 |
| 13 | 16.6005 | 0.6206 | | |
| 14 | Infinity | 0.5000 | 1.52 | 64.20 |
| 15 | Infinity | 1.6597 | | |
| 16 | Infinity | 0.5000 | 1.52 | 64.20 |
| 17 | Infinity | 0.1196 | | |
| IMA | / | / | | |

In this example, the seventh lens is an aspherical lens. Table 8 below shows the conic coefficient k that may be configured for the surface of the aspherical lens in this example, as well as various higher-order coefficients.

TABLE 8

| Surf | K | A | B | C | D | E | F | G |
|---|---|---|---|---|---|---|---|---|
| 12 | −9.5369 | −1.1672E−03 | −2.1575E−06 | 1.1786E−06 | −2.2438E−07 | 1.5993E−08 | −3.2437E−10 | −3.7581E−12 |
| 13 | −8.2361 | −1.6487E−03 | −1.9969E−05 | −7.9874E−07 | 4.3451E−07 | −4.0346E−08 | 1.6656E−09 | −2.6536E−11 |

In this example, a focal length F of the optical lens assembly is 7.9242 mm, a total optical length TTL of the optical lens assembly is 37.2 mm, and a maximum FOV of the optical lens assembly is 70.26°.

Figure 5:
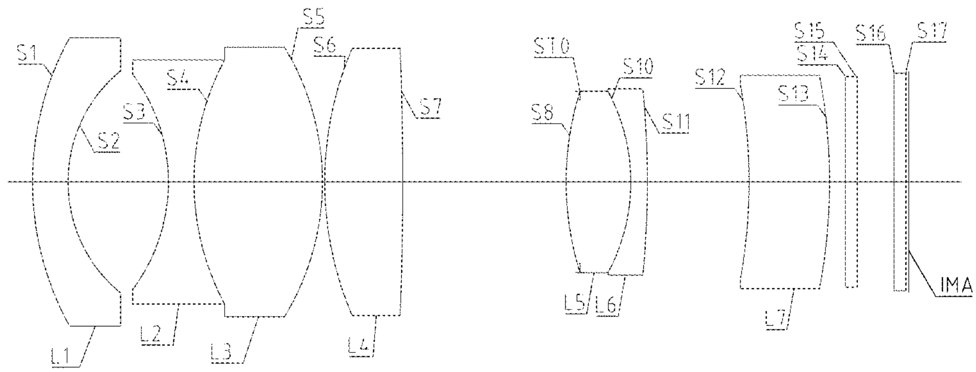
FIG. 5 is a schematic structural diagram of an optical lens assembly according to Example V of the disclosure.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface Example V As shown in FIG. 5, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a concave surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

TABLE 9-continued

| Surf | Radius | Thickness | Nd | Vd |
|---|---|---|---|---|
| 7 | −136.2131 | 7.4832 | | |
| STO | Infinity | −0.5842 | | |
| 8 | 12.4559 | 2.7291 | 1.69 | 54.54 |
| 10 | −7.8835 | 0.6993 | 1.92 | 20.88 |
| 11 | −39.1706 | 4.2969 | | |
| 12 | −96.0000 | 3.3948 | 1.59 | 61.31 |
| 13 | 97.3030 | 0.6717 | | |
| 14 | Infinity | 0.5000 | 1.52 | 64.20 |
| 15 | Infinity | 1.5543 | | |
| 16 | Infinity | 0.5000 | 1.52 | 64.20 |
| 17 | Infinity | 0.1196 | | |
| IMA | / | / | | |

In this example, the seventh lens is an aspherical lens. Table 10 below shows the conic coefficient k that may be configured for the surface of the aspherical lens in this example, as well as various higher-order coefficients.

TABLE 10

| Surf | K | A | B | C | D | E | F | G |
|---|---|---|---|---|---|---|---|---|
| 12 | 195.1200 | −1.2679E−03 | 3.2731E−06 | 1.8186E−06 | 3.2731E−06 | 1.8186E−06 | −2.2550E−07 | 1.3012E−08 |
| 13 | −78.1140 | −1.5899E−03 | 1.9326E−05 | −2.2408E−06 | 1.9326E−05 | −2.2408E−06 | 4.3915E−07 | −3.9827E−08 |

In this example, a focal length F of the optical lens assembly is 7.9386 mm, a total optical length TTL of the optical lens assembly is 36.9994 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the second side surface of the seventh lens has an inflection point.

Table 9 shows a basic structure parameter table of the optical lens assembly in Example V, where curvature radius and thickness/distance are all in millimeters (mm). Surf is a surface number of a lens, Nd is a refractive index, Vd is an abbe number, and Infinity means infinite.

TABLE 9

| Surf | Radius | Thickness | Nd | Vd |
|---|---|---|---|---|
| 1 | 12.3002 | 1.5000 | 1.77 | 49.60 |
| 2 | 5.9302 | 4.2371 | | |
| 3 | −7.3834 | 1.0822 | 1.70 | 41.15 |
| 4 | 10.6240 | 5.4192 | 1.59 | 68.34 |
| 5 | −10.6240 | 0.1000 | | |
| 6 | 13.9014 | 3.2961 | 1.88 | 39.22 |

Example VI

Figure 6:
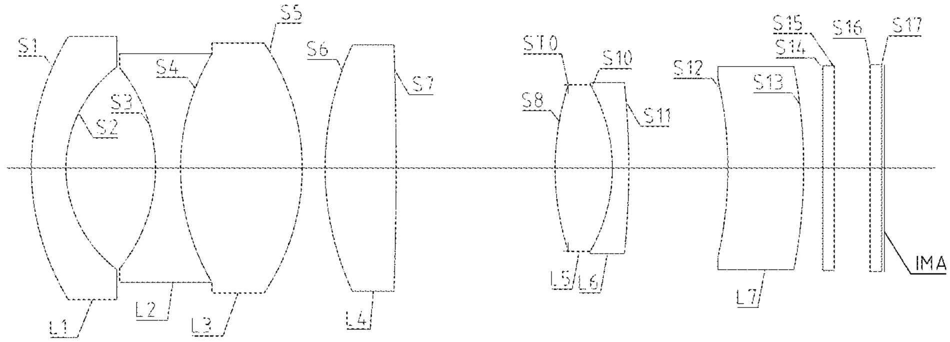
FIG. 6 is a schematic structural diagram of an optical lens assembly according to Example VI of the disclosure.

As shown in FIG. 6, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a concave surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.9582 mm, a total optical length TTL of the optical lens assembly is 36.9993 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the second side surface of the seventh lens has an inflection point.

Table 11 shows a basic structure parameter table of the optical lens assembly in Example VI, where curvature radius and thickness/distance are all in millimeters (mm). Surf is a surface number of a lens, Nd is a refractive index, Vd is an abbe number, and Infinity means infinite.

TABLE 11

| Surf | Radius | Thickness | Nd | Vd |
|---|---|---|---|---|
| 1 | 11.7791 | 1.5000 | 1.77 | 49.60 |
| 2 | 5.8398 | 3.8853 | | |
| 3 | −7.3829 | 1.0857 | 1.70 | 41.15 |
| 4 | 10.4377 | 5.2798 | 1.59 | 68.34 |
| 5 | −10.4377 | 0.9922 | | |
| 6 | 13.6570 | 3.0759 | 1.88 | 39.22 |
| 7 | −176.6936 | 7.4654 | | |
| STO | Infinity | −0.5649 | | |
| 8 | 12.6877 | 2.4837 | 1.69 | 54.54 |
| 10 | −7.8141 | 0.7099 | 1.92 | 20.88 |
| 11 | −39.4344 | 4.3004 | | |
| 12 | −100.6324 | 3.2843 | 1.59 | 61.31 |
| 13 | 94.2135 | 0.8276 | | |
| 14 | Infinity | 0.5000 | 1.52 | 64.20 |
| 15 | Infinity | 1.5543 | | |
| 16 | Infinity | 0.5000 | 1.52 | 64.20 |
| 17 | Infinity | 0.1196 | | |
| IMA | / | / | | |

In this example, the seventh lens is an aspherical lens. Table 12 below shows the conic coefficient k that may be configured for the surface of the aspherical lens in this example, as well as various higher-order coefficients.

TABLE 12

| Surf | K | A | B | C | D | E | F | G |
|---|---|---|---|---|---|---|---|---|
| 12 | 180.6600 | −1.4408E−03 | 2.1490E−05 | −1.5710E−06 | 2.1490E−05 | −1.5710E−06 | 1.6094E−08 | 1.0464E−08 |
| 13 | −196.5600 | −1.4635E−03 | 2.6572E−05 | −3.1151E−06 | 2.6572E−05 | −3.1151E−06 | 4.6535E−07 | −3.5968E−08 |

Example VII

Figure 7:
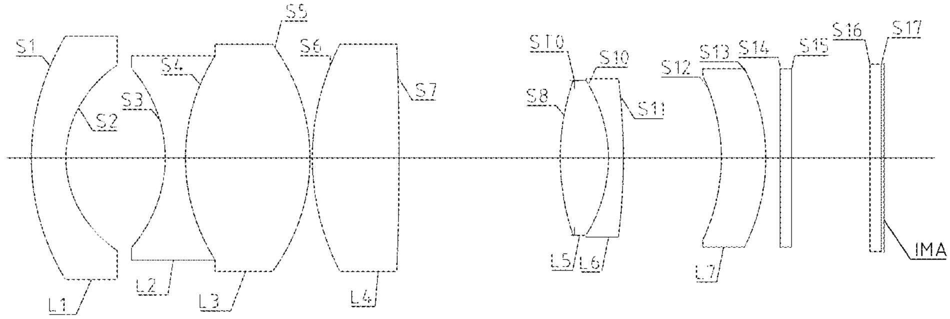
FIG. 7 is a schematic structural diagram of an optical lens assembly according to Example VII of the disclosure.

As shown in FIG. 7, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a concave surface, and a second side surface S13 of the seventh lens is a convex surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.8387 mm, a total optical length TTL of the optical lens assembly is 37.0193 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

Table 13 shows a basic structure parameter table of the optical lens assembly in Example VII, where curvature radius and thickness/distance are all in millimeters (mm). Surf is a surface number of a lens, Nd is a refractive index, Vd is an abbe number, and Infinity means infinite.

TABLE 13

| Surf | Radius | Thickness | Nd | Vd |
|---|---|---|---|---|
| 1 | 12.7156 | 1.5000 | 1.77 | 49.60 |
| 2 | 5.7416 | 4.3126 | | |
| 3 | −7.2935 | 0.8770 | 1.70 | 41.15 |
| 4 | 10.3337 | 5.4074 | 1.59 | 68.34 |
| 5 | −10.3337 | 0.1000 | | |

TABLE 13-continued

| Surf | Radius | Thickness | Nd | Vd |
|---|---|---|---|---|
| 6 | 13.4784 | 3.7662 | 1.88 | 39.22 |
| 7 | −154.1316 | 7.6119 | | |
| STO | Infinity | −0.6129 | | |
| 8 | 13.1815 | 2.0876 | 1.69 | 54.54 |
| 10 | −7.8428 | 0.6484 | 1.92 | 20.88 |
| 11 | −35.5999 | 4.2513 | | |
| 12 | −19.3752 | 1.9335 | 1.59 | 61.31 |
| 13 | −20.6419 | 0.6206 | | |
| 14 | Infinity | 0.5000 | 1.52 | 64.20 |
| 15 | Infinity | 3.3959 | | |
| 16 | Infinity | 0.5000 | 1.52 | 64.20 |
| 17 | Infinity | 0.1196 | | |
| IMA | / | / | | |

In this example, the seventh lens is an aspherical lens. Table 14 below shows the conic coefficient k that may be configured for the surface of the aspherical lens in this example, as well as various higher-order coefficients.

TABLE 14

| Surf | K | A | B | C | D | E | F | G |
|---|---|---|---|---|---|---|---|---|
| 12 | 15.4520 | −1.6538E−03 | 3.1549E−05 | 6.6311E−07 | 3.1549E−05 | 6.6311E−07 | 2.4399E−08 | 3.2182E−09 |
| 13 | 15.5560 | −1.4478E−03 | 1.0983E−05 | 2.6293E−06 | 1.0983E−05 | 2.6293E−06 | −8.7268E−08 | −2.3102E−09 |

Example VIII

Figure 8:
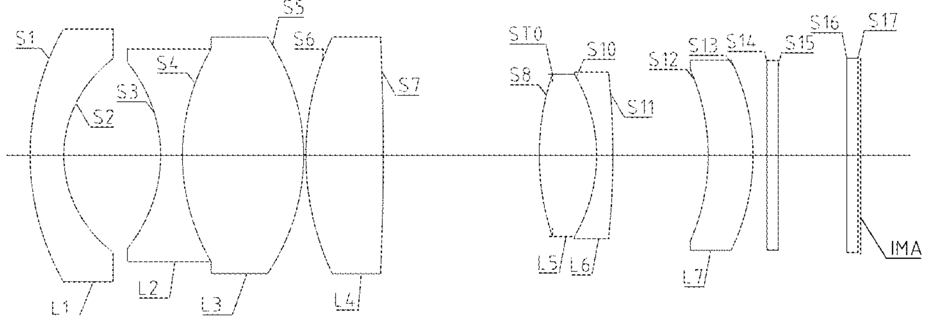
FIG. 8 is a schematic structural diagram of an optical lens assembly according to Example VIII of the disclosure.

As shown in FIG. 8, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a concave surface, and a second side surface S13 of the seventh lens is a convex surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.8149 mm, a total optical length TTL of the optical lens assembly is 36.9977 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

Table 15 shows a basic structure parameter table of the optical lens assembly in Example VIII, where curvature radius and thickness/distance are all in millimeters (mm). Surf is a surface number of a lens, Nd is a refractive index, Vd is an abbe number, and Infinity means infinite.

TABLE 15

| Surf | Radius | Thickness | Nd | Vd |
|---|---|---|---|---|
| 1 | 12.6467 | 1.5000 | 1.77 | 49.60 |
| 2 | 5.8065 | 4.3126 | | |
| 3 | −7.2005 | 0.9703 | 1.70 | 41.15 |
| 4 | 10.4186 | 5.3995 | 1.59 | 68.34 |
| 5 | −10.4186 | 0.1000 | | |
| 6 | 13.7654 | 3.4461 | 1.88 | 39.22 |
| 7 | −125.7372 | 7.5402 | | |
| STO | Infinity | −0.5907 | | |
| 8 | 12.7066 | 2.5554 | 1.69 | 54.54 |
| 10 | −7.8577 | 0.7276 | 1.92 | 20.88 |
| 11 | −39.0429 | 4.2463 | | |
| 12 | −18.9327 | 1.9936 | 1.59 | 61.31 |
| 13 | −20.1057 | 0.6206 | | |
| 14 | Infinity | 0.5000 | 1.52 | 64.20 |
| 15 | Infinity | 3.0565 | | |
| 16 | Infinity | 0.5000 | 1.52 | 64.20 |
| 17 | Infinity | 0.1196 | | |
| IMA | / | / | | |

In this example, the seventh lens is an aspherical lens. Table 16 below shows the conic coefficient k that may be configured for the surface of the aspherical lens in this example, as well as various higher-order coefficients.

TABLE 16

| Surf | K | A | B | C | D | E | F | G |
|---|---|---|---|---|---|---|---|---|
| 12 | 19.6130 | −1.3511E−03 | 4.1036E−05 | −2.1920E−06 | 4.1036E−05 | −2.1920E−06 | 2.3637E−07 | 9.2810E−09 |
| 13 | 17.9950 | −1.2458E−03 | 7.7485E−06 | 2.4854E−06 | 7.7485E−06 | 2.4854E−06 | −6.6700E−08 | −6.1956E−10 |

Example IX

Figure 9:
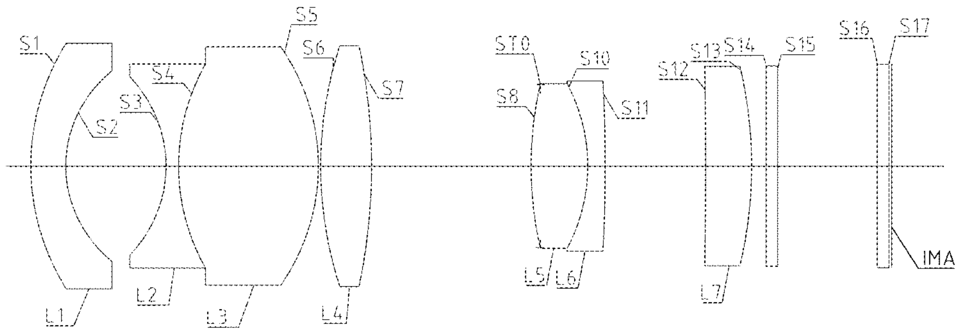
FIG. 9 is a schematic structural diagram of an optical lens assembly according to Example IX of the disclosure.

As shown in FIG. 9, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a positive refractive power; and a first side surface S12 of the seventh lens is a convex surface, and a second side surface S13 of the seventh lens is a convex surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.6904 mm, a total optical length TTL of the optical lens assembly is 36.9938 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the first side surface of the seventh lens has an inflection point.

Table 17 shows a basic structure parameter table of the optical lens assembly in Example IX, where curvature radius and thickness/distance are all in millimeters (mm). Surf is a surface number of a lens, Nd is a refractive index, Vd is an abbe number, and Infinity means infinite.

TABLE 17

| Surf | Radius | Thickness | Nd | Vd |
|---|---|---|---|---|
| 1 | 11.3401 | 1.5000 | 1.77 | 49.60 |
| 2 | 5.8615 | 4.3126 | | |
| 3 | −6.2103 | 0.5378 | 1.70 | 41.15 |
| 4 | 10.1825 | 6.0067 | 1.59 | 68.34 |
| 5 | −10.1825 | 0.1000 | | |
| 6 | 19.2136 | 2.1848 | 1.88 | 39.22 |
| 7 | −28.9900 | 7.2478 | | |
| STO | Infinity | −0.3901 | | |
| 8 | 18.3588 | 2.4332 | 1.69 | 54.54 |
| 10 | −8.6076 | 0.7487 | 1.92 | 20.88 |
| 11 | −81.4838 | 4.3187 | | |
| 12 | 55.3159 | 1.9760 | 1.59 | 61.31 |
| 13 | −26.9101 | 0.6206 | | |
| 14 | Infinity | 0.5000 | 1.52 | 64.20 |
| 15 | Infinity | 4.2773 | | |
| 16 | Infinity | 0.5000 | 1.52 | 64.20 |
| 17 | Infinity | 0.1196 | | |
| IMA | / | / | | |

In this example, the seventh lens is an aspherical lens. Table 18 below shows the conic coefficient k that may be configured for the surface of the aspherical lens in this example, as well as various higher-order coefficients.

TABLE 18

| Surf | K | A | B | C | D | E | F | G |
|---|---|---|---|---|---|---|---|---|
| 12 | −200.0000 | −3.1596E−04 | 6.0042E−05 | −7.3758E−06 | 6.0042E−05 | −7.3758E−06 | 2.0106E−07 | 1.2962E−08 |
| 13 | −9.8638 | 1.8390E−04 | −2.7008E−05 | 1.3012E−06 | −2.7008E−05 | 1.3012E−06 | −8.8484E−08 | 2.9036E−09 |

Example X

Figure 10:
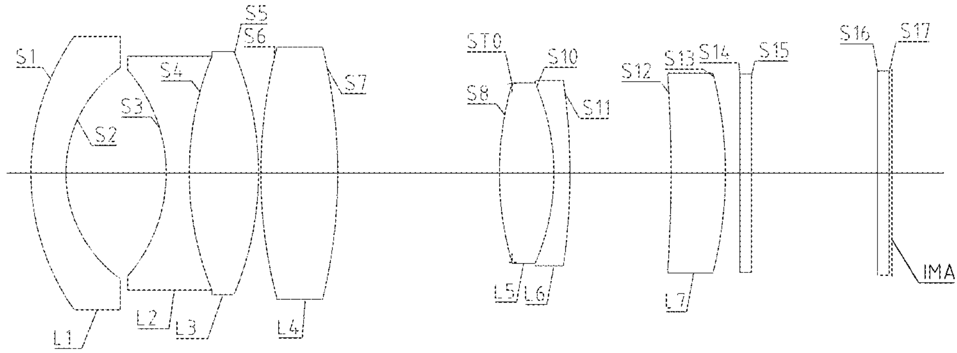
FIG. 10 is a schematic structural diagram of an optical lens assembly according to Example X of the disclosure.

As shown in FIG. 10, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power;

and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a positive refractive power; and a first side surface S12 of the seventh lens is a convex surface, and a second side surface S13 of the seventh lens is a convex surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.6084 mm, a total optical length TTL of the optical lens assembly is 37.0058 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a convex surface, and the first side surface S10 of the sixth lens is a concave surface.

In this example, the first side surface of the seventh lens has an inflection point.

Table 19 shows a basic structure parameter table of the optical lens assembly in Example X, where curvature radius and thickness/distance are all in millimeters (mm). Surf is a surface number of a lens, Nd is a refractive index, Vd is an abbe number, and Infinity means infinite.

TABLE 19

| Surf | Radius | Thickness | Nd | Vd |
|---|---|---|---|---|
| 1 | 10.7364 | 1.5000 | 1.77 | 49.60 |
| 2 | 5.8128 | 4.3126 | | |
| 3 | −7.0694 | 0.9894 | 1.70 | 41.15 |
| 4 | 14.1402 | 2.9780 | 1.59 | 68.34 |
| 5 | −14.1402 | 0.1000 | | |
| 6 | 22.5680 | 3.3041 | 1.88 | 39.22 |
| 7 | −24.1593 | 7.4929 | | |
| STO | Infinity | −0.5437 | | |
| 8 | 14.5675 | 2.3430 | 1.69 | 54.54 |
| 10 | −10.2234 | 0.6920 | 1.92 | 20.88 |
| 11 | −29.4792 | 4.3427 | | |
| 12 | 58.5059 | 2.3373 | 1.59 | 61.31 |
| 13 | −25.8979 | 0.6206 | | |
| 14 | Infinity | 0.5000 | 1.52 | 64.20 |
| 15 | Infinity | 5.4173 | | |
| 16 | Infinity | 0.5000 | 1.52 | 64.20 |
| 17 | Infinity | 0.1196 | | |
| IMA | / | / | | |

In this example, the seventh lens is an aspherical lens. Table 20 below shows the conic coefficient k that may be configured for the surface of the aspherical lens in this example, as well as various higher-order coefficients.

TABLE 20

| Surf | K | A | B | C | D | E | F | G |
|---|---|---|---|---|---|---|---|---|
| 12 | 184.7800 | −1.1334E−03 | 2.9989E−05 | −3.2023E−06 | 2.9989E−05 | −3.2023E−06 | 1.6259E−08 | 9.6252E−09 |
| 13 | −200.0000 | −3.0916E−04 | −5.6871E−05 | 1.6335E−06 | −5.6871E−05 | 1.6335E−06 | 8.1414E−10 | −5.6817E−11 |

Example XI

Figure 11:
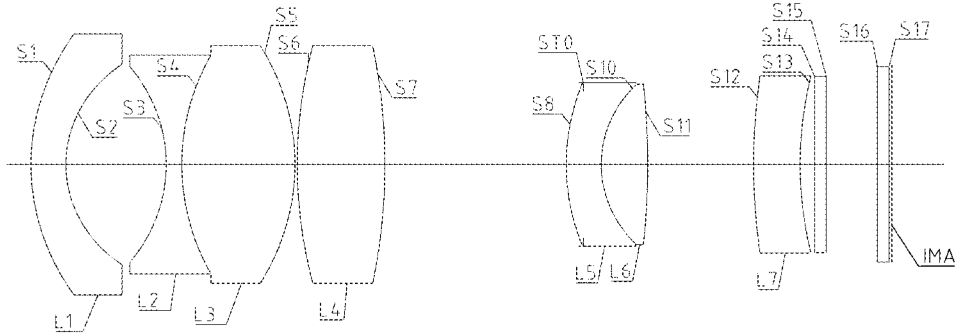
FIG. 11 is a schematic structural diagram of an optical lens assembly according to Example XI of the disclosure.

As shown in FIG. 11, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a negative refractive power; and a first side surface S8 of the fifth lens is a convex surface, and a second side surface S10 of the fifth lens is a concave surface. The sixth lens L6 has a positive refractive power; and a first side surface S10 of the sixth lens is a convex surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.7257 mm, a total optical length TTL of the optical lens assembly is 37.001 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a concave surface, and the first side surface S10 of the sixth lens is a convex surface.

Table 21 shows a basic structure parameter table of the optical lens assembly in Example XI, where curvature radius and thickness/distance are all in millimeters (mm). Surf is a surface number of a lens, Nd is a refractive index, Vd is an abbe number, and Infinity means infinite.

TABLE 21

| Surf | Radius | Thickness | Nd | Vd |
|---|---|---|---|---|
| 1 | 10.9839 | 1.5000 | 1.77 | 49.60 |
| 2 | 5.7626 | 4.3126 | | |
| 3 | −7.4912 | 0.6706 | 1.70 | 41.15 |
| 4 | 11.0961 | 4.8626 | 1.59 | 68.34 |
| 5 | −11.0961 | 0.1000 | | |
| 6 | 23.4756 | 3.7662 | 1.88 | 39.22 |
| 7 | −29.5653 | 8.5263 | | |
| STO | Infinity | −0.7314 | | |
| 8 | 10.7706 | 1.5006 | 1.69 | 54.54 |
| 10 | 5.4050 | 1.9994 | 1.92 | 20.88 |
| 11 | −38.7829 | 4.5538 | | |
| 12 | 25.2333 | 1.9999 | 1.59 | 61.31 |
| 13 | 14.4210 | 0.6206 | | |
| 14 | Infinity | 0.5000 | 1.52 | 64.20 |
| 15 | Infinity | 2.2000 | | |
| 16 | Infinity | 0.5000 | 1.52 | 64.20 |
| 17 | Infinity | 0.1196 | | |
| IMA | / | / | | |

In this example, the seventh lens is an aspherical lens. Table 22 below shows the conic coefficient k that may be configured for the surface of the aspherical lens in this example, as well as various higher-order coefficients.

TABLE 22

| Surf | K | A | B | C | D | E | F | G |
|---|---|---|---|---|---|---|---|---|
| 12 | 31.1930 | −1.4270E−03 | 5.7734E−05 | 2.1256E−07 | 5.7734E−05 | 2.1256E−07 | −2.1200E−07 | 1.6632E−08 |
| 13 | −21.8950 | −5.8564E−04 | 2.6829E−05 | −3.9592E−07 | 2.6829E−05 | −3.9592E−07 | 3.9420E−07 | −4.4822E−08 |

Example XII

Figure 12:
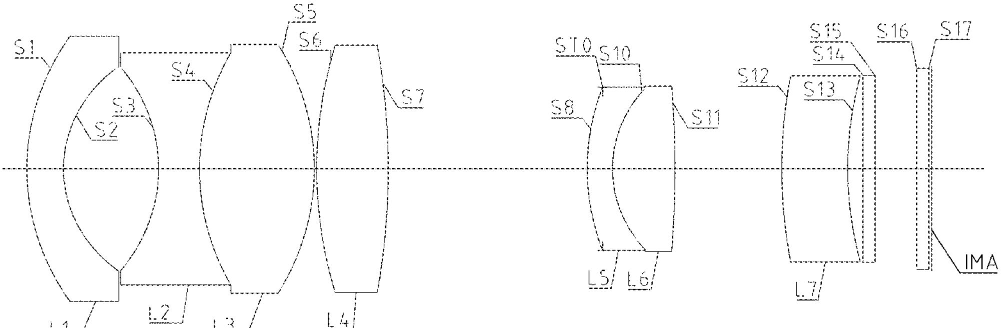
FIG. 12 is a schematic structural diagram of an optical lens assembly according to Example XII of the disclosure.

As shown in FIG. 12, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a negative refractive power; and a first side surface S8 of the fifth lens is a convex surface, and a second side surface S10 of the fifth lens is a concave surface. The sixth lens L6 has a positive refractive power; and a first side surface S10 of the sixth lens is a convex surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, a focal length F of the optical lens assembly is 7.7294 mm, a total optical length TTL of the optical lens assembly is 37.0537 mm, and a maximum FOV of the optical lens assembly is 70.26°.

In this example, the second lens and the third lens are cemented to form a first cemented lens, and the second side surface of the second lens and the first side surface of the third lens both are S4; and the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S4 of the second lens is a concave surface, and the first side surface S4 of the third lens is a convex surface; and the second side surface S10 of the fifth lens is a concave surface, and the first side surface S10 of the sixth lens is a convex surface.

Table 23 shows a basic structure parameter table of the optical lens assembly in Example XII, where curvature radius and thickness/distance are all in millimeters (mm). Surf is a surface number of a lens, Nd is a refractive index, Vd is an abbe number, and Infinity means infinite.

TABLE 23

| Surf | Radius | Thickness | Nd | Vd |
|---|---|---|---|---|
| 1 | 10.9675 | 1.5000 | 1.77 | 49.60 |
| 2 | 5.8143 | 3.8953 | | |
| 3 | −7.5217 | 1.6739 | 1.70 | 41.15 |
| 4 | 11.2930 | 4.7002 | 1.59 | 68.34 |

TABLE 23-continued

| Surf | Radius | Thickness | Nd | Vd |
|---|---|---|---|---|
| 5 | −11.2930 | 0.1000 | | |
| 6 | 20.8992 | 2.9251 | 1.88 | 39.22 |
| 7 | −34.8837 | 8.7810 | | |
| STO | Infinity | −0.6310 | | |
| 8 | 11.0145 | 1.0345 | 1.69 | 54.54 |
| 10 | 5.6054 | 2.5554 | 1.92 | 20.88 |
| 11 | −52.9233 | 4.3757 | | |
| 12 | 19.4345 | 2.7005 | 1.59 | 61.31 |
| 13 | 13.2016 | 0.6206 | | |
| 14 | Infinity | 0.5000 | 1.52 | 64.20 |
| 15 | Infinity | 1.7027 | | |
| 16 | Infinity | 0.5000 | 1.52 | 64.20 |
| 17 | Infinity | 0.1196 | | |
| IMA | / | / | | |

In this example, the seventh lens is an aspherical lens. Table 24 below shows the conic coefficient k that may be configured for the surface of the aspherical lens in this example, as well as various higher-order coefficients.

TABLE 24

| Surf | K | A | B | C | D | E | F | G |
|---|---|---|---|---|---|---|---|---|
| 12 | 17.8640 | −1.1607E−03 | 3.1670E−05 | −3.2558E−07 | 3.1670E−05 | −3.2558E−07 | −1.6553E−07 | 1.6333E−08 |
| 13 | −21.0790 | −1.8975E−04 | 5.6283E−06 | −9.8997E−07 | 5.6283E−06 | −9.8997E−07 | 4.3628E−07 | −4.2788E−08 |

consistent with the reference signs of the foregoing examples, the first side surface of the third lens is still expressed as S4.

In this example, a focal length F of the optical lens assembly is 7.9105 mm, a total optical length TTL of the optical lens assembly is 36.8882 mm, and a maximum FOV of the optical lens assembly is 70.00°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a convex surface, and the first side surface S10 of the sixth lens is a concave surface.

In this example, the second side surface of the seventh lens has an inflection point.

Table 25 shows a basic structure parameter table of the optical lens assembly in Example XIII, where curvature radius and thickness/distance are all in millimeters (mm). Surf is a surface number of a lens, Nd is a refractive index, Vd is an abbe number, and Infinity means infinite.

Example XIII

Figure 13:
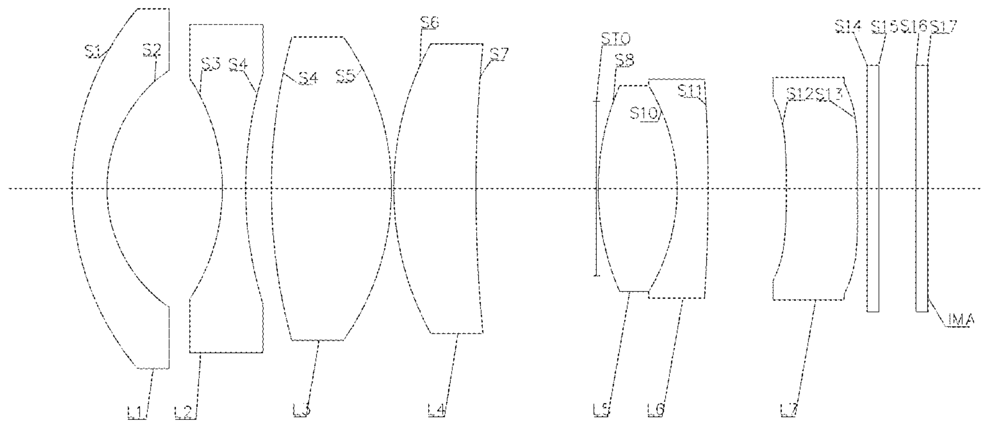
FIG. 13 is a schematic structural diagram of an optical lens assembly according to Example XIII of the disclosure.

As shown in FIG. 13, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a concave surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

It is to be noted that, in this example, the second lens is spaced apart from the third lens, and in order to maintain

TABLE 25

| Surf | Radius | Thickness | Nd | Vd |
|---|---|---|---|---|
| 1 | 12.0000 | 1.5000 | 1.57 | 56.13 |
| 2 | 6.1655 | 4.9765 | | |
| 3 | −8.6846 | 1.0000 | 1.66 | 35.48 |
| 4 | 16.6786 | 1.1112 | | |
| 5 | 24.4394 | 5.1759 | 1.57 | 71.30 |
| 6 | −11.2744 | 0.0999 | | |
| 7 | 12.8947 | 3.5414 | 1.91 | 35.25 |
| 8 | 62.9462 | 5.1905 | | |
| STO | Infinity | 0.0843 | | |
| 10 | 11.0106 | 3.4012 | 1.70 | 51.12 |
| 11 | −8.5675 | 1.3359 | 1.95 | 17.94 |
| 12 | −70.3447 | 3.3714 | | |
| 13 | −71.9882 | 3.0623 | 1.59 | 61.31 |
| 14 | 72.8658 | 0.4247 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.0130 | | |
| IMA | / | / | | |

In this example, the seventh lens is an aspherical lens. Table 26 below shows the conic coefficient k that may be configured for the surface of the aspherical lens in this example, as well as various higher-order coefficients A (4th-order coefficient), B (6th-order coefficient), C (8th-order coefficient), D (10th-order coefficient), E (12th-order coefficient), F (14th-order coefficient), G (16th-order coefficient), H (18th-order coefficient), and I (20-order coefficient).

TABLE 26

| Surf | K | A | B | C | D | E |
|---|---|---|---|---|---|---|
| 13 | −8.7252 | −1.8935E−03 | −1.9626E−05 | 5.4440E−06 | −7.5571E−07 | 5.8110E−08 |
| 14 | −868.5994 | −1.7587E−03 | −4.4134E−06 | 2.0182E−06 | −1.0904E−07 | −1.2331E−09 |

| Surf | F | G | H | I |
|---|---|---|---|---|
| 13 | −2.5882E−09 | 5.0043 E−11 | 7.58039E−13 | −3.60154E−14 |
| 14 | 4.4703E−10 | −1.8444E−11 | 1.48229E−13 | 3.73242E−15 |

Figure 14:
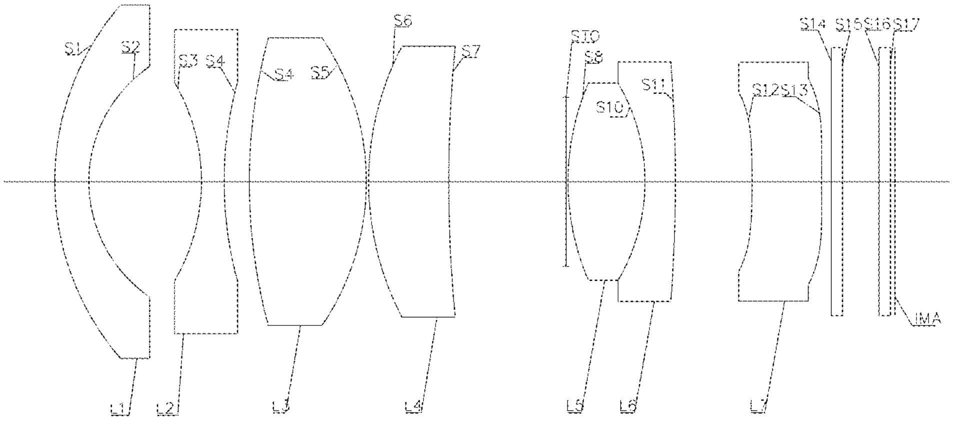
FIG. 14 is a schematic structural diagram of an optical lens assembly according to Example XIV of the disclosure.

As shown in FIG. 14, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

Example XIV

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a negative refractive power; and a first side surface S12 of the seventh lens is a concave surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 8.0316 mm, a total optical length TTL of the optical lens assembly is 36.9575 mm, and a maximum FOV of the optical lens assembly is 70.00°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a convex surface, and the first side surface S10 of the sixth lens is a concave surface.

In this example, the first side surface of the seventh lens and the second side surface of the seventh lens both have inflection points.

Table 27 shows a basic structure parameter table of the optical lens assembly in Example XIV, where curvature radius and thickness/distance are all in millimeters (mm). Surf is a surface number of a lens, Nd is a refractive index, Vd is an abbe number, and Infinity means infinite.

TABLE 27

| Surf | Radius | Thickness | Nd | Vd |
|---|---|---|---|---|
| 1 | 12.0000 | 1.5000 | 1.57 | 56.13 |
| 2 | 6.1964 | 4.9517 | | |
| 3 | −8.7282 | 1.0000 | 1.66 | 35.48 |
| 4 | 16.7624 | 1.1056 | | |
| 5 | 24.5622 | 5.1500 | 1.57 | 71.30 |
| 6 | −11.3311 | 0.0999 | | |
| 7 | 12.9595 | 3.5237 | 1.91 | 35.25 |
| 8 | 63.2625 | 5.1646 | | |
| STO | Infinity | 0.0843 | | |
| 10 | 11.0659 | 3.3842 | 1.70 | 51.12 |
| 11 | −8.6106 | 1.3359 | 1.95 | 17.94 |
| 12 | −70.6982 | 3.3714 | | |
| 13 | −72.3499 | 3.0623 | 1.59 | 61.31 |
| 14 | 73.2319 | 0.4247 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.1992 | | |
| IMA | / | / | | |

In this example, the seventh lens is an aspherical lens. Table 28 below shows the conic coefficient k that may be configured for the surface of the aspherical lens in this example, as well as various higher-order coefficients.

TABLE 28

| Surf | K | A | B | C | D | E |
|---|---|---|---|---|---|---|
| 13 | −8.7252 | −1.8935E−03 | −1.9626E−05 | 5.4440E−06 | −7.5571E−07 | 5.8110E−08 |
| 14 | −868.5994 | −1.7587E−03 | −4.4134E−06 | 2.0182E−06 | −1.0904E−07 | −1.2331E−09 |

| Surf | F | G | H | I |
|---|---|---|---|---|
| 13 | −2.5882E−09 | 5.0043E−11 | 7.58039E−13 | −3.60154E−14 |
| 14 | 4.4703E−10 | −1.8444E−11 | 1.48229E−13 | 3.73242E−15 |

Example XV

Figure 15:
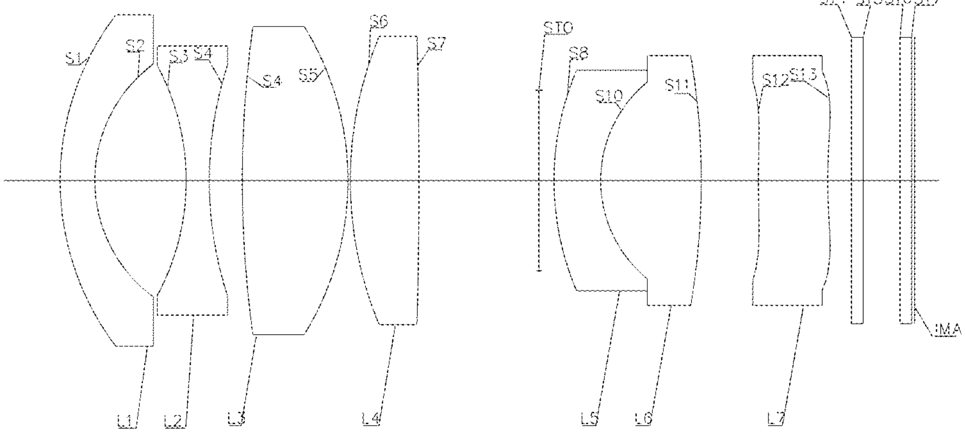
FIG. 15 is a schematic structural diagram of an optical lens assembly according to Example XV of the disclosure.

As shown in FIG. 15, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a negative refractive power; and a first side surface S8 of the fifth lens is a convex surface, and a second side surface S10 of the fifth lens is a concave surface. The sixth lens L6 has a positive refractive power; and a first side surface S10 of the sixth lens is a convex surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, the second side surface of the seventh lens has an inflection point.

Table 29 shows a basic structure parameter table of the optical lens assembly in Example XV, where curvature radius and thickness/distance are all in millimeters (mm). Surf is a surface number of a lens, Nd is a refractive index, Vd is an abbe number, and Infinity means infinite.

TABLE 29

| Surf | Radius | Thickness | Nd | Vd |
|---|---|---|---|---|
| 1 | 11.8156 | 1.5000 | 1.57 | 56.13 |
| 2 | 6.2517 | 3.9560 | | |
| 3 | −10.4538 | 1.0000 | 1.66 | 35.48 |
| 4 | 16.1095 | 1.4282 | | |
| 5 | 48.1804 | 4.5740 | 1.57 | 71.30 |
| 6 | −12.6206 | 0.0999 | | |
| 7 | 16.0907 | 2.9736 | 1.91 | 35.25 |
| 8 | −218.8028 | 5.1905 | | |
| STO | Infinity | 0.6543 | | |
| 10 | 12.0942 | 2.0197 | 1.95 | 17.94 |
| 11 | 5.4820 | 4.3550 | 1.70 | 51.12 |
| 12 | −31.7917 | 2.4689 | | |
| 13 | 42.1062 | 3.0003 | 1.59 | 61.31 |
| 14 | 19.8152 | 1.0347 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.1294 | | |
| IMA | / | / | | |

In this example, the seventh lens is an aspherical lens. Table 30 below shows the conic coefficient k that may be configured for the surface of the aspherical lens in this example, as well as various higher-order coefficients.

TABLE 30

| Surf | K | A | B | C | D | E |
|---|---|---|---|---|---|---|
| 13 | 12.7937 | −1.3754E−03 | −2.0363E−05 | 6.9953E−06 | −9.1071E−07 | 5.9951E−08 |
| 14 | −9.5517 | −1.4524E−03 | −9.0469E−06 | 2.2139E−06 | −1.6022E−07 | −6.4973E−10 |

| Surf | F | G | H | I |
|---|---|---|---|---|
| 13 | −2.1341E−09 | 4.7852E−11 | −1.23294E−12 | 2.39836E−14 |
| 14 | 5.1006E−10 | −1.8092E−11 | 6.49965E−14 | 3.79325E−15 |

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 7.9616 mm, a total optical length TTL of the optical lens assembly is 36.9845 mm, and a maximum FOV of the optical lens assembly is 70.00°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a concave surface, and the first side surface S10 of the sixth lens is a convex surface.

Example XVI

Figure 16:
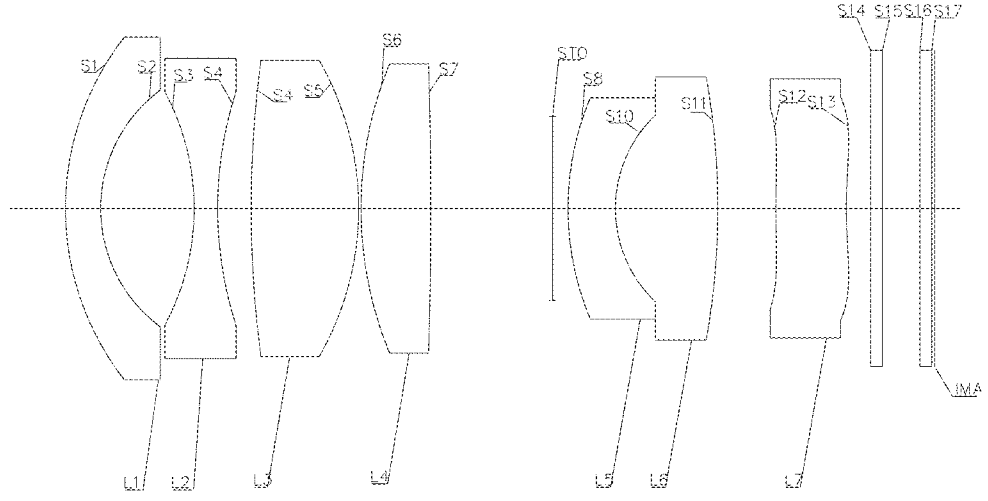
FIG. 16 is a schematic structural diagram of an optical lens assembly according to Example XVI of the disclosure.

As shown in FIG. 16, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a convex surface. The fifth lens L5 has a negative refractive power; and a first side surface S8 of the fifth lens is a convex surface, and a second side surface S10 of the fifth lens is a concave surface. The sixth lens L6 has a positive refractive power; and a first side surface S10 of the sixth lens is a convex surface, and a second side surface S11 of the sixth lens is a convex surface. The seventh lens L7 has a negative refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 7.9563 mm, a total optical length TTL of the optical lens assembly is 37.0005 mm, and a maximum FOV of the optical lens assembly is 70.00°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a concave surface, and the first side surface S10 of the sixth lens is a convex surface.

In this example, the first side surface of the seventh lens and the second side surface of the seventh lens both have inflection points.

Table 31 shows a basic structure parameter table of the optical lens assembly in Example XVI, where curvature radius and thickness/distance are all in millimeters (mm). Surf is a surface number of a lens, Nd is a refractive index, Vd is an abbe number, and Infinity means infinite.

TABLE 31

| Surf | Radius | Thickness | Nd | Vd |
|---|---|---|---|---|
| 1 | 11.8156 | 1.5000 | 1.57 | 56.13 |
| 2 | 6.2517 | 3.9560 | | |
| 3 | −10.4538 | 1.0000 | 1.66 | 35.48 |
| 4 | 16.1095 | 1.4282 | | |
| 5 | 48.1804 | 4.5740 | 1.57 | 71.30 |
| 6 | −12.6206 | 0.0999 | | |
| 7 | 16.0907 | 2.9736 | 1.91 | 35.25 |
| 8 | −218.8028 | 5.1905 | | |
| STO | Infinity | 0.6543 | | |
| 10 | 12.0942 | 2.0197 | 1.95 | 17.94 |
| 11 | 5.4820 | 4.3550 | 1.70 | 51.12 |
| 12 | −31.7917 | 2.4689 | | |
| 13 | 42.1062 | 3.0003 | 1.59 | 61.31 |
| 14 | 19.8152 | 1.0347 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.1294 | | |
| IMA | / | / | | |

In this example, the seventh lens is an aspherical lens. Table 32 below shows the conic coefficient k that may be configured for the surface of the aspherical lens in this example, as well as various higher-order coefficients.

TABLE 32

| Surf | K | A | B | C | D | E |
|---|---|---|---|---|---|---|
| 13 | 12.9006 | −1.3751E−03 | −2.0354E−05 | 6.9957E−06 | −9.1070E−07 | 5.9951E−08 |
| 14 | −9.5351 | −1.4522E−03 | −9.0379E−06 | 2.2142E−06 | −1.6021E−07 | −6.4998E−10 |

| Surf | F | G | H | I |
|---|---|---|---|---|
| 13 | −2.1341E−09 | 4.7851E−11 | −1.23296E−12 | 2.39875E−14 |
| 14 | 5.1006E−10 | −1.8092E−11 | 6.4997E−14 | 3.79323E−15 |

Example XVII

Figure 17:
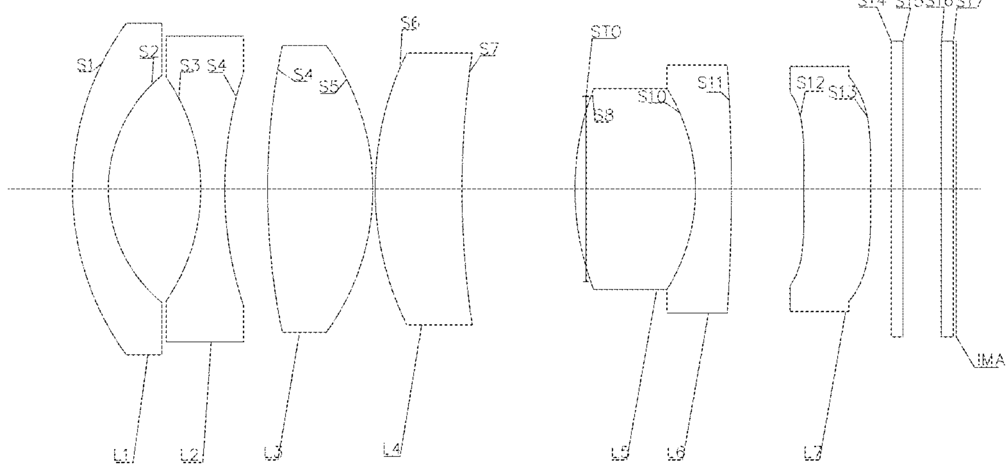
FIG. 17 is a schematic structural diagram of an optical lens assembly according to Example XVII of the disclosure.

As shown in FIG. 17, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a positive refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

In this example, the first side surface of the seventh lens and the second side surface of the seventh lens both have inflection points.

Table 33 shows a basic structure parameter table of the optical lens assembly in Example XVII, where curvature radius and thickness/distance are all in millimeters (mm). Surf is a surface number of a lens, Nd is a refractive index, Vd is an abbe number, and Infinity means infinite.

TABLE 33

| Surf | Radius | Thickness | Nd | Vd |
|---|---|---|---|---|
| 1 | 11.7827 | 1.5000 | 1.57 | 56.13 |
| 2 | 6.1348 | 3.8709 | | |
| 3 | −8.2394 | 1.0000 | 1.66 | 35.48 |
| 4 | 15.4081 | 1.7962 | | |
| 5 | 29.3615 | 4.4049 | 1.57 | 71.30 |
| 6 | −10.1707 | 0.0999 | | |
| 7 | 12.8038 | 3.6378 | 1.91 | 35.25 |
| 8 | 38.0283 | 5.1905 | | |
| STO | Infinity | −0.4633 | | |
| 10 | 11.6272 | 5.0515 | 1.70 | 51.12 |
| 11 | −7.9302 | 1.5018 | 1.95 | 17.94 |
| 12 | −75.3443 | 3.0251 | | |
| 13 | 101.9120 | 2.8009 | 1.59 | 61.31 |
| 14 | 256.5227 | 0.8600 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.1253 | | |
| IMA | / | / | | |

In this example, the seventh lens is an aspherical lens. Table 34 below shows the conic coefficient k that may be configured for the surface of the aspherical lens in this example, as well as various higher-order coefficients.

TABLE 34

| Surf | K | A | B | C | D | E |
|---|---|---|---|---|---|---|
| 13 | 199.9985 | −2.1288E−03 | 1.4711E−05 | −4.2413E−06 | −4.4005E−08 | 7.2442E−08 |
| 14 | 200.0070 | −1.8317E−03 | —6.1645E−05 | 1.4615E−05 | −1.7407E−06 | 1.0371E−07 |

| Surf | F | G | H | I |
|---|---|---|---|---|
| 13 | −5.9477E−09 | −8.8104E−11 | 2.36792E−11 | −6.28831E−13 |
| 14 | −1.5833E−09 | −1.5210E−10 | 8.20394E−12 | −1.21591E−13 |

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 7.9832 mm, a total optical length TTL of the optical lens assembly is 37.0015 mm, and a maximum FOV of the optical lens assembly is 70.10°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a convex surface, and the first side surface S10 of the sixth lens is a concave surface.

Example XVIII

Figure 18:
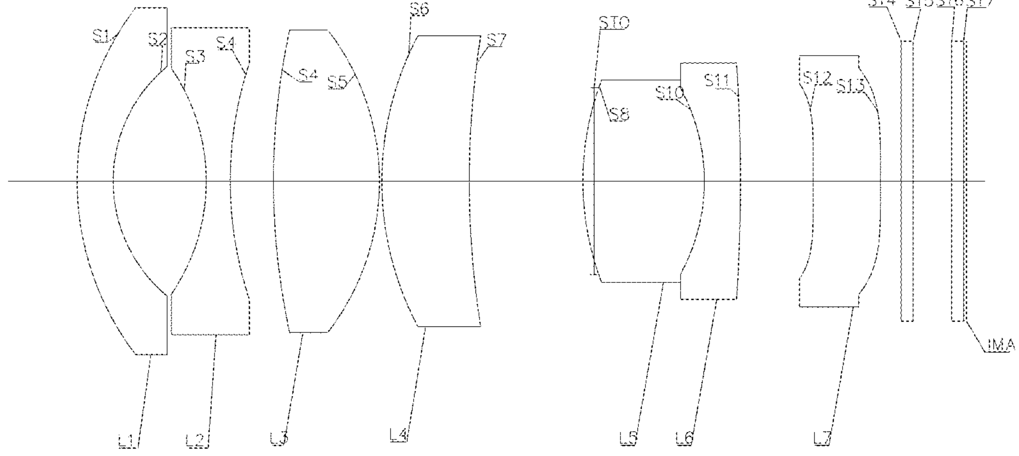
FIG. 18 is a schematic structural diagram of an optical lens assembly according to Example XVIII of the disclosure.

As shown in FIG. 18, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a convex surface, and a second side surface S2 of the first lens is a concave surface. The second lens L2 has a negative refractive power; and a first side surface S3 of the second lens is a concave surface, and a second side surface S4 of the second lens is a concave surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a convex surface. The seventh lens L7 has a positive refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 7.9772 mm, a total optical length TTL of the optical lens assembly is 36.9975 mm, and a maximum FOV of the optical lens assembly is 70.10°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a convex surface, and the first side surface S10 of the sixth lens is a concave surface.

In this example, the first side surface of the seventh lens and the second side surface of the seventh lens both have inflection points.

Table 35 shows a basic structure parameter table of the optical lens assembly in Example XVIII, where curvature radius and thickness/distance are all in millimeters (mm). Surf is a surface number of a lens, Nd is a refractive index, Vd is an abbe number, and Infinity means infinite.

TABLE 35

| Surf | Radius | Thickness | Nd | Vd |
|---|---|---|---|---|
| 1 | 11.7808 | 1.5000 | 1.57 | 56.13 |
| 2 | 6.1354 | 3.8710 | | |
| 3 | −8.2395 | 1.0000 | 1.66 | 35.48 |
| 4 | 15.4083 | 1.7962 | | |
| 5 | 29.3626 | 4.4087 | 1.57 | 71.30 |
| 6 | −10.1707 | 0.0999 | | |
| 7 | 12.8038 | 3.6369 | 1.91 | 35.25 |
| 8 | 38.0289 | 5.1905 | | |
| STO | Infinity | −0.4634 | | |
| 10 | 11.6333 | 5.0513 | 1.70 | 51.12 |
| 11 | −7.9330 | 1.5014 | 1.95 | 17.94 |
| 12 | −74.9696 | 3.0250 | | |
| 13 | 100.9840 | 2.8007 | 1.59 | 61.31 |
| 14 | 255.6174 | 0.8599 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.1193 | | |
| IMA | / | / | | |

In this example, the seventh lens is an aspherical lens. Table 36 below shows the conic coefficient k that may be configured for the surface of the aspherical lens in this example, as well as various higher-order coefficients.

TABLE 36

| Surf | K | A | B | C | D | E |
|---|---|---|---|---|---|---|
| 13 | 199.0339 | −2.1287E−03 | 1.4717E−05 | −4.2412E−06 | −4.4008E−08 | 7.2442E−08 |
| 14 | 198.9998 | −1.8310E−03 | −6.1660E−05 | 1.4614E−05 | −1.7407E−06 | 1.0371E−07 |

| Surf | F | G | H | I |
|---|---|---|---|---|
| 13 | −5.9478E−09 | −8.8104E−11 | 2.36793E−11 | −6.28821E−13 |
| 14 | −1.5833E−09 | −1.5210E−10 | 8.20395E−12 | −1.21591E−13 |

Example XIX

Figure 19:
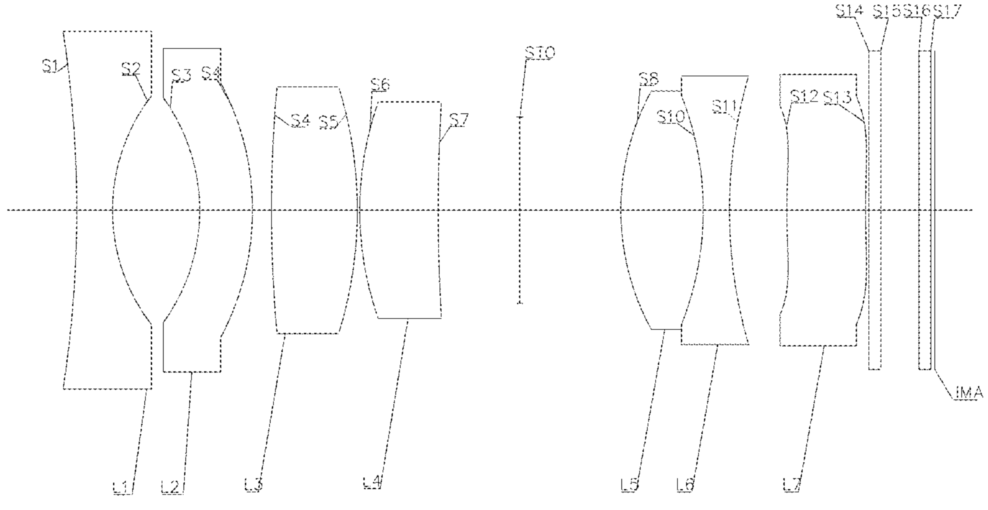
FIG. 19 is a schematic structural diagram of an optical lens assembly according to Example XIX of the disclosure.

As shown in FIG. 19, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a concave surface, and a second side surface S2 of the first lens is a concave surface. The second lens L2 has a negative refractive power; and a first side surface S3 of the second lens is a concave surface, and a second side surface S4 of the second lens is a convex surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a concave surface. The seventh lens L7 has a positive refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass.

Light from an object passes through various surfaces S1 to S17 in sequence, and is finally imaged on the imaging surface IMA.

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 8.0283 mm, a total optical length TTL of the optical lens assembly is 36.0164 mm, and a maximum FOV of the optical lens assembly is 70.10°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a convex surface, and the first side surface S10 of the sixth lens is a concave surface.

In this example, the first side surface of the seventh lens and the second side surface of the seventh lens both have inflection points.

Table 37 shows a basic structure parameter table of the optical lens assembly in Example XIX, where curvature radius and thickness/distance are all in millimeters (mm). Surf is a surface number of a lens, Nd is a refractive index, Vd is an abbe number, and Infinity means infinite.

TABLE 37

| Surf | Radius | Thickness | Nd | Vd |
|---|---|---|---|---|
| 1 | −49.1682 | 1.5000 | 1.53 | 48.84 |
| 2 | 7.8486 | 3.6579 | | |
| 3 | −8.0425 | 2.2188 | 1.92 | 20.88 |
| 4 | −11.3127 | 0.7952 | | |
| 5 | 57.8753 | 3.6064 | 1.59 | 68.34 |
| 6 | −17.4396 | 0.1000 | | |
| 7 | 13.6346 | 3.2949 | 1.69 | 54.75 |
| 8 | 78.3784 | 3.4179 | | |
| STO | Infinity | 4.2478 | | |
| 10 | 10.4217 | 3.4568 | 1.88 | 39.22 |
| 11 | −13.0549 | 1.0995 | 1.95 | 17.94 |
| 12 | 20.1575 | 2.4127 | | |
| 13 | 28.4083 | 3.3000 | 1.59 | 61.31 |
| 14 | 33.5369 | 0.1420 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.1664 | | |
| IMA | / | / | | |

In this example, the seventh lens is an aspherical lens. Table 38 below shows the conic coefficient k that may be configured for the surface of the aspherical lens in this example, as well as various higher-order coefficients.

TABLE 38

| Surf | K | A | B | C | D |
|---|---|---|---|---|---|
| 13 | −98.0120 | −9.0506E−04 | −4.6731E−05 | 2.1763E−06 | −1.5345E−07 |
| 14 | 36.8360 | −1.2992E−03 | −3.6338E−05 | 2.2677E−06 | −1.3777E−07 |

| Surf | E | F | G | H | I |
|---|---|---|---|---|---|
| 13 | 6.8470E−09 | −1.2221E−10 | 7.2959E−13 | −98.0120 | −9.0506E−04 |
| 14 | 6.0966E−09 | −1.3433E−10 | 9.9469E−13 | 36.8360 | −1.2992E−03 |

Example XX

Figure 20:
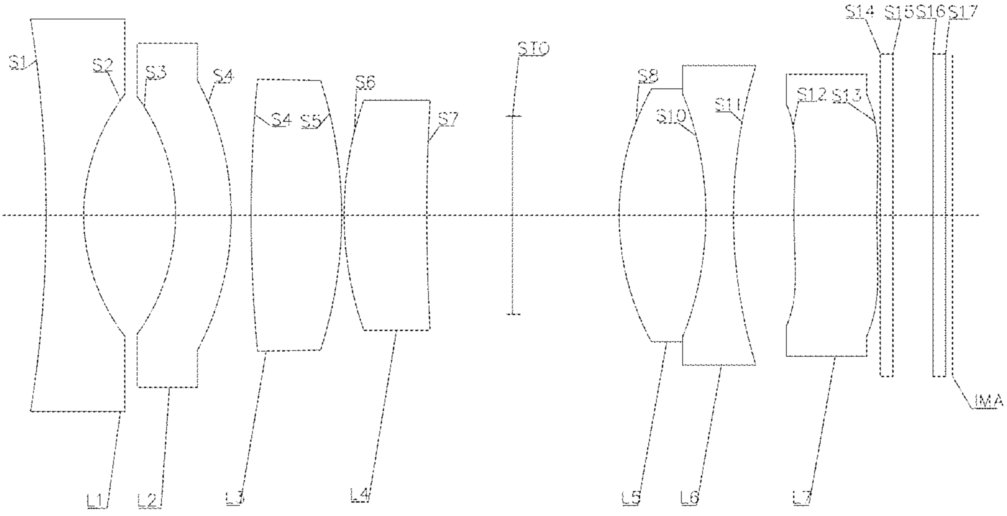
FIG. 20 is a schematic structural diagram of an optical lens assembly according to Example XX of the disclosure.

As shown in FIG. 20, an optical lens assembly sequentially includes from a first side to a second side: a first lens L1, a second lens L2, a third lens L3, a fourth lens L4, a diaphragm STO, a fifth lens L5, a sixth lens L6, a seventh lens L7, an optical filter, protective glass, and an imaging surface IMA.

The first lens L1 has a negative refractive power; and a first side surface S1 of the first lens is a concave surface, and a second side surface S2 of the first lens is a concave surface. The second lens L2 has a negative refractive power; and a first side surface S3 of the second lens is a concave surface, and a second side surface S4 of the second lens is a convex surface. The third lens L3 has a positive refractive power; and a first side surface S4 of the third lens is a convex surface, and a second side surface S5 of the third lens is a convex surface. The fourth lens L4 has a positive refractive power; and a first side surface S6 of the fourth lens is a convex surface, and a second side surface S7 of the fourth lens is a concave surface. The fifth lens L5 has a positive refractive power; and a first side surface S8 of the fifth lens is a convex surface, and a second side surface S10 of the fifth lens is a convex surface. The sixth lens L6 has a negative refractive power; and a first side surface S10 of the sixth lens is a concave surface, and a second side surface S11 of the sixth lens is a concave surface. The seventh lens L7 has a positive refractive power; and a first side surface S12 of the seventh lens is a convex surface, and a second side surface S13 of the seventh lens is a concave surface. The optical filter has a first side surface S14 of the optical filter and a second side surface S15 of the optical filter; and the protective glass has a first side surface S16 of the protective glass and a second side surface S17 of the protective glass. Light from an object passes through various surfaces S1 to S17 in sequence, and is finally imaged on the imaging surface IMA.

It is to be noted that, in this example, the second lens is spaced apart from the third lens, and in order to maintain consistent with the reference signs of the foregoing examples, the first side surface of the third lens is still expressed as S4.

In this example, a focal length F of the optical lens assembly is 8.0989 mm, a total optical length TTL of the optical lens assembly is 36.1262 mm, and a maximum FOV of the optical lens assembly is 70.10°.

In this example, the fifth lens and the sixth lens are cemented to form a second cemented lens, and the second side surface of the fifth lens and the first side surface of the sixth lens both are S10. However, for the first side surface and the second side surface, when curvature radii are the same, surface types of the first side surface and the second side surface are different, such that the second side surface S10 of the fifth lens is a convex surface, and the first side surface S10 of the sixth lens is a concave surface.

In this example, the first side surface of the seventh lens and the second side surface of the seventh lens both have inflection points.

Table 39 shows a basic structure parameter table of the optical lens assembly in Example XX, where curvature radius and thickness/distance are all in millimeters (mm). Surf is a surface number of a lens, Nd is a refractive index, Vd is an abbe number, and Infinity means infinite.

TABLE 39

| Surf | Radius | Thickness | Nd | Vd |
|---|---|---|---|---|
| 1 | −49.4141 | 1.5000 | 1.53 | 48.84 |
| 2 | 7.8878 | 3.6579 | | |
| 3 | −8.0827 | 2.2188 | 1.92 | 20.88 |
| 4 | −11.3693 | 0.7952 | | |
| 5 | 58.1647 | 3.6064 | 1.59 | 68.34 |
| 6 | −17.5268 | 0.1000 | | |
| 7 | 13.7027 | 3.2949 | 1.69 | 54.75 |
| 8 | 78.7703 | 3.4179 | | |
| STO | Infinity | 4.2478 | | |
| 10 | 10.4738 | 3.4568 | 1.88 | 39.22 |
| 11 | −13.1201 | 1.0995 | 1.95 | 17.94 |
| 12 | 20.2583 | 2.4127 | | |
| 13 | 28.5504 | 3.3000 | 1.59 | 61.31 |
| 14 | 33.7046 | 0.1420 | | |
| 15 | Infinity | 0.5000 | 1.52 | 64.20 |
| 16 | Infinity | 1.6000 | | |
| 17 | Infinity | 0.5000 | 1.52 | 64.20 |
| 18 | Infinity | 0.2762 | | |
| IMA | / | / | | |

In this example, the seventh lens is an aspherical lens. Table 40 below shows the conic coefficient k that may be configured for the surface of the aspherical lens in this example, as well as various higher-order coefficients.

TABLE 40

| Surf | K | A | B | C | D |
|---|---|---|---|---|---|
| 13 | −99.00 | −9.0506 | −4.6731E−05 | 2.1763E−06 | −1.5345 |
| 14 | 37.2070 | −1.2992E−03 | −3.6338E−05 | 2.2677E−06 | −1.3777E−07 |

| Surf | E | F | G | H | I |
|---|---|---|---|---|---|
| 13 | 6.8470E−09 | −1.2221 | 7.2959E−13 | −99.00 | −9.0506 |
| 14 | 6.0966E−09 | −1.3433E−10 | 9.9469E−13 | 37.2070 | −1.2992E−03 |

To sum up, Example I to Example XX meet relationships shown in Table 41.

TABLE 41

| | example | | | | | | | | | |
|---|---|---|---|---|---|---|---|---|---|---|
| Parameter | 1 | 2 | 3 | 4 | 5 | 6 | 7 | 8 | 9 | 10 |
| R11/F | −9.557 | −9.066 | −5.330 | −4.732 | −4.934 | −4.955 | −4.542 | −4.996 | −10.596 | −3.875 |
| d11/TTL | 0.115 | 0.115 | 0.123 | 0.128 | 0.116 | 0.116 | 0.115 | 0.115 | 0.117 | 0.117 |
| d7/TTL | 0.207 | 0.198 | 0.187 | 0.187 | 0.186 | 0.187 | 0.189 | 0.188 | 0.185 | 0.188 |
| BFL/TTL | 0.084 | 0.083 | 0.091 | 0.091 | 0.090 | 0.095 | 0.139 | 0.130 | 0.163 | 0.193 |
| TTL/H/FOV | 0.057 | 0.058 | 0.057 | 0.058 | 0.057 | 0.056 | 0.057 | 0.057 | 0.057 | 0.057 |
| F/ENPD | 1.600 | 1.600 | 1.600 | 1.600 | 1.600 | 1.600 | 1.600 | 1.600 | 1.600 | 1.600 |
| TTL/(H/2) | 7.979 | 8.142 | 7.982 | 8.207 | 8.070 | 7.935 | 7.983 | 8.023 | 8.019 | 8.041 |
| D13/H | 0.959 | 0.966 | 0.989 | 1.017 | 0.968 | 0.984 | 0.941 | 0.969 | 0.998 | 0.958 |
| F3/F | 1.356 | 1.343 | 1.402 | 1.317 | 1.244 | 1.218 | 1.228 | 1.241 | 1.251 | 1.627 |
| \|R7/R8\| | 0.124 | 0.239 | 0.312 | 0.305 | 0.102 | 0.077 | 0.087 | 0.109 | 0.663 | 0.934 |
| arctan(1/K(S2)) | 51.901 | 53.154 | 53.895 | 53.784 | 51.292 | 51.534 | 52.321 | 51.581 | 48.607 | 53.260 |
| (d3 + d4)/TTL | 0.199 | 0.203 | 0.149 | 0.159 | 0.176 | 0.172 | 0.170 | 0.172 | 0.177 | 0.107 |
| (H/2)/(F * tan(θ/2)) | 0.836 | 0.812 | 0.840 | 0.813 | 0.821 | 0.833 | 0.841 | 0.839 | 0.853 | 0.860 |
| (R1/D1)/(R2/D2) | 1.514 | 1.426 | 1.606 | 1.631 | 1.599 | 1.553 | 1.691 | 1.669 | 1.501 | 1.427 |
| (R2 − R3)/(R2 + R3) | −6.514 | −6.107 | −6.104 | −6.567 | −9.162 | −8.569 | −8.399 | −9.331 | −34.61 | −10.25 |
| F23/F | −6.469 | −7.107 | −4.217 | −4.445 | −4.682 | −4.801 | −4.824 | −4.606 | −3.529 | −2.388 |
| F1/F | −2.388 | −2.577 | −2.068 | −1.982 | −2.072 | −2.109 | −1.900 | −1.958 | −2.310 | −2.477 |
| \|(H − F * θ)/(F * θ) | 0.041 | 0.068 | 0.037 | 0.067 | 0.058 | 0.044 | 0.035 | 0.038 | 0.022 | 0.014 |
| \|Rj1\|/(Φj1/2) | 2.165 | 2.120 | 2.379 | 2.239 | 2.091 | 2.022 | 2.068 | 2.085 | 2.161 | 2.738 |
| d23/TL ≤ 0.1 | 0.000 | 0.000 | 0.000 | 0.000 | 0.000 | 0.000 | 0.000 | 0.000 | 0.000 | 0.000 |
| F2/F | −0.857 | −0.857 | −0.874 | −0.820 | −0.759 | −0.752 | −0.758 | −0.755 | −0.702 | −0.862 |
| MAX[F1, F2]/F | −0.857 | −0.857 | −0.874 | −0.820 | −0.759 | −0.752 | −0.758 | −0.755 | −0.702 | −0.862 |
| \|F7/F\| ≥ 4 | 7.326 | 6.012 | 24.35 | 13.24 | 10.28 | 10.33 | 157.5 | 190.5 | 4.040 | 4.055 |
| d12/TL | 0.127 | 0.127 | 0.130 | 0.130 | 0.126 | 0.116 | 0.135 | 0.134 | 0.139 | 0.144 |
| F56/F ≤ 4.5 | 2.390 | 2.170 | 2.576 | 2.704 | 2.529 | 2.599 | 2.620 | 2.631 | 5.769 | 2.379 |
| F4/F | 2.112 | 2.240 | 1.777 | 1.733 | 1.808 | 1.808 | 1.800 | 1.809 | 1.729 | 1.787 |
| F5/F6 | −0.686 | −0.654 | −0.665 | −0.687 | −0.687 | −0.693 | −0.676 | −0.690 | −0.844 | −0.526 |
| F2/F3 | −0.632 | −0.639 | −0.623 | −0.623 | −0.611 | −0.617 | −0.617 | −0.609 | −0.561 | −0.530 |
| TL/d3 | 21.15 | 21.51 | 49.50 | 34.44 | 31.09 | 30.85 | 36.35 | 33.18 | 57.59 | 30.168 |

TABLE 41-continued

| | | | | | | | | | | |
|---|---|---|---|---|---|---|---|---|---|---|
| TL/d34 | 339.053 | 339.211 | 337.974 | 338.000 | 336.538 | 33.761 | 318.831 | 322.010 | 309.763 | 298.4 |
| R6/R7 | −0.881 | −0.925 | −0.766 | −0.737 | −0.764 | −0.764 | −0.767 | −0.757 | −0.530 | −0.627 |
| R1/R2 | 1.943 | 1.827 | 2.095 | 2.134 | 2.074 | 2.017 | 2.215 | 2.178 | 1.935 | 1.847 |
| R3/R4 | −0.754 | −0.763 | −0.680 | −0.695 | −0.695 | −0.707 | −0.706 | −0.691 | −0.610 | −0.500 |

| | example | | | | | | | | | |
|---|---|---|---|---|---|---|---|---|---|---|
| Parameter | 11 | 12 | 13 | 14 | 15 | 16 | 17 | 18 | 19 | 20 |
| R11/F | −5.020 | −6.847 | −8.893 | −8.803 | −3.993 | −3.997 | −9.438 | −9.398 | −6.124 | −6.101 |
| d11/TTL | 0.123 | 0.118 | 0.091 | 0.091 | 0.067 | 0.067 | 0.082 | 0.082 | 0.067 | 0.067 |
| d7/TTL | 0.211 | 0.220 | 0.143 | 0.142 | 0.158 | 0.158 | 0.128 | 0.128 | 0.213 | 0.212 |
| BFL/TTL | 0.106 | 0.093 | 0.082 | 0.087 | 0.102 | 0.102 | 0.097 | 0.097 | 0.081 | 0.084 |
| TTL/H/FOV | 0.057 | 0.057 | 0.057 | 0.057 | 0.057 | 0.057 | 0.057 | 0.057 | 0.056 | 0.055 |
| F/ENPD | 1.600 | 1.600 | 1.601 | 1.626 | 1.612 | 1.611 | 1.616 | 1.615 | 1.620 | 1.620 |
| TTL/(H/2) | 8.009 | 8.074 | 8.038 | 7.939 | 7.993 | 8.003 | 8.008 | 8.013 | 7.783 | 7.749 |
| D13/H | 0.881 | 0.902 | 0.987 | 0.981 | 1.023 | 1.024 | 1.015 | 1.016 | 1.031 | 1.033 |
| F3/F | 1.315 | 1.332 | 1.804 | 1.784 | 2.263 | 2.264 | 1.728 | 1.729 | 2.858 | 2.847 |
| \|R7/R8\| | 0.794 | 0.599 | 0.205 | 0.205 | 0.074 | 0.074 | 0.337 | 0.337 | 0.174 | 0.174 |
| arctan(1/K(S2)) | 54.452 | 52.390 | 55.553 | 55.248 | 53.506 | 53.574 | 50.636 | 50.632 | 37.619 | 37.586 |
| (d3 + d4)/TTL | 0.150 | 0.172 | 0.167 | 0.166 | 0.151 | 0.151 | 0.146 | 0.146 | 0.162 | 0.161 |
| (H/2)/(F * tan(θ/2)) | 0.850 | 0.844 | 0.829 | 0.828 | 0.830 | 0.830 | 0.825 | 0.825 | 0.822 | 0.821 |
| (R1/D1)/(R2/D2) | 1.464 | 1.456 | 1.501 | 1.496 | 1.469 | 1.469 | 1.493 | 1.493 | −5.006 | −5.009 |
| (R2 − R3)/(R2 + R3) | −7.667 | −7.811 | −5.895 | −5.895 | −3.976 | −3.980 | −6.830 | −6.832 | −81.955 | −81.942 |
| F23/F | −4.069 | −4.211 | −7.661 | −7.500 | −4.687 | −4.690 | −8.884 | −8.891 | 4.237 | 4.243 |
| F1/F | −2.313 | −2.364 | −3.097 | −3.083 | −3.238 | −3.241 | −3.108 | −3.111 | −1.564 | −1.558 |
| \|(H − F * θ)/(F * θ) | 0.025 | 0.032 | 0.050 | 0.051 | 0.049 | 0.049 | 0.054 | 0.054 | 0.058 | 0.059 |
| \|Rj1\|/(Φj1/2) | 2.166 | 2.162 | 2.808 | 2.824 | 2.862 | 2.859 | 2.973 | 2.975 | 2.086 | 2.081 |
| d23/TL ≤ 0.1 | 0.000 | 0.000 | 0.033 | 0.033 | 0.043 | 0.043 | 0.054 | 0.054 | 0.024 | 0.024 |
| F2/F | −2.313 | −2.364 | −3.097 | −3.083 | −3.238 | −3.241 | −3.108 | −3.111 | −1.564 | −1.558 |
| MAX[F1, F2]/F | −0.809 | −0.799 | −1.064 | −1.053 | −1.174 | −1.175 | −0.990 | −0.990 | −1.564 | −1.558 |
| \|F7/F\| ≥ 4 | 7.954 | 10.78 | 7.726 | 7.648 | 8.415 | 8.421 | 35.78 | 35.35 | 31.78 | 31.69 |
| d12/TL | 0.130 | 0.116 | 0.147 | 0.147 | 0.119 | 0.120 | 0.116 | 0.116 | 0.110 | 0.110 |
| F56/F ≤ 4.5 | 2.110 | 2.316 | 2.562 | 2.537 | 2.297 | 2.299 | 2.839 | 2.839 | 2.910 | 2.903 |
| F4/F | 1.974 | 1.953 | 2.164 | 2.143 | 2.067 | 2.069 | 2.469 | 2.470 | 2.903 | 2.893 |
| F5/F6 | −1.934 | −1.816 | −0.717 | −0.717 | −1.761 | −1.761 | −0.803 | −0.802 | −0.861 | −0.860 |
| F2/F3 | −0.615 | −0.600 | −0.590 | −0.590 | −0.519 | −0.519 | −0.573 | −0.573 | −1.934 | −1.929 |
| TL/d3 | 49.30 | 20.07 | 33.85 | 33.73 | 33.22 | 33.24 | 33.41 | 33.41 | 14.92 | 14.92 |
| TL/d34 | 330.607 | 336.108 | 338.845 | 337.674 | 332.537 | 332.731 | 334.497 | 334.518 | 331.080 | 331.080 |
| R6/R7 | −0.473 | −0.540 | −0.874 | −0.874 | −0.784 | −0.784 | −0.794 | −0.794 | −1.279 | −1.279 |
| R1/R2 | 1.906 | 1.886 | 1.946 | 1.937 | 1.890 | 1.890 | 1.921 | 1.920 | – | – |
| R3/R4 | −0.675 | −0.666 | −0.521 | −0.521 | −0.649 | −0.649 | −0.535 | −0.535 | | |

Table 42 provides a focal length F of the optical lens assembly in Example I to Example XX (in millimeter).

TABLE 42

| Para- | example | | | | | | | | | |
|---|---|---|---|---|---|---|---|---|---|---|
| meter | 1 | 2 | 3 | 4 | 5 | 6 | 7 | 8 | 9 | 10 |
| F | 7.8855 | 7.9518 | 7.8899 | 7.9242 | 7.9386 | 7.9582 | 7.8387 | 7.8149 | 7.6904 | 7.6084 |
| φ | 0.1268 | 0.1258 | 0.1257 | 0.1262 | 0.1260 | 0.1257 | 0.1276 | 0.1280 | 0.1300 | 0.1314 |
| FNO | 1.6000 | 1.6000 | 1.6000 | 1.6000 | 1.6000 | 1.6000 | 1.6000 | 1.6000 | 1.6000 | 1.6000 |
| ENPD | 4.9284 | 4.9699 | 4.9312 | 4.9526 | 4.9616 | 4.9739 | 4.8992 | 4.8843 | 4.8065 | 4.7553 |
| TTL | 37.0026 | 37.0000 | 37.2003 | 37.2000 | 36.9994 | 36.9993 | 37.0193 | 36.9977 | 36.9938 | 37.0058 |
| FOV | 70.2600 | 70.2600 | 70.2600 | 70.2600 | 70.2600 | 70.2600 | 70.2600 | 70.2600 | 70.2600 | 70.2600 |
| θ | 1.2263 | 1.2263 | 1.2263 | 1.2263 | 1.2263 | 1.2263 | 1.2263 | 1.2263 | 1.2263 | 1.2263 |
| H | 9.2751 | 9.0883 | 9.3216 | 9.0659 | 9.1698 | 9.3252 | 9.2743 | 9.2231 | 9.2260 | 9.2042 |
| D | 12.7430 | 12.8844 | 12.5373 | 12.3162 | 12.0091 | 11.8756 | 11.9029 | 11.8736 | 11.3391 | 12.0622 |
| TL | 33.9053 | 33.9211 | 33.7974 | 33.8000 | 33.6538 | 33.4979 | 31.8831 | 32.2010 | 30.9763 | 29.8483 |
| BFL | 3.0973 | 3.0789 | 3.4029 | 3.4000 | 3.3456 | 3.5015 | 5.1361 | 4.7968 | 6.0175 | 7.1575 |
| L | 13.3035 | 13.0233 | 14.4332 | 14.0430 | 13.8816 | 13.7149 | 13.4440 | 13.7289 | 15.1040 | 16.3288 |
| DST | 7.2933 | 7.2299 | 7.5062 | 7.5085 | 7.5420 | 7.5052 | 7.5580 | 7.6309 | 7.5337 | 7.8813 |
| DMAX | 12.7430 | 12.8844 | 12.5373 | 12.3162 | 12.0091 | 11.8756 | 11.9029 | 11.8736 | 11.3391 | 12.0622 |
| F1 | −18.8270 | −20.4894 | −16.3164 | −15.7050 | −16.4522 | −16.7799 | −14.8932 | −15.3037 | −17.7629 | −18.8463 |
| F2 | −5.7613 | −6.8183 | −6.8964 | −6.4995 | −6.0276 | −5.9816 | −5.9412 | −5.9037 | −5.3973 | −6.5572 |
| F3 | 10.6945 | 10.6757 | 11.0647 | 10.4398 | 9.8718 | 9.6902 | 9.6282 | 9.6973 | 9.6198 | 12.3754 |
| F4 | 16.6530 | 17.8123 | 14.0234 | 13.7306 | 14.3567 | 14.3889 | 14.1103 | 14.1396 | 13.2993 | 13.5952 |
| F5 | 7.3900 | 7.2554 | 7.8321 | 7.6706 | 7.3529 | 7.3236 | 7.3772 | 7.3629 | 8.7579 | 8.9945 |
| F6 | −10.7670 | −11.0865 | −11.7696 | −11.1678 | −10.7042 | −10.5693 | −10.9143 | −10.6742 | −10.3766 | −17.0874 |
| F7 | −57.7671 | −47.8085 | −192.1549 | −104.9787 | −81.6595 | −82.2470 | −1235.0374 | −1489.0077 | 31.0671 | 30.8490 |
| F23 | −51.0132 | −56.5103 | −33.2713 | −35.2221 | −37.1648 | −38.2084 | −37.8143 | −35.9943 | −27.1394 | −18.1673 |

TABLE 42-continued

| | | | | | | | | | |
|---|---|---|---|---|---|---|---|---|---|
| F56 | 18.8444 | 17.2550 | 20.3254 | 21.4244 | 20.0804 | 20.6871 | 20.5390 | 20.5613 | 44.3626 | 18.0977 |
| R11 | −75.3583 | −72.0917 | −42.0917 | −42.0568 | −37.4963 | −39.1706 | −39.4344 | −35.5999 | −39.0429 | −29.4792 |
| d11 | 4.2459 | 4.2500 | 4.5663 | 4.7686 | 4.2969 | 4.3004 | 4.2513 | 4.2463 | 4.3187 | 4.3427 |
| d7 | 7.6761 | 7.3228 | 6.9498 | 6.9500 | 6.8990 | 6.9005 | 6.9990 | 6.9495 | 6.8577 | 6.9492 |
| arctan(1/K(S2)) | 51.9010 | 53.1544 | 53.8946 | 53.7843 | 51.2915 | 51.5338 | 52.3205 | 51.5810 | 48.6073 | 53.2601 |
| d12 | 4.3126 | 4.3126 | 4.4000 | 4.4000 | 4.2371 | 3.8853 | 4.3126 | 4.3126 | 4.3126 | 4.3126 |
| d3 | 1.6030 | 1.5768 | 0.6827 | 0.9814 | 1.0822 | 1.0857 | 0.8770 | 0.9703 | 0.5378 | 0.9894 |
| d23 | 0.0000 | 0.0000 | 0.0000 | 0.0000 | 0.0000 | 0.0000 | 0.0000 | 0.0000 | 0.0000 | 0.0000 |
| d4 | 5.7674 | 5.9389 | 4.8420 | 4.9302 | 5.4192 | 5.2798 | 5.4074 | 5.3995 | 6.0067 | 2.9784 |
| d34 | 0.1000 | 0.1000 | 0.1000 | 0.1000 | 0.1000 | 0.9922 | 0.1000 | 0.1000 | 0.1000 | 0.1000 |
| D1 | 12.7430 | 12.8855 | 12.5373 | 12.3162 | 12.0091 | 11.8756 | 11.9029 | 11.8736 | 11.3391 | 12.0622 |
| D2 | 9.9271 | 10.0610 | 9.6136 | 9.4129 | 9.2551 | 9.1448 | 9.0883 | 9.0986 | 8.7945 | 9.3163 |
| R1 | 12.2545 | 11.4821 | 12.4617 | 12.4492 | 12.3002 | 11.7791 | 12.7156 | 12.6467 | 11.3401 | 10.7364 |
| R2 | 6.3074 | 6.2862 | 5.9495 | 5.8335 | 5.9302 | 5.8398 | 5.7416 | 5.8065 | 5.8615 | 5.8128 |
| R3 | −8.5950 | −8.7479 | −8.2809 | −.9294 | −7.3834 | −7.3829 | −7.2935 | −7.2005 | −6.2103 | −7.0694 |
| R4 | 11.5332 | 11.4711 | 12.1843 | 11.4164 | 10.6240 | 10.4377 | 10.3337 | 10.4186 | 10.1825 | 14.1402 |
| R6 | −11.5332 | −11.4711 | −12.1843 | −11.4164 | −10.6240 | −10.4377 | −10.3337 | −10.4186 | −10.1825 | −14.1402 |
| R7 | 13.0929 | 12.4036 | 15.8983 | 15.4827 | 13.9014 | 13.6570 | 13.4784 | 13.7654 | 19.2136 | 22.5680 |
| R8 | 105.8628 | 51.9734 | −51.0002 | −50.7589 | −136.2131 | −176.6936 | −154.1316 | −125.7372 | −28.9900 | −24.1593 |
| Rj1 | 11.5332 | 11.4711 | 12.1843 | 11.4164 | 10.6240 | 10.4377 | 10.3337 | 10.4186 | 10.1825 | 14.1402 |
| Φj1 | 10.6552 | 10.8238 | 10.2422 | 10.1998 | 10.1597 | 10.3253 | 9.9925 | 9.9940 | 9.4249 | 10.3272 |
| D13 | 8.8931 | 8.7753 | 9.2232 | 9.2195 | 8.8797 | 9.1717 | 8.7283 | 8.9330 | 9.2044 | 8.8176 |

| | example | | | | | | | | | |
|---|---|---|---|---|---|---|---|---|---|---|
| Parameter | 11 | 12 | 13 | 14 | 15 | 16 | 17 | 18 | 19 | 20 |
| F | 7.7257 | 7.7294 | 7.9105 | 8.0316 | 7.9616 | 7.9563 | 7.9832 | 7.9772 | 8.0283 | 8.0989 |
| φ | 0.1294 | 0.1294 | 0.1254 | 0.1245 | 0.1256 | 0.1257 | 0.1253 | 0.1254 | 0.1246 | 0.1235 |
| FNO | 1.6000 | 1.6000 | 1.6013 | 1.6258 | 1.6117 | 1.6106 | 1.6160 | 1.6148 | 1.6200 | 1.6200 |
| ENPD | 4.8286 | 4.8309 | 4.9400 | 4.9400 | 4.9400 | 4.9400 | 4.9400 | 4.9400 | 4.9557 | 4.9993 |
| TTL | 37.0010 | 37.0537 | 36.8882 | 36.9575 | 36.9845 | 37.0005 | 37.0015 | 36.9975 | 36.0164 | 36.1262 |
| FOV | 70.2600 | 70.2600 | 70.0000 | 70.0000 | 70.0000 | 70.0000 | 70.1000 | 70.1000 | 70.1000 | 70.1000 |
| θ | 1.2263 | 1.2263 | 1.2217 | 1.2217 | 1.2217 | 1.2217 | 1.2235 | 1.2235 | 1.2235 | 1.2235 |
| H | 9.2394 | 9.1780 | 9.1789 | 9.3101 | 9.2541 | 9.2464 | 9.2414 | 9.2346 | 9.2547 | 9.3237 |
| D | 12.2116 | 11.9310 | 13.1870 | 13.1830 | 12.9315 | 12.9464 | 12.2034 | 12.2034 | 11.9899 | 12.0353 |
| TL | 33.0607 | 33.6108 | 33.8506 | 33.7336 | 33.2204 | 33.2398 | 33.4163 | 33.4183 | 33.1080 | 33.1080 |
| BFL | 3.9403 | 3.4429 | 3.0376 | 3.2239 | 3.7641 | 3.7607 | 3.5853 | 3.5792 | 2.9085 | 3.0182 |
| L | 13.2626 | 13.4782 | 14.2927 | 14.4620 | 16.2620 | 16.2620 | 15.5013 | 15.4943 | 17.4254 | 17.5351 |
| DST | 7.6454 | 7.3367 | 7.4900 | 7.4810 | 7.7952 | 7.8015 | 7.7284 | 7.7276 | 7.8106 | 7.8815 |
| DMAX | 12.2116 | 11.9310 | 13.1870 | 13.1830 | 12.9315 | 12.9464 | 12.2034 | 12.2034 | 11.9899 | 12.0353 |
| F1 | −17.8685 | −18.2743 | −24.4971 | −24.7653 | −25.7771 | −25.7895 | −24.8091 | −24.8197 | −12.5587 | −12.6221 |
| F2 | −5.2486 | −6.1752 | −8.4135 | −8.4564 | −9.3465 | −7.9003 | −7.9003 | −7.9004 | −44.3717 | −44.4859 |
| F3 | 10.1600 | 10.2943 | 14.2685 | 14.3322 | 18.0140 | 18.0149 | 13.7931 | 13.7937 | 22.9462 | 23.0588 |
| F4 | 15.2486 | 15.0934 | 17.1190 | 17.2106 | 16.4572 | 16.4578 | 19.7071 | 19.7074 | 23.3086 | 23.4275 |
| F5 | −13.4553 | −13.4900 | 7.3913 | 7.4227 | −12.3179 | −12.3179 | 7.5146 | 7.5174 | 7.0135 | 7.0460 |
| F6 | 6.9565 | 7.4277 | −10.3034 | −10.3547 | 6.9957 | 6.9966 | −9.3637 | −9.3734 | −8.1478 | −8.1892 |
| F7 | −61.4508 | −83.3899 | −61.1126 | −61.4221 | −67.0004 | −67.0008 | 285.6744 | 282.0328 | 255.1698 | 256.6914 |
| F23 | −31.4328 | −32.5481 | −60.6061 | −60.2410 | −37.3134 | −37.3134 | −70.9220 | −70.9220 | 34.0136 | 34.3643 |
| F56 | 16.3031 | 17.8990 | 20.2628 | 20.3723 | 18.2896 | 18.2899 | 22.6645 | 22.6509 | 23.3656 | 23.5109 |
| R11 | −387829 | −52.9233 | −70.3447 | −7.6982 | −31.7917 | −31.7982 | −75.3443 | −74.9696 | −49.1682 | −49.4141 |
| d11 | 4.5538 | 4.3757 | 3.3714 | 3.3714 | 2.4689 | 2.4694 | 3.0251 | 3.0250 | 2.4127 | 2.4127 |
| d7 | 7.7949 | 8.1500 | 5.2748 | 5.2489 | 5.8448 | 5.8462 | 4.7272 | 4.7271 | 7.6675 | 7.6657 |
| arctan(1/K(S2)) | 54.4520 | 52.3900 | 55.5534 | 55.2479 | 53.5059 | 53.5741 | 50.6361 | 50.6323 | −7.0033 | −6.9948 |
| d12 | 4.3126 | 3.8953 | 4.9765 | 4.9517 | 3.9560 | 3.9797 | 3.8709 | 3.8710 | 3.6579 | 3.65799 |
| d3 | 0.6706 | 1.6739 | 1.0000 | 1.0000 | 1.0000 | 1.0000 | 1.0000 | 1.0000 | 2.2188 | 2.2188 |
| d23 | 0.0000 | 0.0000 | 1.1112 | 1.1056 | 1.4282 | 1.4279 | 1.7962 | 1.7962 | 0.7952 | 0.7952 |
| d4 | 4.8626 | 4.7002 | 5.1759 | 5.1500 | 4.5740 | 4.5733 | 4.4049 | 4.4087 | 3.6064 | 3.6064 |
| d34 | 0.1000 | 0.1000 | 0.0999 | 0.0999 | 0.0999 | 0.0999 | 0.0999 | 0.0999 | 0.1000 | 0.1000 |
| D1 | 12.2116 | 11.9310 | 13.1870 | 13.183 | 12.931 | 12.946 | 12.203 | 12.203 | 11.989 | 12.0353 |
| D2 | 9.3773 | 9.2120 | 10.1687 | 10.182 | 10.051 | 10.062 | 9.4860 | 9.4864 | 9.5818 | 9.6223 |
| R1 | 10.9839 | 10.9675 | 12.0000 | 12.0000 | 11.8156 | 11.8156 | 11.7827 | 11.7808 | −49.1682 | −49.4141 |
| R2 | 5.7626 | 5.8143 | 6.1655 | 6.1964 | 6.2517 | 6.2531 | 6.1348 | 6.1354 | 7.8486 | 7.8878 |
| R3 | −7.4912 | −7.5217 | −8.6846 | −8.7282 | −10.4538 | −10.4502 | −8.2394 | −8.2395 | −8.0425 | −8.0827 |
| R4 | 11.0961 | 11.2930 | 16.6786 | 16.7624 | 16.1095 | 16.1137 | 15.4081 | 15.4083 | −11.3127 | −11.3693 |
| R6 | −11.0961 | −22.2930 | −11.2744 | −11.3311 | −12.6206 | −12.6208 | −10.1707 | −10.1707 | −17.4396 | −17.5268 |
| R7 | 23.4756 | 20.8992 | 12.8947 | 12.9595 | 16.0907 | 16.0928 | 12.8038 | 12.8038 | 13.6346 | 13.7027 |
| R8 | −29.5653 | −34.8837 | 62.9462 | 63.2625 | −218.8028 | −218.5456 | 38.0283 | 38.0289 | 78.3784 | 78.7703 |
| Rj1 | 11.0961 | 11.2930 | 11.0106 | 11.0659 | 12.0942 | 12.0937 | 11.6272 | 11.6333 | 10.4217 | 10.4738 |
| Φj1 | 10.2460 | 10.4483 | 7.8416 | 7.8378 | 8.4530 | 8.4591 | 7.8227 | 7.8215 | 9.9920 | 10.0676 |
| D13 | 8.1357 | 8.2815 | 9.0550 | 9.1331 | 9.4667 | 9.4643 | 9.3822 | 9.3784 | 9.5402 | 9.6356 |

It is apparent that the described embodiments are only part of the embodiments of the disclosure, not all the embodiments. Based on the embodiments in the disclosure, all other embodiments obtained by those of ordinary skill in the art without creative work shall fall within the protection scope of the disclosure.

It is to be noted that, terms used herein are intended to describe specific implementations only and are not intended to limit exemplary embodiments according to the disclosure. As used herein, unless the context clearly indicates otherwise, a singular form is also intended to include a plural form. In addition, it is further understood that when the terms "including" and/or "comprising" are used in this specification, the terms indicate the presence of features, steps, operations, devices, components, and/or a combination thereof.

It is to be noted that terms "first", "second" and the like in the description, claims and the above mentioned drawings of the disclosure are configured for distinguishing similar objects rather than describing a specified sequence or a precedence order. It should be understood that the data used in such a way may be exchanged where appropriate, in order that the implementations of the disclosure described here may be implemented in an order other than those illustrated or described herein.

The above are only the preferred embodiments of the disclosure and are not intended to limit the disclosure. For those skilled in the art, the disclosure may have various modifications and variations. Any modifications, equivalent replacements, improvements and the like made within the spirit and principle of the disclosure all fall within the scope of protection of the disclosure.

What is claimed is:

1. An optical lens assembly, comprising:
- a first lens having a negative refractive power, a second side surface of the first lens is a concave surface;
- a second lens having a negative refractive power, a first side surface of the second lens is a concave surface;
- a third lens having a positive refractive power, a second side surface of the third lens is a convex surface;
- a fourth lens having a positive refractive power, a first side surface of the fourth lens is a convex surface;
- a fifth lens having a refractive power, a first side surface of the fifth lens is a convex surface;
- a sixth lens having a refractive power; and
- a seventh lens having a refractive power;
- wherein refractive powers of the fifth lens and the sixth lens are opposite;
- a distance d11 from a second side surface of the sixth lens to a first side surface of the seventh lens on an optical axis of the optical lens assembly and a total optical length TTL of the optical lens assembly meet: $d11/TTL \geq 0.03$;
- a distance d7 from a second side surface of the fourth lens to the first side surface of the fifth lens on the optical axis of the optical lens assembly and the total optical length TTL of the optical lens assembly meet: $d7/TTL \geq 0.09$; and
- a focal length F7 of the seventh lens and a focal length F of the optical lens assembly meet: $|F7/F| \geq 2.5$.

2. The optical lens assembly according to claim 1, wherein
- a first side surface of the first lens is a convex surface, and a second side surface of the second lens is a concave surface;
- a focal length F1 of the first lens and the focal length F of the optical lens assembly meet: $-3.6 \leq F1/F \leq -1.7$; and/or
- a focal length F2 of the second lens and the focal length F of the optical lens assembly meet: $-3 \leq F2/F \leq -0.3$; and/or
- a curvature radius R1 of a first side surface of the first lens and a curvature radius R2 of the second side surface of the first lens meet: $0.5 \leq R1/R2 \leq 4$; and/or
- a curvature radius R3 of the first side surface of the second lens and a curvature radius R4 of a second side surface of the second lens meet: $-2 \leq R3/R4 < 0$.

3. The optical lens assembly according to claim 1, wherein
- a first side surface of the first lens is a concave surface, and a second side surface of the second lens is a convex surface;
- a focal length F1 of the first lens and the focal length F of the optical lens assembly meet: $-2 \leq F1/F \leq -0.4$; and/or
- a focal length F2 of the second lens and the focal length F of the optical lens assembly meet: $-6.5 \leq F2/F \leq -4.5$; and/or
- a curvature radius R1 of a first side surface of the first lens and a curvature radius R2 of the second side surface of the first lens meet: $-8 \leq R1/R2 \leq -4$; and/or
- a curvature radius R3 of the first side surface of the second lens and a curvature radius R4 of a second side surface of the second lens meet: $0 < R3/R4 \leq 2$.

4. The optical lens assembly according to claim 1, wherein a first side surface of the third lens is a convex surface, and the second side surface of the fourth lens is a convex surface or a concave surface.

5. The optical lens assembly according to claim 1, wherein
- the fifth lens has a negative refractive power, the first side surface of the fifth lens is a convex surface, a second side surface of the fifth lens is a concave surface, the sixth lens has a positive refractive power, a first side surface of the sixth lens is a convex surface, and the second side surface of the sixth lens is a convex surface; or
- the fifth lens has a positive refractive power, the first side surface of the fifth lens is a convex surface, a second side surface of the fifth lens is a convex surface, the sixth lens has a negative refractive power, a first side surface of the sixth lens is a concave surface, and the second side surface of the sixth lens is a convex surface; or
- the fifth lens has a positive refractive power, the first side surface of the fifth lens is a convex surface, a second side surface of the fifth lens is a convex surface, the sixth lens has a negative refractive power, a first side surface of the sixth lens is a concave surface, and the second side surface of the sixth lens is a concave surface.

6. The optical lens assembly according to claim 1, wherein
- the seventh lens has a negative refractive power, the first side surface of the seventh lens is a convex surface, and a second side surface of the seventh lens is a concave surface; or
- the seventh lens has a negative refractive power, the first side surface of the seventh lens is a concave surface, and a second side surface of the seventh lens is a concave surface; or the seventh lens has a negative refractive power, the first side surface of the seventh lens is a concave surface, and a second side surface of the seventh lens is a convex surface; or the seventh lens has a positive refractive power, the first side surface of the seventh lens is a convex surface, and a second side surface of the seventh lens is a convex surface; or the seventh lens has a positive refractive power, the first side surface of the seventh lens is a convex surface, and a second side surface of the seventh lens is a concave surface.

7. The optical lens assembly according to claim 1, wherein a focal length F1 of the first lens, a focal length F2 of the second lens, and the focal length F of the optical lens assembly meet: $-3 \le MAX[F1, F2]/F$.

8. The optical lens assembly according to claim 1, wherein a focal length F3 of the third lens and the focal length F of the optical lens assembly meet: $F3/F \le 3.5$.

9. The optical lens assembly according to claim 1, wherein a focal length F2 of the second lens and a focal length F3 of the third lens meet: $-3 \le F2/F3 \le -0.1$.

10. The optical lens assembly according to claim 1, wherein a focal length F4 of the fourth lens and the focal length F of the optical lens assembly meet: $0.5 \le F4/F \le 4$.

11. The optical lens assembly according to claim 1, wherein a focal length F5 of the fifth lens and a focal length F6 of the sixth lens meet: $-8 \le F5/F6 \le -0.1$.

12. The optical lens assembly according to claim 1, wherein a distance d23 from a second side surface of the second lens to a first side surface of the third lens on the optical axis and an on-axis distance TL from a first side surface of the first lens to a second side surface of the seventh lens meet: $d23/TL \le 0.1$.

13. The optical lens assembly according to claim 1, wherein a curvature radius R6 of the second side surface of the third lens and a curvature radius R7 of the first side surface of the fourth lens meet: $-2.5 \le R6/R7 \le -0.1$.

14. The optical lens assembly according to claim 1, wherein a distance d12 from the second side surface of the first lens to the first side surface of the second lens on the optical axis and the on-axis distance TL from a first side surface of the first lens to a second side surface of the seventh lens meet: $d12/TL \le 0.17$.

15. The optical lens assembly according to claim 1, wherein a combined focal length F56 of the fifth lens and the sixth lens, and the focal length F of the optical lens assembly meet: $0 < F56/F \le 7$.

16. The optical lens assembly according to claim 1, wherein the on-axis distance TL from a first side surface of the first lens to a second side surface of the seventh lens and a center thickness d3 of the second lens meet: $TL/d3 \ge 10$.

17. The optical lens assembly according to claim 1, wherein the on-axis distance TL from a first side surface of the first lens to a second side surface of the seventh lens, and a distance d34 from the second side surface of the third lens to the first side surface of the fourth lens on the optical axis meet: $25 \le TL/d34$.

18. The optical lens assembly according to claim 1, wherein a curvature radius R11 of the second side surface of the sixth lens and the focal length F of the optical lens assembly meet: $-15 \le R11/F \le -2.5$.

19. The optical lens assembly according to claim 1, wherein the optical lens assembly meets at least one of the following conditional expressions: $R11/F \le -0.01$, $d11/TTL \ge 0.05$, $0.055 \le d11/TTL \le 0.2$, $d7/TTL \ge 0.1$, $0.1 \le d7/TTL \le 0.4$, $BFL/TTL \ge 0.02$, $BFL/TTL \ge 0.05$, $TTL/H/FOV \le 0.1$, $TTL/H/FOV \le 0.08$, $F/ENPD \le 2.0$, $F/ENPD \le 1.8$, $TTL/(H/2) \ge 5$, $TTL/(H/2) \ge 6.5$, $D13/H \ge 0.7$, $D13/H \ge 0.85$, $F3/F \le 3$, $|R7/R8| \le 2.5$, $|R7/R8| \le 1.8$, $\arctan(1/K(S\mathbf{2})) \ge 30°$, $\arctan(1/K(S\mathbf{2})) \ge 35°$, $(d3+d4)/TTL \ge 0.05$, $(d3+d4)/TTL \ge 0.08$, $(H/2)/(F*\tan(\theta/2) \ge 0.6$, $(H/2)/(F*\tan(\theta/2) \ge 0.75$, $(R1/D1)/(R2/D2) \le 4$, $(R1/D1)/(R2/D2) \le 2$, $(R2-R3)/(R2+R3) \le -2$, $(R2-R3)/(R2+R3) \le -3$, $F23/F \le -0.5$, $F23/F \le -1.5$, $F1/F \ge -8$, $F1/F \ge -4$, $|(H-F*\theta)/(F*\theta)| \le 0.2$, $|(H-F*\theta)/(F*\theta)| \le 0.1$, $|Rj1|/(\Phi j1/2) \le 5$, $0 \le d23/TL \le 0.08$, $-8 \le F2/F$, $-7 \le F2/F \le -0.2$, $-2.1 \le MAX[F1, F2]/F \le -0.1$, $|F7/F| \ge 3.5$, $d12/TL \le 0.16$, $0.5 \le F56/F \le 6.2$, $1.2 \le F4/F \le 3$, $-4 \le F5/F6 \le -0.2$, $-2 \le F2/F3 \le -0.2$, $TL/d3 \ge 13$, $28 \le TL/d34 \le 400$, and $-2 \le R6/R7 \le -0.2$, and the second lens and the third lens are spaced apart from each other and meet $0.01 \le d23/TL \le 0.07$, and the second lens and the third lens are cemented together; wherein R11 is a curvature radius of the second side surface of the sixth lens, F is the focal length of the optical lens assembly, d11 is the distance from the second side surface of the sixth lens to the first side surface of the seventh lens on the optical axis of the optical lens assembly, TTL is the total optical length of the optical lens assembly, d7 is the distance from the second side surface of the fourth lens to the first side surface of the fifth lens on the optical axis of the optical lens assembly, BFL is the optical back focal length of the optical lens assembly, FOV is the maximum field of view of the optical lens assembly, H is the image height corresponding to the maximum field of view of the optical lens assembly, ENPD is the entrance pupil diameter of the optical lens assembly, D13 is the clear aperture of a second side surface of the seventh lens, F3 is a focal length of the third lens, R7 is a curvature radius of the first side surface of the fourth lens, R8 is the curvature radius of the second side surface of the fourth lens, $\arctan(1/K(S\mathbf{2}))$ is the maximum field angle of the second side surface of the first lens, d3 is a center thickness of the second lens, d4 is a center thickness of the third lens, θ is a radian value of the maximum field of view of the optical lens assembly, R1 is a curvature radius of a first side surface of the first lens, R2 is a curvature radius of the second side surface of the first lens, D1 is a clear aperture of the first side surface of the first lens, D2 is a clear aperture of the second side surface of the first lens, R3 is a curvature radius of the first side surface of the second lens, F23 is a focal length of a first cemented lens formed by the second lens and the third lens, F1 is a focal length of the first lens, Rj1 is a curvature radius of a cemented surface of the first cemented lens, Φj1 is a clear aperture of the cemented surface of the first cemented lens, d23 is a distance from a second side surface of the second lens to a first side surface of the third lens on the optical axis, TL is an on-axis distance from the first side surface of the first lens to the second side surface of the seventh lens, F2 is a focal length of the second lens, F7 is the focal length of the seventh lens, d12 is a distance from the second side surface of the first lens to the first side surface of the second lens on the optical axis, F56 is a combined focal length of the fifth lens and the sixth lens, F4 is a focal length of the fourth lens, F5 is a focal length of the fifth lens, F6 is a focal length of the sixth lens, d34 is a distance from the second side surface of the third lens to the first side surface of the fourth lens on the optical axis, and R6 is a curvature radius of the second side surface of the third lens.

20. An electronic device, including the optical lens assembly according to claim 1 and an imaging element for converting an optical image formed by the optical lens assembly into an electrical signal.

* * * * *